(12) United States Patent
Inoue et al.

(10) Patent No.: US 8,191,874 B2
(45) Date of Patent: Jun. 5, 2012

(54) VEHICLE SUSPENSION SYSTEM

(75) Inventors: Hirofumi Inoue, Toyota (JP); Hiroaki Date, Komaki (JP); Kazuo Ogawa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 672 days.

(21) Appl. No.: 12/280,292

(22) PCT Filed: Mar. 6, 2007

(86) PCT No.: PCT/JP2007/054337
§ 371 (c)(1),
(2), (4) Date: Aug. 21, 2008

(87) PCT Pub. No.: WO2007/108316
PCT Pub. Date: Sep. 27, 2007

(65) Prior Publication Data
US 2010/0230876 A1    Sep. 16, 2010

(30) Foreign Application Priority Data
Mar. 22, 2006  (JP) ................................. 2006-078116

(51) Int. Cl.
*F16F 15/36* (2006.01)
*F16F 9/00* (2006.01)
*F16F 15/03* (2006.01)

(52) U.S. Cl. ............... 267/64.24; 267/64.15; 267/64.27; 188/267; 280/5.515

(58) Field of Classification Search .................. 188/267; 267/217, 218, 219, 220, 64.11, 64.15, 64.23, 267/64.24, 64.27, 64.28; 180/65.31; 280/5.514, 280/5.515, 6.157
See application file for complete search history.

(56) References Cited

U.S. PATENT DOCUMENTS

| 4,981,309 | A | | 1/1991 | Froeschle et al. |
| 5,060,959 | A | * | 10/1991 | Davis et al. ................. 280/5.514 |
| 5,091,679 | A | | 2/1992 | Murty et al. |
| 5,570,286 | A | * | 10/1996 | Margolis et al. ................. 701/36 |
| 5,929,595 | A | | 7/1999 | Lyons et al. |
| 6,111,375 | A | * | 8/2000 | Zenobi ........................ 180/65.31 |
| 6,359,762 | B1 | | 3/2002 | Yokomori |

(Continued)

FOREIGN PATENT DOCUMENTS
JP    3 189223    8/1991
(Continued)

*Primary Examiner* — Thomas J Williams
(74) *Attorney, Agent, or Firm* — Oblon, Spivak, McClelland, Maier & Neustadt, L.L.P.

(57) ABSTRACT

A vehicle suspension system including: (a) a suspension spring interconnecting a vehicle body and a wheel; (b) an actuator having an electric motor, such that the actuator is capable of generating, based on a force of the electric motor, an actuator force forcing the body and the wheel toward and away from each other, and causing the generated actuator force to act as a damping force against displacement of the body and the wheel; and (c) a control device for controlling the actuator force generated by the actuator, by controlling operation of the electric motor. The control device is capable of establishing a constant-force generating state in which the actuator force is constantly generated as a constant actuator force by the actuator with supply of an electric power thereto from a battery as an electric power source of the electric motor such that the generated constant actuator force acts in a rebound direction or a bound direction. The control device controls the constant-force generating state, based on a charge state of the battery.

21 Claims, 32 Drawing Sheets

U.S. PATENT DOCUMENTS

| | | | |
|---|---|---|---|
| 6,624,529 B2 * | 9/2003 | Obayashi | 290/40 C |
| 6,805,211 B2 * | 10/2004 | Fujikawa | 180/65.25 |
| 6,986,398 B2 * | 1/2006 | Obayashi | 180/65.28 |
| 7,938,410 B2 * | 5/2011 | Buma et al. | 280/5.508 |
| 2002/0116104 A1 | 8/2002 | Kawashima et al. | |
| 2003/0033063 A1 | 2/2003 | Kawashima et al. | |
| 2009/0260935 A1 * | 10/2009 | Avadhany et al. | 188/297 |
| 2009/0273147 A1 | 11/2009 | Inoue et al. | |

FOREIGN PATENT DOCUMENTS

| | | |
|---|---|---|
| JP | 11-268599 | 10/1999 |
| JP | 2001 311452 | 11/2001 |
| JP | 2002 218778 | 8/2002 |
| JP | 2003 54234 | 2/2003 |
| JP | 2005 35490 | 2/2005 |
| JP | 2005 119560 | 5/2005 |
| JP | 2006 82635 | 3/2006 |
| RU | 2223183 | 3/2002 |
| WO | 96/21892 | 7/1996 |
| WO | WO 2007/049633 A1 | 5/2007 |

* cited by examiner

FIG.6
(a) 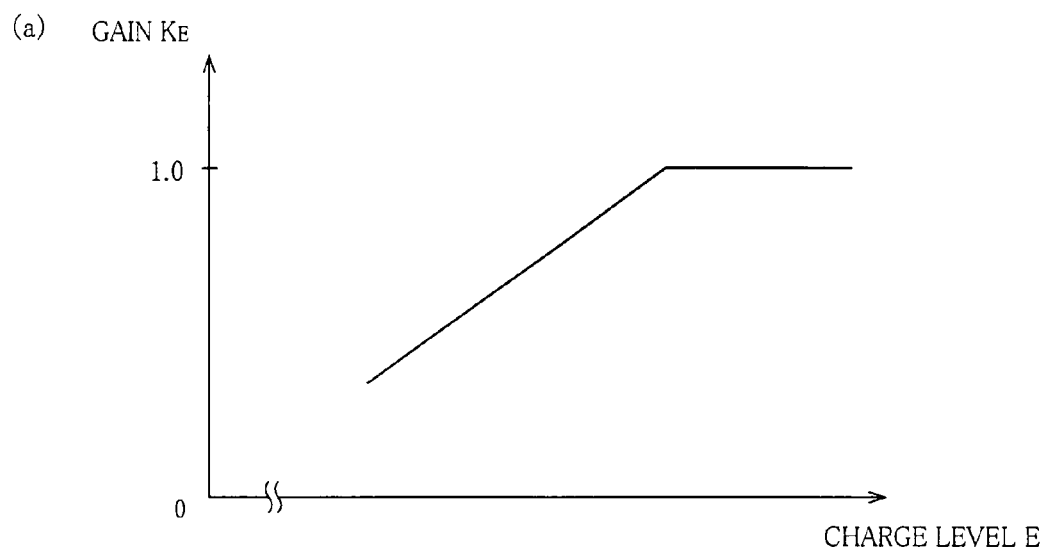
(b) 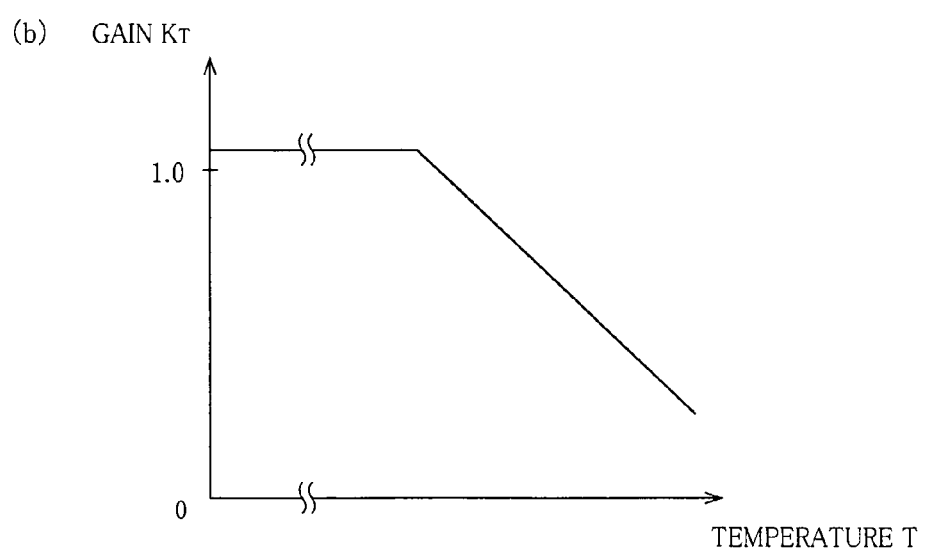

FIG.21
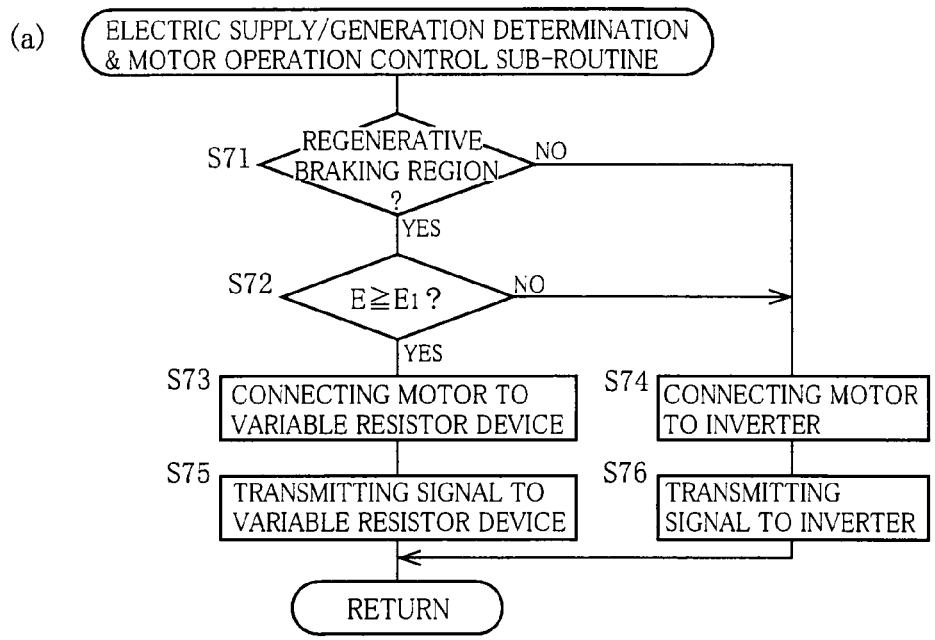
(a)
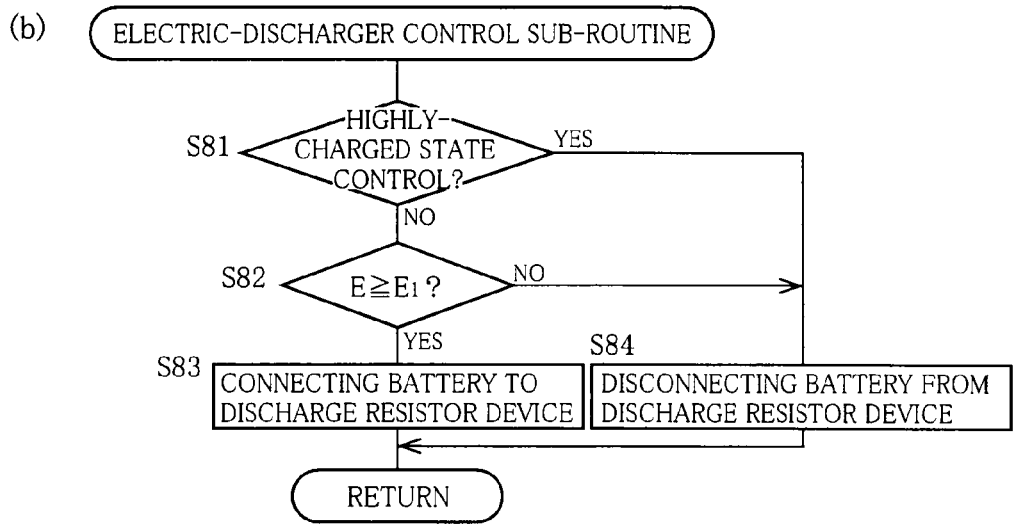
(b)

VEHICLE SUSPENSION SYSTEM

TECHNICAL FIELD

The present invention relates in general to a suspension system that is to be installed in a vehicle, and more particularly to such a suspension system equipped with an electromagnetic actuator that functions as a shock absorber.

BACKGROUND ART

In vehicle industry field of recent years, there is a development of a system disclosed in patent document identified below, i.e., a so-called electromagnetic suspension system (hereinafter abbreviated to as "electromagnetic suspension" where appropriate) in which an electromagnetic actuator is arranged to function as a shock absorber (damper). This electromagnetic suspension is expected as high-performance suspension system, owing to its advantages such as easy establishment of suspension characteristic based on a so-called skyhook theory.
[Patent Document 1] JP2002-311452A

DISCLOSURE OF THE INVENTION

(A) Outline of the Invention

In the electromagnetic suspension disclosed in the above-identified patent document, the suspension is controlled with two states being selectively established. While one of the two states is being established, an electric power is supplied from a battery to an electric motor included in the electromagnetic actuator whereby an actuator force is generated. While the other state is being established, the electric power generated by the electric motor is returned to the battery whereby the actuator force is regenerated. However, depending on a charge state of the battery, there could be a situation where the electric power should not be supplied from the battery or a situation where the electric power should not be returned to the battery. Further, there could be a situation requiring discharge of an electric energy accumulated in the battery so as to avoid an overcharged state, for example, where the battery is in a fully-charged state. Therefore, dealing appropriately with such situations leads to improvement in utility of the electromagnetic suspension. The present invention was made in the light of the background art discussed above. It is therefore an object of the invention to provide a vehicle suspension system having a high serviceability in the practical use.

This object may be achieved according to the principle of this invention, which provides an electromagnetic suspension system as a vehicle suspension system capable of establishing a state (constant-force generating state) that causes an electromagnetic actuator to generate a constant actuator force with supply of an electric power thereto from a battery such that the constant-force generating state is controlled depending on a charge state of the battery.

The constant-force generating state is a state in which the actuator keeps generating a force that could change a distance a wheel and a vehicle body. By controlling the constant-force generating state, it is possible to effectively control discharge of the battery. Such a technical effect enables the suspension system according to the present invention to have a high serviceability in the practical use.

(B) Modes of the Invention

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only any one of these modes but also either a mode provided by any one of these modes and additional element or elements incorporated therein and a mode provided by any one of these modes without some of elements recited therein. It is noted that the below-described modes (1) through (21) correspond to the appended claims 1 through 21, respectively.

(1) A suspension system for a vehicle, including:

a suspension spring elastically interconnecting a vehicle body and a wheel of the vehicle;

an actuator disposed in parallel with the suspension spring and having an electric motor, such that the actuator is capable of generating, based on a force of the electric motor, an actuator force forcing the vehicle body and the wheel toward and away from each other, and causing the generated actuator force to act as a damping force against displacement of the vehicle body and the wheel toward and away from each other; and a control device configured to control the actuator force generated by the actuator, by controlling operation of the electric motor, wherein the control device is capable of establishing a constant-force generating state in which the actuator force is constantly generated as a constant actuator force by the actuator with supply of an electric power thereto from a battery as an electric power source of the electric motor such that the generated constant actuator force acts in one of a direction for forcing the vehicle body and the wheel away from each other and a direction for forcing the vehicle body and the wheel toward each other, and wherein the control device is configured to control the constant-force generating state, based on a charge state of the battery The constant-force generating state defined in this mode (1) is a state in which the actuator is caused to keep generating a force forcing the vehicle body and the wheel toward or away from each other. In this constant-force generating state, the constant actuator force serves, for example, as a force increasing or reducing height of the vehicle or a force restraining frontward, rearward, rightward or leftward inclination of the vehicle body, so that an electric energy charged in the battery keeps to be emitted to the electric motor included in the actuator. Thus, the discharge of the battery can be effectively controlled by controlling the constant-force generating state depending on the charge state of the battery as in this mode. For example, when a charge level of the battery is high (hereinafter referred to as "highly-charged state" where appropriate), specifically, when the battery is fully charged (hereinafter referred to as "fully-charged state" where appropriate) or when the battery is almost in the fully-charged state, the establishment of the constant-force generating state makes it possible to effectively avoid the battery from being placed in a state (hereinafter referred to as "excessively-charged state" where appropriate) in which the battery is still further charged than in the fully-charged state. On the other hand, a charge level of the battery is low (hereinafter referred to as "low-charged state" where appropriate), specifically, when the electric energy that is to be emitted does not substantially remain in the battery (hereinafter referred to as "poorly-charged state" where appropriate) or when the battery is almost in the poorly-charged state, inhibiting the establishment of the constant-force generating state makes it possible to restrain consumption of the electric power remaining in the battery and effectively avoid the battery from being placed in a state (hereinafter referred to as "excessively-discharged state" where appropriate) in which the battery is still further discharged than in the poorly-charged state.

The "constant actuator force" defined in this mode may be either a force forcing the vehicle body and the wheel in a direction (hereinafter referred to as "rebound direction" where appropriate) away from each other or a force forcing the vehicle body and the wheel in a direction (hereinafter referred to as "bound direction" where appropriate) toward each other. Where the system is equipped with a plurality of actuators, the constant-force generating state may be either a state in which the constant actuator forces generated by the respective actuators act in the same direction or a state in which the constant actuator forces generated by the respective actuators act in respective different directions. Further, in the constant-force generating state, the constant actuator force generated by the actuator may act either in only one of the rebound and bound directions, or in a changeable direction that is changed from one of the rebound and bound directions to the other during establishment of the constant-force generating state. That is, in the constant-force generating state, the direction of the constant actuator force generated by the actuator may be either constant or changed. Moreover, in the constant-force generating state, the magnitude of the constant actuator force may be either constant or changed. In addition, the term "controlling the constant-force generating state" encompasses determination as to whether the constant-force generating state should be established and determination as to when the constant-force generating state should be established, for example. When the constant-force generating state is established, the term "controlling the constant-force generating state" encompasses determination of the magnitude and direction of the constant actuator force, for example.

The present mode may be applied to a vehicle that is constructed such that the above-described battery is provided by a power source serving exclusively for the actuator so that the electric energy generated by the electric motor included in the actuator is stored in the battery, or alternatively to a vehicle that is constructed such that the battery is provided by a power source serving also for another system, namely, used also as a power source of a drive motor of a hybrid drive system, for example, so that the electric energy generated by the another system also is stored in the battery. In the latter case, the suspension system of this mode can be arranged to effectively prevent overcharge of the battery due to returning of the generated energy from the another system. It is noted that the "electric motor" may be either a rotary motor or a linear motor.

(2) The suspension system according to mode (1), wherein the suspension spring and the actuator are disposed in each of four wheels as front right and left and rear right and left wheels of the vehicle, so that four actuator are disposed in the respective four wheels, for generating respective constant actuator forces, and wherein the control device is capable of establishing a state, as the constant-force generating state, in which the four actuators are assigned to generate, as the respective constant actuator forces, respective forces that act in a same direction.

(3) The suspension system according to mode (1) or (2), wherein the suspension spring and the actuator are disposed in each of four wheels as front right and left and rear right and left wheels of the vehicle, so that four actuator are disposed in the respective four wheels, for generating respective constant actuator forces, and wherein the control device is capable of establishing a state, as the constant-force generating state, in which two of the four actuators positioned in respective positions that are diagonal to each other are assigned to generate, as the respective constant actuator forces, respective forces that act in the direction for forcing the vehicle body and the wheel away from each other while the other two of the four actuators are assigned to generate, as the respective constant actuator forces, respective forces that act in the direction for forcing the vehicle body and the wheel toward each other.

In the above-described two modes in which the four actuators are disposed in the respective four wheels as the front right and left and rear right and left wheels, there is a limitation to the direction of the constant actuator force generated by each of the actuators during the constant-force generating state. In a former one of the two modes, the constant actuator forces of the four actuators constitute forces forcing the vehicle body to be elevated or lowered. That is, in the former mode, the battery is discharged with generation of a force causing change of the vehicle height. On the other hand, in a latter one of the two modes, the constant actuator forces constitute forces forcing a front-wheel side portion and a rear-wheel side portion of the vehicle body to be inclined in respective opposite directions. That is, in the latter mode, the battery is discharged with generation of a force twisting the vehicle body. Since a vehicle body has a relatively high stiffness, it is possible to ignore deformation of the vehicle body due to the twisting force. In the latter mode, the battery is discharged with no substantial generation of the force causing change of the vehicle height.

(4) The suspension system according to mode (3), wherein the control device is configured to control the constant actuator forces of the four actuators, such that assignment of the two of the four actuators and assignment of the other two of the four actuators are periodically switched to each other whereby the direction of the constant actuator force generated by each of the four actuators is changed upon periodical switching of the assignment.

In the present mode, the constant actuator forces generated by the above-described two actuators positioned in the respective positions diagonal to each other act in a direction that is periodically switched between the bound direction and the rebound direction, while the constant actuator forces generated by the other two actuators act in a direction that is opposite to the direction of the constant actuator forces of the above-described two actuators. Briefly described, in the present mode, the twisting force twisting the vehicle body acts in a direction that is periodically changed.

Where the constant-force generating state is established by the twisting force applied to the vehicle body in a certain direction and the constant-force generating state is maintained for a relatively large length of time, the twisting force is applied to the vehicle body in the certain direction for the large length of time, thereby causing a risk of bad influence affecting frame of the vehicle, for example. In the present mode, it is possible to periodically change the direction in which the twisting force is applied to the vehicle body while establishing the constant-force generating state, thereby making it possible to reduce influence affecting the frame of the vehicle body even where the constant-force generating state is maintained for a relatively large length of time.

Further, where the twisting force is applied to the vehicle body, it is possible to consider that the vehicle body is not substantially deformed by the twisting force, since the stiffness of the vehicle body is relatively high. That is, during application of the twisting force to the vehicle body, it is possible to consider that the electric motor generates the force while being substantially stopped in the same operating position. Where the electric motor is held in such a state for a relatively large length of time, the electric motor is not substantially moved from a certain position of electrical angle whereby a certain phase coil is energized by an increased amount of electric current. This causes a risk of bad influence affecting the electric motor. However, since the stiffness of the vehicle body is not infinitely large, there is a possibility that the electric motor could be slightly moved by change of the direction in which the twisting force is applied to the vehicle body, which change could cause slight deformation of the vehicle body. In the present mode, it is possible to reduce influence affecting the frame of the vehicle body even where the constant-force generating state is maintained for a relatively large length of time.

(5) The suspension system according to mode (4), wherein the control device is configured to control the constant actuator forces of the four actuators, such that the constant actuator forces of the four actuators are gradually changed when the direction of the constant actuator force generated by each of the four actuators is changed upon the periodical switching of the assignment.

If the direction of the twisting force applied to the vehicle body is changed abruptly, there is a risk that an impact could be applied to the vehicle body, for example. In the present mode, for example, it is possible to alleviate influence which affects the vehicle body and which is caused by the change of the direction of the twisting direction.

(6) The suspension system according to any one of modes (3)-(5), wherein the control device is configured to always equalize magnitudes of the constant actuator forces of the four actuators to one another.

In the present embodiment, the discharge of the battery can be carried out, example, without substantially inclining the vehicle body and without changing the vehicle height.

(7) The suspension system according to any one of modes (1)-(6), wherein the suspension spring is a coil spring.

(8) The suspension system according to any one of modes (1)-(6), wherein the suspension spring is a fluid spring that utilizes pressure of a fluid.

In each of the above-described two modes, there is a specific limitation to construction of the suspension spring. The "fluid spring" can be provided by any one of various springs such as diaphragm air-spring which includes a pressure chamber filled with a compressed air, and hydraulic type spring which includes a cylinder filled with a working oil and an accumulator held in communication with an accumulator. Further, the "fluid spring" can be provided by a spring whose spring rate is changeable. The spring rate may be interpreted to mean not only a so-called spring constant that is a ratio of a load acting on the suspension spring to an amount of displacement of the suspension spring, but also a ratio of a load acting on the suspension spring to a distance (hereinafter referred to as "wheel-body distance" where appropriate) between the wheel and the vehicle body that are elastically connected through the suspension spring. That is, in case of generation of the constant actuator force in the form of the force for changing the vehicle height during the constant-force generating state, the vehicle height is changed, in general, by the constant actuator force where the spring is the coil spring. However, where the fluid spring whose spring rate is changeable is employed, the change of the vehicle height can be canceled by changing the spring rate.

(9) The suspension system according to any one of modes (1)-(8), wherein the control device is configured, when the battery is in a highly charged state, to execute a highly-charged state control for forcedly establishing the constant-force generating state.

In the present mode, the battery that is in the highly charged state is effectively discharged by generating the constant actuator force. Specifically described, it is possible to employ an arrangement in which the constant-force generating state is established when the charge level becomes equal to or higher than a threshold (for example, when a parameter indicative of the charge state of the battery becomes equal to or higher than the threshold). In the present mode, when the battery is in the highly charged state, the discharge of the battery is forcedly carried out, thereby making it possible to prevent the battery from being placed in an excessively charged state.

(10) The suspension system according to mode (9), wherein a magnitude of the constant actuator force generated upon execution of the highly-charged state control is determined based on a charge level of the battery.

(11) The suspension system according to mode (9) or (10), wherein a magnitude of the constant actuator force generated upon execution of the highly-charged state control is determined based on a temperature of the actuator.

In each of the above-described two modes, there is a limitation to the magnitude of constant actuator force. A former one of the two modes corresponds to a mode in which the constant actuator force is generated by a larger magnitude when the charge level of the battery is higher, namely, when the charge level of the battery is closer to the fully-charged state. According to this mode, the electric energy can be emitted from the battery by a larger amount when the charge level of the battery is higher. A latter one of the two modes corresponds to a mode in which the constant actuator force is generated by a smaller magnitude when the temperature of the actuator is higher. With a larger amount of the electric power supplied thereto, the electric motor included in the actuator generates the actuator force by a larger magnitude, and the generation of the larger magnitude of the actuator force leads to generation of a larger amount of heat. Since the electric motor could be damaged when being placed in an overheated state, it is possible to effectively protect the actuator, by reducing the magnitude of the generated constant actuator force when the temperature of the actuator is high.

(12) The suspension system according to any one of modes (9)-(11), being configured such that an electric power generated by the electric motor upon actuation of the actuator caused by an external force is returnable toward the battery, and such that return of the electric power toward the battery is limitable when the battery is in the highly charged state.

The above-described highly-charged-state control can be considered as a control executed for purpose of facilitating discharge of the battery when the battery is in the highly charged state. In view of this purpose of the highly-charged-state control, it is preferable that a limitation is imposed on return of the electric power (generated by the electric motor included in the actuator) to the battery during execution of the highly-charged-state control, as in the present mode. In general, the suspension system is placed in one of two states that is dependent on a relationship between an operational velocity of the electric motor and the magnitude of the actuator force (which relationship is inherent to the electric motor and the actuator). In one of the two states (hereinafter referred to "supplied-electric-basis actuator-force generating state"

where appropriate), the electric motor generates the actuator force based on the electric power supplied thereto from the battery. In the other of the two states (hereinafter referred to as "generated-electric-basis actuator-force generating state" where appropriate), the electric motor generates the actuator force while generating the electric power. In the present mode, while the suspension system is in the generated-electric-basis actuator-force generating state, for example, the electric power generated by the electric motor is inhibited from being returned to the battery, by disconnecting the electric motor and the battery from each other. Further, in this instance, the magnitude of the actuator force can be adapted to a desired value in the generated-electric-basis actuator-force generating state, by controlling a resistance value of a resistor that is interposed between input terminals of the electric motor. It is noted that the present mode encompasses not only a mode in which the return of the electric power to the battery is completely inhibited but also a mode in which the return is restrained, for example, by inhibiting the return when the electric power is regenerated by a large amount, or by reducing an amount of the returned electric power by intervention of a resistor or the like.

(13) The suspension system according to any one of modes (9)-(12), wherein the highly-charged-state control is a control causing the constant actuator force to be generated to act in a direction that is determined based on at least one of a condition of a road surface on which the vehicle runs and a running speed at which the vehicle runs.

The present mode is a mode effective, particularly, to a mode in which the wheel-body distance is changed by the constant actuator force, for example. For example, where the vehicle runs on a bad-conditioned road such as mogul road, it is desirable that the constant actuator force is generated to act in the rebound direction so as to increase the wheel-body distance, namely, so as to increase the vehicle height. Further, for example, where the vehicle runs at a relatively high speed, it is desirable that the constant actuator force is generated to act in the bound direction so as to reduce the wheel-body distance, namely, so as to reduce the vehicle height, in view of stability of the running vehicle. The present mode includes a mode in which the direction of the constant actuator force is determined depending on the condition of the road surface and the running speed, so as to satisfy the above requirements.

(14) The suspension system according to any one of modes (9)-(13), wherein the control device is configured to gradually change the constant actuator force upon transition from a normal control to the highly-charged state control and upon transition from the highly-charged state control to the normal control.

If the constant actuator force is abruptly changed in transition between the constant-force generating state and a state other than the constant-force generating state, the abrupt change increases a possibility that passengers suffer discomfort. In the present mode, it is possible to eliminate or alleviate influence of abrupt change of the constant actuator force. The constant actuator force can be gradually changed by a specific manner that is not particularly limited. For example, in a case in which the actuator is controlled to generate a target constant actuator force that is predetermined, when a difference between an actually generated constant actuator force and the target constant actuator force is not smaller than a predetermined threshold, the constant actuator force can be gradually changed by the actuator controlled to generate a provisional target constant actuator force that is calculated by adding or subtracting a predetermined value to or from the actually generated constant actuator force, wherein the predetermined value is predetermined such that a vehicle operator does not note the change of the actuator force by the predetermined value.

It is noted that the technical feature of the gradual change of the constant actuator force is applicable not only to a stage of transition between the highly-charged state control and a normal state control but also to various stages in the actuator force is abruptly changed. That is, a mode employing the present technical feature in various stages can be a mode of the claimable invention.

(15) The suspension system according to any one of modes (9)-(14),
wherein the suspension spring has a construction permitting a spring rate thereof to be changeable,
and wherein the control device is configured to change the spring rate of the suspension spring, so as to restrain a distance between the vehicle body and the wheel, from being changed by the constant actuator force.

The present mode is effective to the system equipped with the above-described fluid spring such as air spring. This mode makes it possible to effectively eliminate or reduce change of the vehicle height, i.e., change of the wheel-body distance, by changing the spring rate of the spring, when the wheel-body distance is changed by the constant actuator force. The spring-rate changing control of the present mode is advantageous, for example, in the above-described stage of transition between different controls.

(16) The suspension system according to mode (15), wherein a rate of change of the constant actuator force upon increase of the constant actuator force is higher than that upon reduction of the constant actuator force, when the constant actuator force is changed while change of the distance between the vehicle body and the wheel is restrained by change of the spring rate of the suspension spring.

In the fluid spring such as air spring, in general, a larger length of time is required for increase of the wheel-body distance which is made by increasing a fluid amount, than for reduction of the wheel-body distance which is made by reducing the fluid amount. In the present mode, the rate of change of the constant actuator force is changed with account being taken of such a general tendency. According to the present mode, it is possible to effectively restrain the change of the wheel-body distance that is caused by the constant actuator force.

(17) The suspension system according to any one of modes (9)-(16), wherein the control device is configured to limit execution of the highly-charged state control when a temperature of the actuator is high.

As described above, in the constant-force generating state, the electric motor included in the actuator generates a large amount of heat, so that there is a high possibility that the electric motor could be affected by bad influence of the large amount of heat. In the present mode, the bad influence can be effectively eliminated or alleviated. The term "limiting execution of the highly-charged state control" encompasses a mode in which the execution of the highly-charged state control is inhibited when the temperature of the actuator is higher than a threshold and also a mode in which the execution of the highly-charged state control is made for a shortened length of time rather than being completely inhibited.

(18) The suspension system according to any one of modes (9)-(17), wherein the control device is configured to inhibit continuation of execution of the highly-charged state control beyond a predetermined permissible continuation time.

(19) The suspension system according to any one of modes (9)-(18), wherein the control device is configured to inhibit resumption of execution of the highly-charged state control before elapse of a predetermined resumption inhibition time.

Each of the above two modes is a mode in which the execution of the highly-charged state control is limited. As described above, the influence of the heat generated by the electric motor becomes serious when the constant-force generating state is maintained for a large length of time or when the constant-force generating state is established frequently with no substantial time interval. According to each of the above two modes, it is possible to effectively limit a length of time for which the constant-force generating state is established. That is, each of the above two modes is a mode effective to a case where the temperature of the actuator is high. It is noted each of the above-described "predetermined permissible continuation time" and "predetermined resumption inhibition time" may be either a predetermined constant length of time or a changeable length of time that is changeable depending on a parameter such as the temperature of the actuator. It is also noted that the highly-charged state control can be intermittently executed in a mode in which the above two modes are combined to each other.

(20) The suspension system according to any one of modes (9)-(19), wherein the control device is configured to reduce a charge level of the battery by an electric discharger provided in the vehicle, when execution of the highly-charged state control is limited while the battery is in the highly charged state.

In the present mode, the battery can be assuredly discharged even when the discharge of the battery is not carried out by establishment of the constant-force generating state in the highly-charged state. The "electric discharger" recited in the present mode may be provided by a resistor that is connected to the battery so as to consume the electric power of the battery. Further, where the battery functions also as a power source for a drive motor of a hybrid drive system, the "electric discharger" may be provided by an arrangement in which drive of the vehicle by the electric motor is forcedly carried out in place of drive of the vehicle by an engine.

(21) The suspension system according to any one of modes (1)-(20), wherein the control device is configured to limit establishment of the constant-force generating state, when the battery is in a low charged state.

Since the battery is discharged by the establishment of the constant-force generating state, as described above, the establishment of the constant-force generating state during the low-charged state of the battery causes a situation in which the electric energy remaining in the battery is extraordinarily reduced, or could cause even a situation in which the battery is placed in the excessively-discharged state. In the present mode, it is possible to effectively prevent or restrain harm caused by the establishment of the constant-force generating state when the charge level of the battery is low. The term "limiting establishment of the constant-force generating state" is interpreted to mean not only inhibition of the establishment of the constant-force generating state but also reduction of degree of the constant-force generating state such as reduction of the constant actuator force. Further, specifically, it is possible to employ an arrangement in which the establishment of the constant-force generating state is inhibited when the charge level becomes equal to or lower than a threshold (for example, when a parameter indicative of the charge state of the battery becomes equal to or lower than the threshold).

Specifically described, the present mode may be a mode in which adjustment of the vehicle height by the actuator force is limited where the system is configured to enable the vehicle height to be adjusted by the actuator force. Further, where the system is configured to execute a control for restraining roll or pitch of the vehicle body by the right and left actuators or the front and rear actuators that are arranged to generate, as the actuator forces, respective forces that are opposite to each other in a certain length of time, the roll or pitch restraining control can be treated as a control similar to the vehicle height control, i.e., as a control for establishing a semi constant-force generating state, so that execution of the roll or pitch restraining control as well as the vehicle height adjustment is limited.

Since each of the roll restraining control and the pitch restraining control is a control consuming a certain amount of the electric power, the inhibition of the roll or pitch restraining control is effective to restrain consumption of the electric power of the battery, irrespective of whether the establishment of the constant-force generating state is limited or not. Therefore, in the suspension system having the actuator, one mode of the claimable invention may be a mode employing a technical feature that at least one of the roll restraining control and pitch restraining control is inhibited without limitation of the establishment of the constant-force generating state during the low-charged state of the battery.

BRIEF DESCRIPTION OF DRAWINGS

FIG. 6 Graphs showing a relationship between a charge amount of a battery and a gain based on the charge amount of the battery, and a relationship between a temperature of the electric motor and a gain based on the temperature of the electric motor.

FIG. 21 Flow charts showing an electric supply/generation determination & motor operation control sub-routine and an electric-discharger control sub-routine that are executed in the actuator control program.

BEST MODE FOR CARRYING OUT THE INVENTION

There will be described embodiments of the present invention, by reference to the accompanying drawings. It is to be understood that the claimable invention is not limited to the following embodiments, and may be otherwise embodied with various changes and modifications, such as those described in the foregoing "MODES OF THE INVENTION", which may occur to those skilled in the art.

First Embodiment

1. Construction and Function of Suspension System

Figure 1:
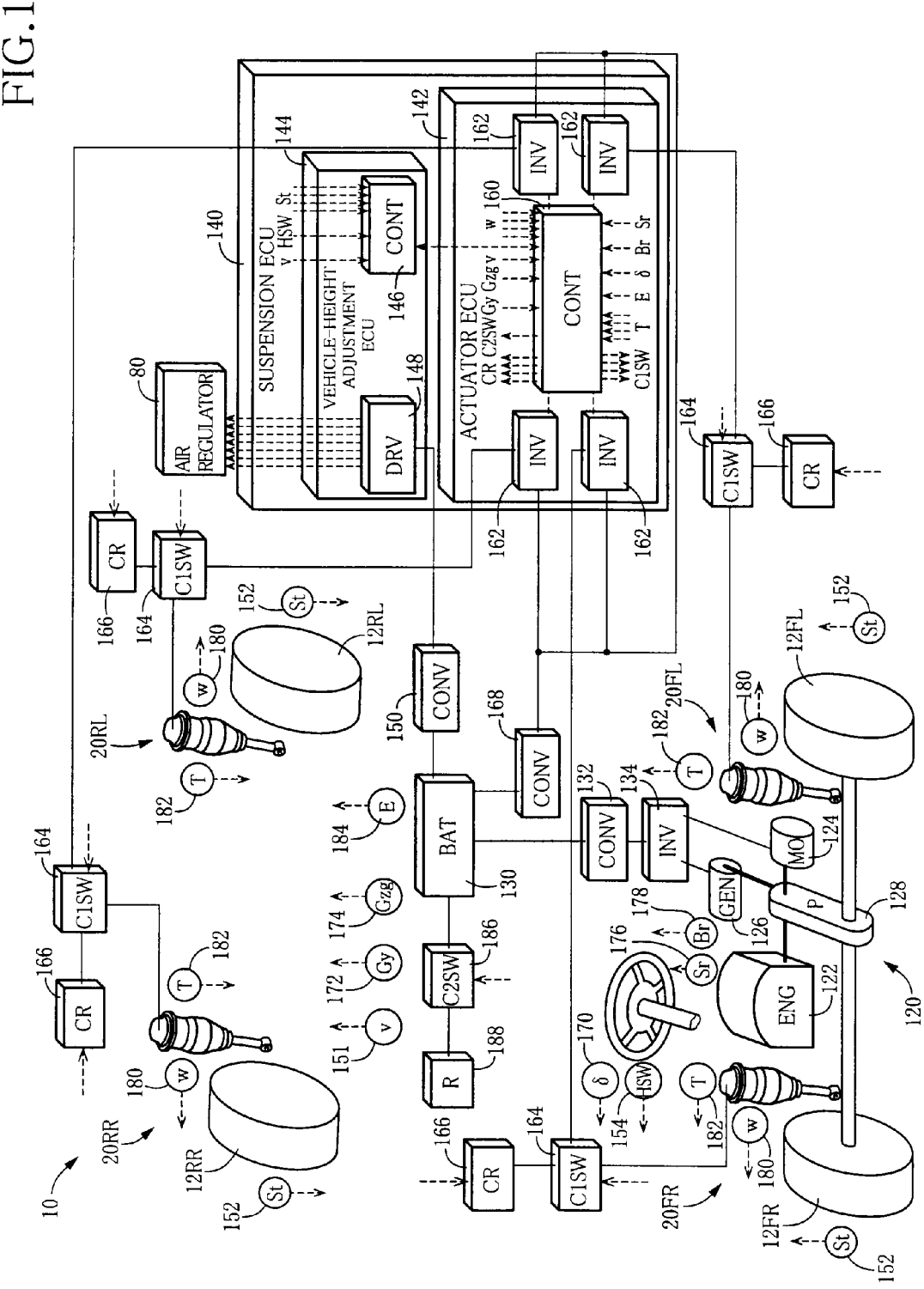
FIG. 1 A schematic view showing an overall construction of a vehicle suspension system of a first embodiment of the invention.

FIG. 1 schematically shows a vehicle suspension system 10 constructed according to a first embodiment of the invention. The suspension system 10 is equipped with four independent suspension devices provided for front right, front left, rear right and rear left wheels 12 of a vehicle. Each of the suspension devices has a spring absorber assembly 20 constituted by a suspension spring and a shock absorber that are integral with each other. In the following description, each of the wheel 12 and spring absorber assembly 20 is referred together with, as a suffix, one of reference signs FR, FL, RR, RL indicative of the respective front right, front left, rear right and rear left wheels, where it should be clarified which one of the four wheels the referred wheel 12 or assembly 20 corresponds to.

Figure 2:
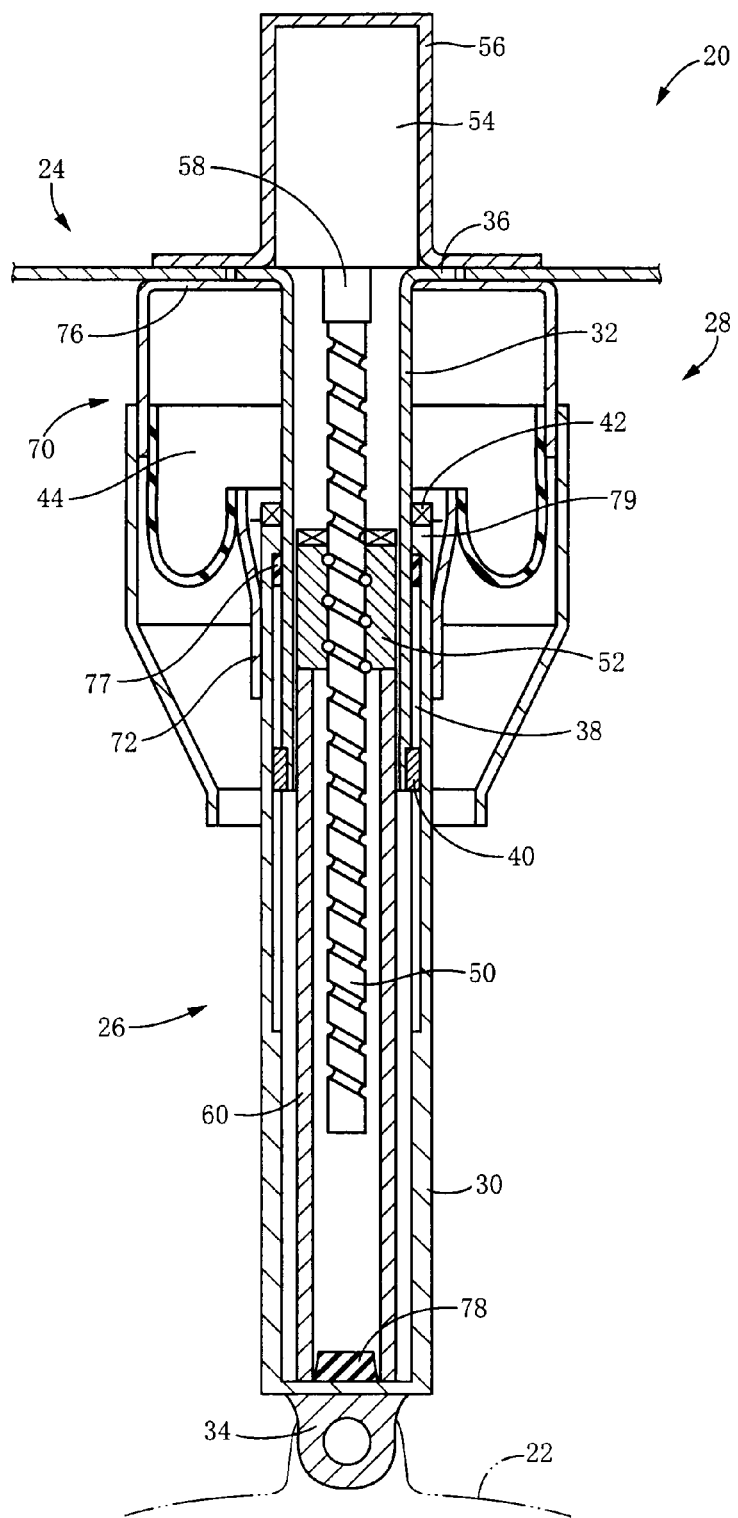
FIG. 2 A front cross sectional view showing a spring absorber assembly incorporated in the vehicle suspension system of the first embodiment.

As shown in FIG. 2, the spring absorber assembly 20 is equipped with an electromagnetic shock absorber in the form of an actuator 26 and a suspension spring in the form of a fluid spring 28 (hereinafter referred to as "air spring" where appropriate since an air is used as a fluid in the present embodiment). The actuator 26 is disposed between a suspension lower arm 22 as a wheel holding member holding the wheel 12 and a mount portion 24 provided in a body of the vehicle, and interconnects the suspension lower arm 22 and the mount portion 24. The fluid spring 28 is disposed in parallel to the actuator 26.

The actuator 26 is constructed to include an outer tube 30 and an inner tube 32 which is fitted in the outer tube 30 and which projects upwardly from an upper end portion of the outer tube 30. The outer tube 30 is connected to the lower arm 22 via an attachment member 34 that is provided in a lower end portion of the outer tube 30. Meanwhile, the inner tube 32 is connected, at a flange portion 36 that is provided in an upper end portion of the inner tube 32, to the mount portion 24. A pair of guide grooves 38 are provided in an inner wall surface of the outer tube 30 so as to extend in a direction (hereinafter referred to as "axial direction" where appropriate) in which an axis of the actuator 26 extends. A pair of keys 40, which are provided in a lower end portion of the inner tube 32, are fitted in the respective guide grooves 38. Owing to the guide grooves 38 and the keys 40, the outer tube 30 and the inner tube 32 are unrotatable relative to each other and movable relative to each other in the axial direction. It is noted that a seal 42 is provided in an upper end portion of the outer tube 30, for thereby preventing leakage of air from a pressure chamber 44 that is described below.

Further, the actuator 26 is equipped with a ball screw mechanism and an electric motor 54 (which is a three-phase DC brushless motor and which will be hereinafter simply referred to as "motor 54" where appropriate). The ball mechanism is constructed to include a screw rod 50 and a nut 52. The screw rod 50 has an external thread formed therein, and is engaged with the nut 52 such that bearing balls are held between the screw rod 50 and the nut 52. The motor 54 is fixedly held in a motor casing 56, which is fixed at its flange portion to an upper surface of the mount portion 24. The flange portion of the motor casing 56 is fixed to the flange portion 36 of the inner tube 32 so that the inner tube 32 is connected to the mount portion 24 through the motor casing 56. A motor shaft 58 as a rotary shaft of the motor 54 is integrally connected to an end portion of the screw rod 50. That is, the screw rod 50 serves as an extension of the motor shaft 58 so as to be rotated by the motor 54, and is disposed within the inner tube 32. Meanwhile, the nut 52, which is engaged with the screw rod 50, is fixedly held by an upper end portion of a nut support sleeve 60 that is disposed on an inner bottom wall surface of the outer tube 30.

The air spring 28 is equipped with: a housing 70 fixed to the mount portion 24; an air piston 72 fixed to the outer tube 30 of the actuator 26; and a diaphragm 74 interconnecting the housing 70 and the air piston 72. The housing 70 has a generally tubular shape with a lid portion 76. The inner tube 32 of the actuator 26 passes through a hole that is formed through the lid portion 76. The housing 70 is fixed at an upper surface of the lid portion 76 to a lower surface of the mount portion 24. The air piston 72 has a generally tubular shape, and is fixed to an upper portion of the outer tube 30 that is fitted in the air piston 72. The housing 70 and the air piston 72 is connected to each other via the diaphragm 74 that provides an air tightness between the housing 70 and the air piston 72, so that a pressure chamber 44 is defined by cooperation of the housing 70, air piston 72 and diaphragm 74. The pressure chamber 44 is filled with a compressed air. The thus constructed air spring 28 elastically supports the lower arm 22 and the mount portion 24, i.e., the wheel 12 and the vehicle body, owing to an elastic force of the compressed air.

When the vehicle body and the wheel 12 are moved toward or away from each other, the outer tube 30 and the inner tube 32 are moved relative to each other in the axial direction. As a result of the relative movement, the screw rod 50 and the nut 52 are moved relative to each other in the axial direction, and the screw rod 50 is rotated relative to the nut 52. The motor 54 is arranged to be capable of applying a rotational torque to the screw rod 50. Owing to the rotational torque, it is possible to generate a resistance force acting in a direction that inhibits movement of the vehicle body and the wheel 12 toward and away from each other. This resistance force serves as a damping force against the movement of the vehicle body and the wheel 12 toward and away from each other, so that the actuator 26 functions as a shock absorber. That is, the actuator force acting in directions forcing the vehicle body and the wheel 12 to be moved toward and away from each other can serve as the damping force. Further, the actuator 26 has also a function of moving the wheel body and the wheel 12 toward and away from each other by the actuator force. Owing to this function, it is possible to effectively restrain roll of the vehicle body upon cornering of the vehicle and pitch of the vehicle body upon acceleration and deceleration of the vehicle.

An annular-shaped damper rubber 77 is bonded to an upper end of an inner wall surface of the outer tube 30. Further, another damper rubber 78 is bonded to the inner bottom wall surface of the outer tube 30. When the vehicle body and the wheel 12 is moved in a direction (hereinafter referred to as "rebound direction" where appropriate) away from each other by a certain distance, the keys 40 are brought into contact with a marginal portion 79 of the outer tube 30 via the damper rubber 77. When the vehicle body and the wheel 12 is moved in a direction (hereinafter referred to as "bound direction" where appropriate) toward each other by a certain distance, a lower end of the screw rod 50 is brought into contact with the inner bottom wall surface of the outer tube 30 via the damper rubber 78. That is, the spring absorber assembly 20 has stoppers (i.e., bound stopper and rebound stopper) against movement of the wheel 12 and the vehicle body toward and away from each other.

Figure 3:
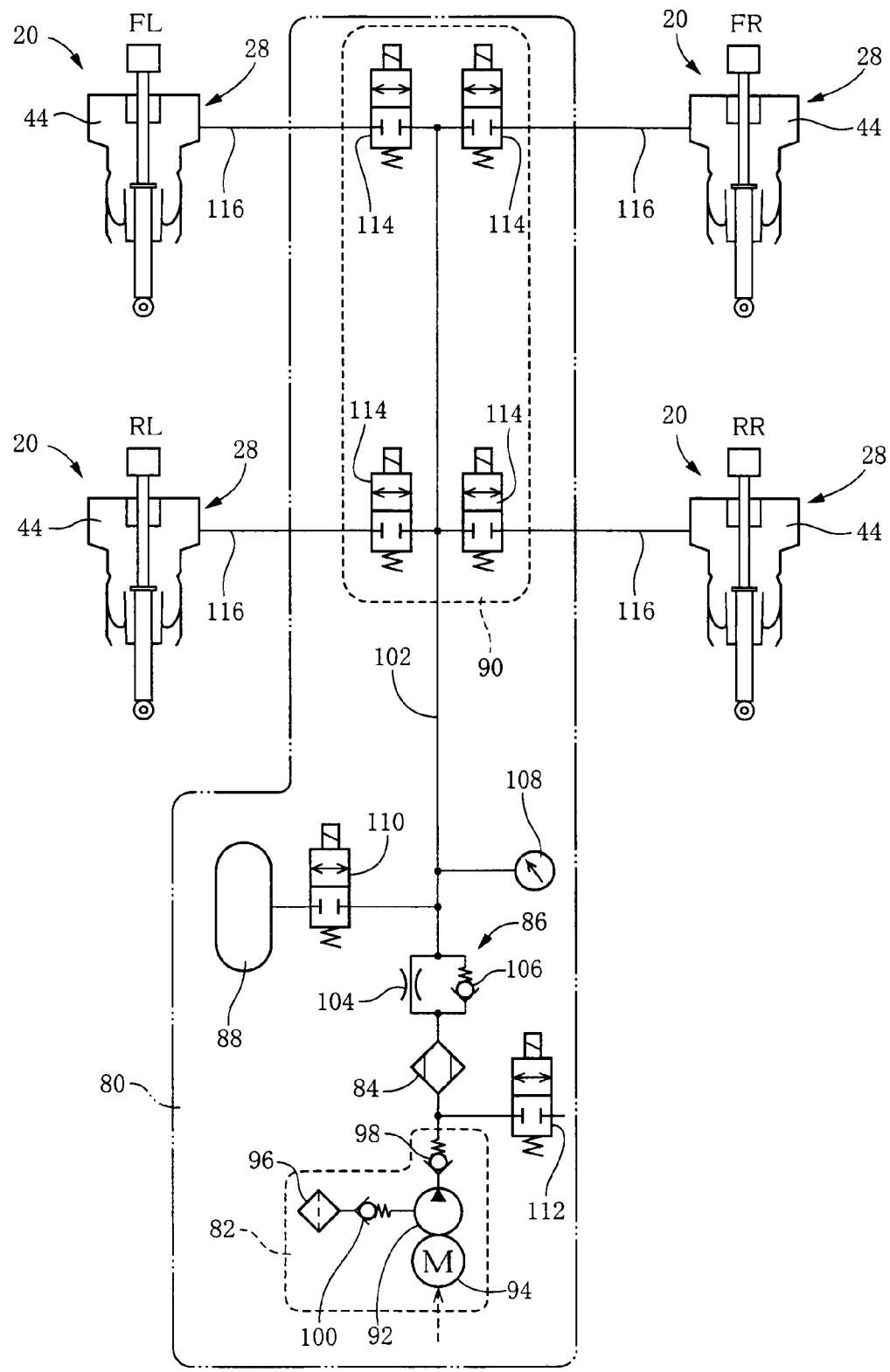
FIG. 3 A schematic view showing an air regulator and the spring absorber assembly incorporated in the vehicle suspension system of the first embodiment.

The suspension system 10 is equipped with an air regulator 80 which is connected to the pressure chamber 44 of the air spring 28 of each spring absorber assembly 20 and which is configured to regulate an amount of air stored in the pressure chamber 44. As shown in FIG. 3, the air regulator 80 is constructed to include a compressor 82, a dryer 84, a flow restrictor 86, a high-pressure tank 88 and an individual control valve device 90. The compressor 82, which is equipped with a pump 92, a pump motor 94, a filter 96 and check valves 98, 100, is configured to suck the air from an atmosphere via the filter 96 and the check valve 100 by operation of the pump motor 94, so that the sucked air is pressurized and then emitted via the check valve 98. The compressor 82 and the individual control valve device 90 are connected to each other via a common passage 102. To the common passage 102, there are connected the above-described dryer 84 configured to remove water from the compressed air, the above-described flow restrictor 86 having a throttle valve 104 and a check valve 106 that are disposed in parallel with each other, and a pressure sensor 108 configured to detect an air pressure within the common passage 102. Further, the high-pressure tank 88 is connected to the common passage 102 via an accumulated-pressure control valve 110 that is provided by a normally-closed electromagnetic control valve. Moreover, to the common passage 102, there is connected an exhaust control valve 112 which is provided by a normally-closed electromagnetic control valve and which is disposed between the check valve 98 and the drier 84. The individual control valve device 90 is equipped with individual control valves 114 which are provided by respective four normally-closed electromagnetic control valves and which are connected to the respective pressure chambers 44 of the respective spring absorber assembly 20. The individual control valves 114 are disposed on respective individual passages 116 that interconnect the common passage 102 and the respective pressure chambers 44 of the respective air springs 28 of the respective suspension devices.

According to the above-described construction, in the present suspension system 10, the amount of the air stored in the pressure chamber 44 of the air spring 28 can be changed by the air regulator 80, so that the air spring 28 has a spring rate that is changeable by changing the air amount within the pressure chamber 44. The spring rate is a ratio of a load acting on the air spring 28 to a distance (hereinafter referred to as "wheel-body distance" where appropriate) between the wheel 12 and the vehicle body 24 that are elastically connected to each other via the air spring 28. By changing the spring rate, it is possible to change the wheel-body distance. Specifically described, the spring rate is reduced by increasing the air amount within the pressure chamber 44, whereby the wheel-body distance can be increased. On the other hand, the spring rate is increased by reducing the air amount within the pressure chamber 44, whereby the wheel-body distance can be reduced.

As shown in FIG. 1, the present suspension system 10 is installed in the vehicle in which a hybrid drive system 120 is employed as a drive system. The hybrid drive system 120 is constructed to include an engine 122, a drive motor 124 provided by an electric motor, a generator 126 and a power divider 128 (which are respectively represented by "ENG", "MO", "GEN" and "P" in FIG. 1). In the present hybrid drive system 120, the front wheels 12FR, 12FL as drive wheels are driven by at least one of the engine 122 and the drive motor 124 via the power divider 128, depending on running state of the vehicle. Upon driving by the drive motor 124, the electric power is supplied to the drive motor 124 from a battery 130 as an electric power source via a converter 132 and an inverter 134 as a drive circuit. Upon braking, the rotation of each of the drive wheels 12FR, 12FL is transmitted to the drive motor 124 via the power divider 126 so that the drive motor 124 is rotated so as to function as a generator and the electric power generated by the drive motor 124 is returned to the battery 130. Further, when the generator 126 is operated by the engine 122 via the power divider 128, the battery 130 is charged with the electric power that is generated by the generator 126. It is noted that the converter 132 is provided by a bilateral converter that allows an electric current to pass therethrough in bilateral directions. The converter 132 is capable of increasing voltage of the electric power that is supplied from the battery 130 so that the electric power is supplied from the battery 130 to the drive motor 124, and is capable of reducing the voltage of the electric power so that the electric power is returned to the battery 130 from the drive motor 124.

Further, the present suspension system 10 is provided with a suspension electronic control unit (suspension ECU) 140 as a control device for controlling operation of the spring absorber assembly 20. This suspension ECU 140 is equipped with an actuator electronic control unit (actuator ECU) 142 as a control device for controlling the actuator force, i.e., operation of the actuator 26, and a vehicle-height adjustment electronic control unit (vehicle-height adjustment ECU) 144 as a control device for controlling the air regulator 80, i.e., operation of the air spring 28. The vehicle-height adjustment ECU 144 has a controller 146 constituted principally by a computer that is equipped with CPU, ROM, RAM and the like, and a driver 148 as a drive circuit of the air regulator 80. To the control valves 114 and the other elements included in the air regulator 80, the electric power is supplied via the drive 148 and the converter 150. To the controller 146, there are connected a vehicle speed sensor 151 for detecting a vehicle running speed (hereinafter abbreviated as "vehicle speed" where appropriate), four stroke sensors 152 each configured to detect a distance between a corresponding one of the wheels 12 and the vehicle body 24, and a vehicle-height changing switch 154 operable by the vehicle operator for changing the vehicle height. The vehicle speed sensor 151, stroke sensors 152 and vehicle-height changing switch 154 are respectively represented by "v", "St" and "HSw" in FIG. 1. The ROM included in the computer of the controller 146 stores therein programs relating to the vehicle-height adjustment and also various kinds of data. In the present suspension system 10, the vehicle operator can select from among three vehicle height levels, i.e., a predetermined standard vehicle height (Mid vehicle height), a predetermined high vehicle height (Hi vehicle height) that is set to be higher than the predetermined standard vehicle height, and a predetermined low vehicle height (Low vehicle height) that is set to be lower than the predetermined standard vehicle height, so that a desired one of the three vehicle height levels is selected in response to operation of the vehicle-height changing switch 154 that is made by the vehicle operator. This vehicle-height changing switch 154 is configured to issue a vehicle-height increasing command or a vehicle-height reducing command, namely, issue a command for stepwise shifting from one of the vehicle height levels to a higher or lower one of the vehicle height levels.

On the other hand, the actuator ECU 142 has a controller 160 constituted principally by a computer that is equipped with CPU, ROM, RAM and the like, and an inverter 162 as a drive circuit for the motor 54 that is included in the actuator 26 of each spring absorber assembly 20. Each motor 54 is connected via a first change-over switch 164 (which is represented by "C1S$_W$" in FIG. 1) to a selected one of a variable resistor device 166 having a variable resistance value and the inverter 162 connected to the battery 130 via the converter 168. Like the above-described converter 132, the converter 168 is provided by a bilateral converter that allows an electric current to pass therethrough in bilateral directions. The controller 160 is connected to the inverter 162, first change-over switch 164 and variable resistor device 166, which are controlled by the controller 160 whereby the actuator force of the actuator 26 is controlled. Since the electric motor 54 is driven by a constant voltage, an amount of the electric power supplied to the electric motor 54 is changed by changing an amount of electric current supplied to the electric motor 54. That is, the force generated by the electric motor 54 is dependent on the amount of the supplied electric current, which can be changed, for example, by a PWM (pulse width modulation) control performed by the inverter 162. In the PWM control, the inverter 162 is arranged to suitably control a duty ratio, i.e., a ratio of pulse ON time to pulse OFF time. To the controller 160, there are connected an operating angle sensor 170, a lateral acceleration sensor 172, a longitudinal acceleration sensor 174, a throttle sensor 176, a brake pressure sensor 178, an angular position sensor 180, a temperature sensor 182 and a charge level sensor 184 in addition to the above-described vehicle speed sensor 151. The operating angle sensor 170 is provided for detecting an operating angle of a steering wheel. The lateral acceleration sensor 172 is provided for detecting an actual acceleration of the vehicle body as measured in the lateral direction of the vehicle. The longitudinal acceleration sensor 174 is provided for detecting the actual acceleration of the vehicle body as measured in the longitudinal direction of the vehicle. The throttle sensor 176 is provided for detecting an opening angle of an accelerator throttle valve. The brake pressure sensor 178 is provided for detecting a pressure in a brake master cylinder. The angular position sensor 180 is provided for detecting an angular position of the motor 54. The temperature sensor 182 is provided for detecting a temperature of the motor 54. The charge level sensor 184 is provided for detecting a charge level of the battery 130. In FIG. 1, the operating angle sensor 170 is represented by "δ", the lateral acceleration sensor 172 is represented by "Gy", the longitudinal acceleration sensor 174 is represented by "Gzg", the throttle sensor 176 is represented by "Sr", the brake pressure sensor 178 is represented by "Br", the angular position sensor 180 is represented by "ω", the temperature sensor 182 is represented by "T", and the charge level sensor 184 is represented by "E". The ROM included in the computer of the controller 160 stores therein programs relating to below-described control of the actuator force and also various kinds of data. It is noted that the controller 146 and the controller 160 can be brought into communication with each other. It is also noted that the battery 130 is selectively connected to a below-described discharging resistor device 188 (that is represented by "R" in FIG. 1) via a second change-over switch 186 (that is represented by "C2S$_W$" in FIG. 1).

2. Control of Suspension System

In the present suspension system 10, the four actuators 26 can be controlled independently of each other. That is, the actuator forces generated by the respective actuators 26 are controlled independently of each other, for thereby executing a control (hereinafter referred to as "vibration damping control" where appropriate) for damping relative vibration of the wheel and the vehicle body, a control (hereinafter referred to as "roll restraining control" where appropriate) for restraining roll of the vehicle body and a control (hereinafter referred to as "pitch restraining control" where appropriate) for restraining pitch of the vehicle body. Further, a control (hereinafter referred to as "vehicle-height adjusting control") is executed by the air spring 28, for adjusting the wheel-body distance. The above-described vibration damping control, roll restraining control and pitch restraining control are executed by causing the actuator forces to cooperate with each other to act as a damping force, a roll restraining force and a pitch restraining, respectively. Described specifically, each actuator 26 is controlled to generate a target actuator force whereby the vibration damping control, roll restraining control and pitch restraining control are executed in a unified manner. The target actuator force that is to be generated is predetermined such that the target actuator force corresponds to a sum of a vibration-damping-directed actuator-force component, roll-restraining-directed actuator-force component and pitch-restraining-directed actuator-force component that are actuator forces directed to the respective vibration damping control, roll restraining control and pitch restraining control. Further, the vehicle-height adjusting control is executed by controlling the air regulator 80 that is configured to change the air amount of the air spring 28. Hereinafter, there will be provided a detailed description as to the vibration damping control, roll restraining control and pitch restraining control, particularly, methods of determining actuator force components directed to the respective controls, together with a detailed description as to the control of operation of the motor 54 for controlling the actuator force generated by the motor 54. Moreover, there will be provided a detailed description as to the vehicle-height adjusting control, particularly, operation of the air regulator 80. In the following description, each of the actuator force and the components of the actuator force takes a positive value when it acts in the rebound direction, and takes a negative value when it acts in the bound direction.

i) Vibration Damping Control

According to the vibration damping control, a vibration-damping-directed actuator-force component $F_G$ is determined so as to generate the actuator force whose magnitude depends on a velocity of the relative vibration of the wheel and the vehicle body. Specifically, the vibration-damping-directed actuator-force component $F_G$ is calculated based on a rotational velocity V of the motor 54 which serves as an index value of relative velocity of the wheel and the vehicle body and which is obtained from a value detected by the angular position sensor 180 provided in the motor 54, and according to the following expression:

$$F_G = C \cdot V \text{ (C: damping coefficient).}$$

It is noted that the vibration-damping-directed actuator-force component $F_G$ may be determined according to another method. For example, the vibration-damping-directed actuator-force component $F_G$ may be determined based on a vibration velocity Vu of the vehicle body (that is calculated based on a vertical acceleration of the vehicle body detected by a vertical acceleration sensor provided in the mount portion of the vehicle body) and a vibration velocity $V_L$ of the wheel (that is calculated based on a vertical acceleration of the wheel detected by a vertical acceleration sensor provided in the wheel holding member), and according to the following expression:

$$F_G = C_U \cdot V_U - C_L \cdot V_L \text{ ($C_U$, $C_L$: damping coefficient).}$$

ii) Roll Restraining Control

According to the roll restraining control, upon turning of the vehicle, depending on a roll moment caused by the turning, each of the actuators 26 provided for inside wheels (i.e., ones of the wheels that are positioned between a center of the turning of the vehicle and the other wheels) is controlled to generate, as the roll restraining force, the actuator force acting in the bound direction, while each of the actuators 26 provided for outside wheels is controlled to generate, as the roll restraining force, the actuator force acting in the rebound direction. Described specifically, a parameter lateral acceleration Gy* (that is used as a parameter in the control) is determined, on the basis of an estimated lateral acceleration Gyc estimated based on the operating angle δ of the steering wheel and the running speed V of the vehicle and also an actually measured lateral acceleration Gyr, and according to the following expression:

$$Gy^* = K_A \cdot Gyc + K_B \cdot Gyr \text{ ($K_A$, $K_B$: gains).}$$

The roll-restraining-directed actuator-force component $F_R$ is determined based on the parameter lateral acceleration Gy* that is determined as described above. The controller 160 stores therein a data map indicative of relationship between the roll-restraining-directed actuator-force component $F_R$ and the parameter lateral acceleration Gy*, so that the roll-restraining-directed actuator-force component $F_R$ is determined with reference to the data map.

iii) Pitch Restraining Control

According to the pitch restraining control, upon braking of the vehicle causing front-end dive of the vehicle body, in response to a pitch moment caused by the front-end dive, each of the actuators 26FR, 26FL provided for front wheels is controlled to generate the actuator force acting in the rebound direction, while each of the actuators 26RR, 26RL provided for rear wheels is controlled to generate the actuator force acting in the bound direction, for thereby restraining the front-end dive of the vehicle body. Upon acceleration of the vehicle causing rear-end squat of the vehicle body, in response to a pitch moment caused by the rear-end squat, each of the actuators 26RR, 26RL provided for the rear wheels is controlled to generate the actuator force acting in the rebound direction, while each of the actuators 26FR, 26FL provided for the front wheels is controlled to generate the actuator force acting in the bound direction, for thereby restraining the rear-end squat of the vehicle body. Specifically, an actually measured longitudinal acceleration Gzg is employed as an index of the pitch moment acting on the vehicle body, and the pitch-restraining-directed actuator-force component $F_P$ is determined based on the actually measured longitudinal acceleration Gzg and according to the following expression:

$$F_P = Kc \cdot Gzg \text{ (Kc: gain).}$$

iv) Control of Actuator Force and Operation of Motor

When the vibration-damping-directed actuator-force component $F_G$, roll-restraining-directed actuator-force component $F_R$ and pitch-restraining-directed actuator-force component $F_P$ are determined as described, the target actuator force $F_A$ is determined according to the following expression:

$$F_A = F_G + F_R + F_P.$$

Figure 4:
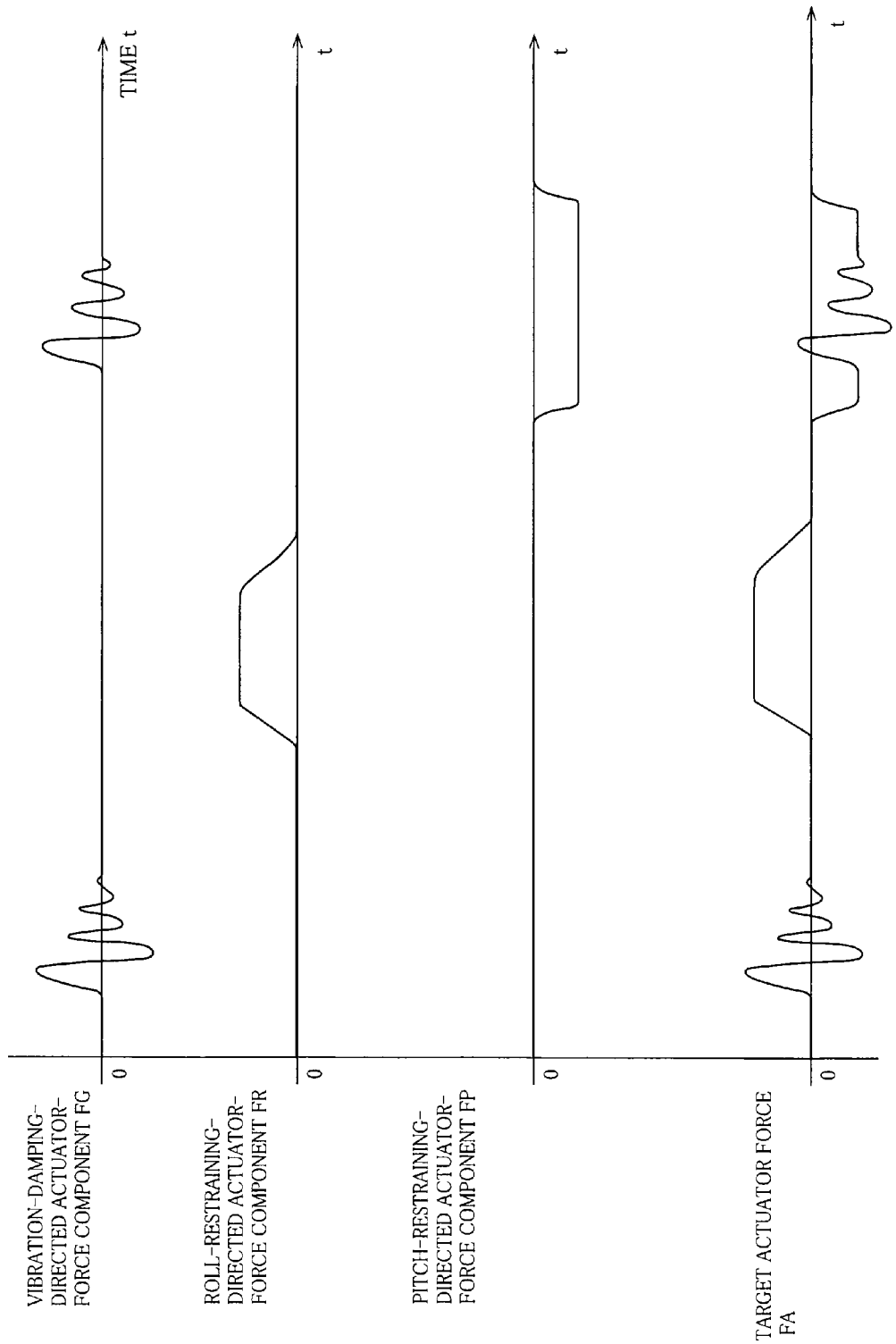
FIG. 4 A chart showing occurrence of vibration-damping-directed actuator-force component, roll-restraining-directed actuator-force component and pitch-restraining-directed actuator-force component upon running of the vehicle and change of a target actuator force as a sum of these components, in relation with elapsed time indicated along abscissa of the chart.

The actuator 26 is controlled to generate the thus determined target actuator force $F_A$. FIG. 4 is a chart schematically showing occurrence of the vibration-damping-directed actuator-force component $F_G$, roll-restraining-directed actuator-force component $F_R$ and pitch-restraining-directed actuator-force component $F_P$ upon running of the vehicle and change of the target actuator force $F_A$ as a sum of these components, in relation with elapsed time t indicated along abscissa of the chart. As is apparent from FIG. 4, the vibration damping control, roll restraining control and pitch restraining control are executed independently of each other depending on a situation. When the controls are concurrently executed, the target actuator force $F_A$ generated by the actuator 26 corresponds to a sum of the components directed to the concurrently executed controls.

The motor 54 is operated to generate the target actuator force $F_A$, and the operation of the motor 54 is controlled by the inverter 162. Described in detail, the controller 160 outputs a control signal causing the motor 54 to generate the target actuator force $F_A$, and the outputted control signal is supplied to the inverter 162 so that the operation of the motor 54 is controlled by the inverter 162. Specifically, each of switching elements included in the inverter 162 is placed in one of ON and OFF states based on the angular position of the motor 54 in such a manner that establishes a desired pattern and a desired duty ratio, wherein the desired patter corresponds to a direction in which the target actuator force $F_A$ is to act while the desired duty ratio corresponds to a magnitude by which the target actuator force $F_A$ is to be generated. In this instance, a value detected by the angular position sensor 180 is employed as the angular position of the motor 54 based on which each of the switching elements included in the inverter 162 is placed in one of ON and OFF states.

Figure 5:
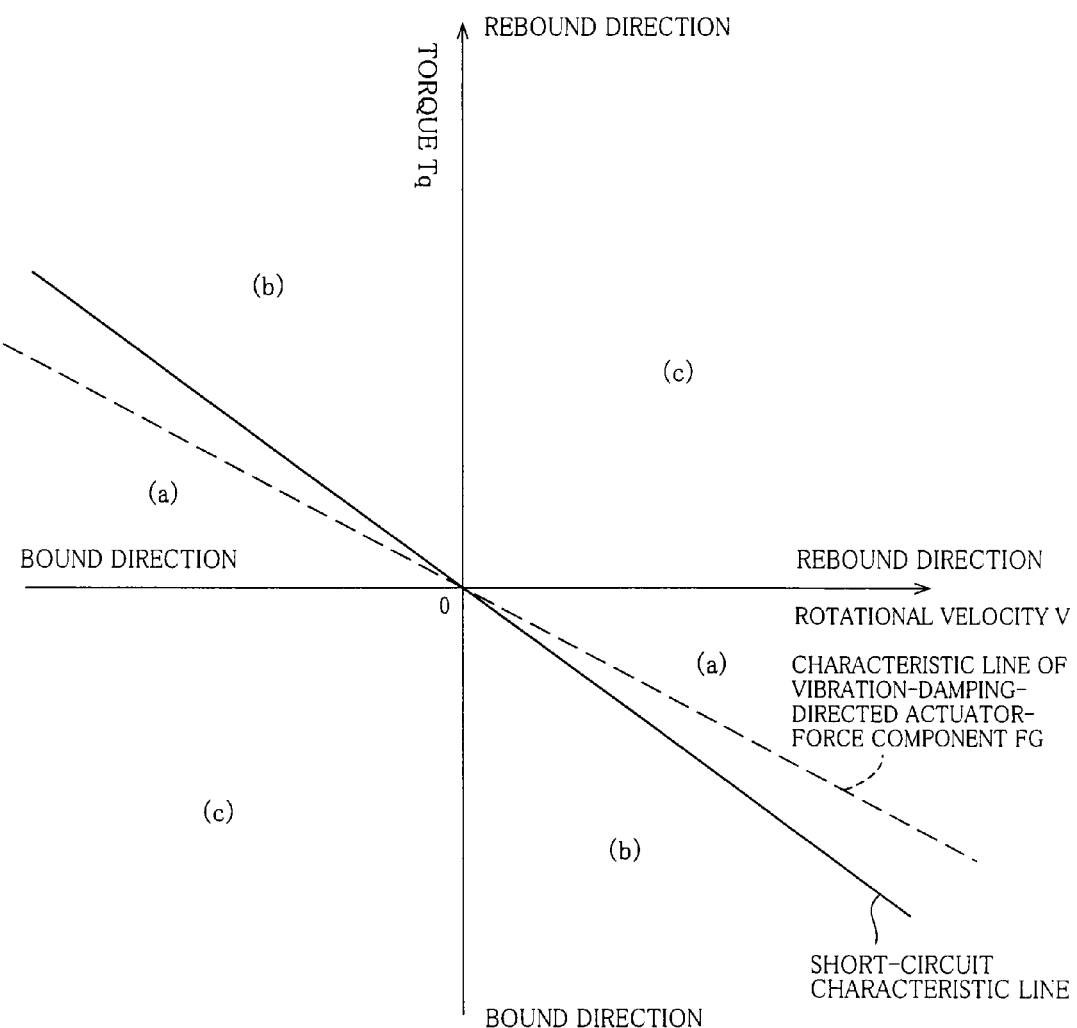
FIG. 5 A graph showing relationship between a rotational velocity and a torque of an electric motor.

As an operational state of the motor 54, there are two states, in one (hereinafter referred to "supplied-electric-basis actuator-force generating state" where appropriate) of which the motor 54 receives the electric power from the battery 130 and generates the actuator force, and in the other (hereinafter referred to as "generated-electric-basis actuator-force generating state" where appropriate) of which the motor 54 generates the actuator force while generating the electric power. The motor 54 is placed in one of the two operational states that is determined depending on a relationship between the rotational velocity of the motor 54 and the actuator force. FIG. 5 conceptually shows a relationship between the rotational velocity V of the motor 54 and a torque Tq of the motor 54 corresponding to the actuator force. In FIG. 5, each of regions (a) and (b) is a region in which the torque Tq is generated to act in a direction that is opposite to the direction of rotation of the motor 54, while a region (c) is a region in which the torque Tq is generated to act in the same direction as the direction of rotation of the motor 54. A boundary between the regions (a) and (b) is provided by a short-circuit characteristic line that corresponds to a characteristic line representative of characteristic in case of short-circuit among input terminals of respective phases of the motor, i.e., a characteristic line representative of relationship between the rotational velocity V of the motor 54 and an amount of the torque Tq in case of a so-called short-circuit brake. The region (a), in which an absolute value of the torque Tq is smaller than that in this short-circuit characteristic line, is a so-called regenerative braking region in which the motor 54 functions as a generator so as to generate a braking torque based on an electromotive force while being capable of returning the generated electric power to the power source. Meanwhile, the region (b), in which the absolute vale of the torque Tq is larger than that in the short-circuit characteristic line, is a so-called reverse-rotation braking region in which the motor 54 receives the electric power supplied from the power source so as to generate the braking torque. Further, the region (c) is a region in which the motor 54 receives the electric power supplied from the power source so as to be rotated or generate a torque assisting the rotation of the motor 54.

As is understood from the above expression for determining the vibration-damping-directed actuator-force component $F_G$, the component $F_G$ is determined by the linear equation whose parameter is the rotational velocity V of the motor 54. The above expression for determining the vibration-damping-directed actuator-force component $F_G$ can be represented by a characteristic line indicated by broken line in the graph of FIG. 5. The damping coefficient C of the above expression stands for an inclination of the characteristic line, and the value of the inclination is smaller than that of an inclination of the above short-circuit characteristic line. Therefore, the characteristic line of the vibration-damping-directed actuator-force component $F_G$ exists in the above-described region (a), so that the actuator force is generated exclusively in the generated-electric-basis actuator-force generating state when the actuator 26 executes only the vibration damping control. On the other hand, each of the roll restraining control and pitch restraining control is a control is a control executed for the actuator force that is not based on the rotational velocity V of the motor 54. In the roll restraining control and pitch restraining control, differently from in the vibration damping control, the actuator force is generated by a relatively large magnitude even while the rotational velocity V of the motor 54 is not so high. Therefore, when only the roll restraining control and pitch restraining control are executed, the motor 54 generates the force substantially in the above-described region (b) or region (c), so that the actuator 26 generates the actuator force in the supplied-electric-basis actuator-force generating state. When the vibration damping control is executed concurrently with the roll restraining control and pitch restraining control, the motor 54 generates the force in one of the regions (a)-(c), depending on the relationship between the actuator force and the rotational velocity V of the motor 54 at the moment, so that the actuator 26 generates the actuator force in one of the supplied-electric-basis actuator-force generating state and the generated-electric-basis actuator-force generating state.

v) Vehicle-Height Adjusting Control

In the vehicle-height adjusting control, the vehicle height is adjusted, with the amount of air stored in the pressure chamber 44 of the air spring 28 being adjusted based on a relationship between the an actual vehicle height and a set vehicle height that is set, in principle, based on intention of the vehicle operator. Described in detail, a set wheel-body distance, which is set depending on the set vehicle height, is stored in the controller 146, and the set wheel-body distance and the actual wheel-body distance detected by the stroke sensor 152 are compared. Upon the vehicle height adjustment (hereinafter referred to as "vehicle-height increasing adjustment" where appropriate) carried out when the vehicle height requires to be increased, the pump motor 94 is operated with the accumulated-pressure control valve 110 being open, and the compressed air is caused to flow into the pressure chamber 44 via the individual passage 116 by opening the individual control valve 114. This state is maintained until the actual vehicle height reaches the target vehicle height, and the individual control valve 114 and the accumulated-pressure control valve 110 are closed when the actual vehicle height reaches the target vehicle height. On the other hand, upon the vehicle height adjustment (hereinafter referred to as "vehicle-height reducing adjustment" where appropriate) carried out when the vehicle height requires to be reduced, the exhaust control valve 112 and the individual control valve 114 are opened whereby the compressed air is discharged from the pressure chamber 44 toward the atmosphere. This state is maintained until the actual vehicle height reaches the target vehicle height, and the exhaust control valve 112 and the individual control valve 114 are closed when the actual vehicle height reaches the target vehicle height. Further, upon the vehicle height adjustment (hereinafter referred to as "vehicle-height maintaining adjustment" where appropriate) carried out when the vehicle height does not require to be changed, the accumulated-pressure control valve 110, exhaust control valve 112 and individual control valve 114 are all closed. The above-described vehicle-height increasing adjustment and vehicle-height reducing adjustment are inhibited from being executed when certain inhibiting conditions are satisfied. Described specifically, the inhibiting conditions are that the roll moment and/or pitch moment act/acts on the vehicle body, that the relative vibration of the vehicle body and the wheel is generated, and that the wheel-body distances in the respective wheels are not substantially equal to one another. The vehicle-height increasing adjustment and vehicle-height reducing adjustment are inhibited from being executed when at least one of the above-specified conditions is satisfied. It is noted that the operation of the pump motor 94 is controlled such that the air pressure in the high-pressure tank 88, i.e., the air pressure in the common passage 102 detected by the pressure sensor 108, is equalized to a set pressure (that is set to a level enabling operation for increasing the vehicle height).

3. Highly-Charged State Control

In the vehicle incorporating the present suspension system 10 installed therein, the hybrid drive system 120 is installed with the arrangement enabling the electric power to be returned to the battery 130 from the drive motor 124 and the engine 122 as drive power sources, as described above. In this arrangement, there is a case in which the battery 130 is placed in a highly-charged state as its charge state. In this case, an electric energy accumulated in the battery 130 requires to be emitted for avoiding the battery 130 from being placed into an excessively charged state. In the present suspension system 10, the above-described controls are executed as a normal state control when the battery 130 is not in the highly-charged state as the charge state. However, when the charge state of the battery 130 is the highly-charged state, a highly-charged state control is executed such that the actuator force is constantly generated in a forced manner so as to consume the electric power of the battery 130.

i) Control of Actuator in Highly-Charged State Control

In the highly-charged state control, when the charge state of the battery 130 is the highly-charged state, in principle, a constant-force generating state is established, namely, a state in which a constant actuator force (hereinafter simply referred to as "constant force" where appropriate) is generated is established. Specifically described, the target actuator force $F_A$, which is to be generated in the highly-charged state control, corresponds to the sum of the vibration-damping-directed actuator-force component $F_G$, roll-restraining-directed actuator-force component $F_R$ and pitch-restraining-directed actuator-force component $F_P$ plus a constant-force component $F_K$ directed to generate the constant force. That is, in the highly-charged state control, the target actuator force $F_A$ is determined according to the following expression:

$$F_A = F_G + F_R F_P + F_K.$$

The actuator 26 is controlled such that this target actuator force $F_A$ is generated. It is noted that, in all the actuators 26 for the respective wheels 12, the constant-force component $F_K$ is set to constitute a force acting in the rebound direction.

Like the roll restraining force and pitch restraining force, the above-described constant force is an actuator force that is not dependent on the rotational velocity V of the motor 54. Further, the constant force is a force that could change the wheel-body distance such that the wheel-body distance in the highly-charged state control is different from the wheel-body distance in the normal state control by a certain amount. Therefore, when the vibration damping control is not being executed, the motor 54 hardly generates the force in the region (a) of FIG. 5, and accordingly the actuator 26 generates the actuator force in the supplied-electric-basis actuator-force generating state. In the highly-charged state control, in most of time, the electric power is supplied from the battery 130 to the motor 54, whereby the electric power of the battery 130 is effectively consumed.

The above-described constant-force component $F_K$ is not always constant in its magnitude, but is determined based on the temperature of the actuator 26, i.e., the temperature of the motor 54, the charge level of the battery 130 and a time lapse from a point of time of initiation of the highly-charged state control, and according to the following expression:

$$F_K = K_E \cdot K_T \cdot f_S(t_S) \cdot F_{K0}$$

Figure 7:
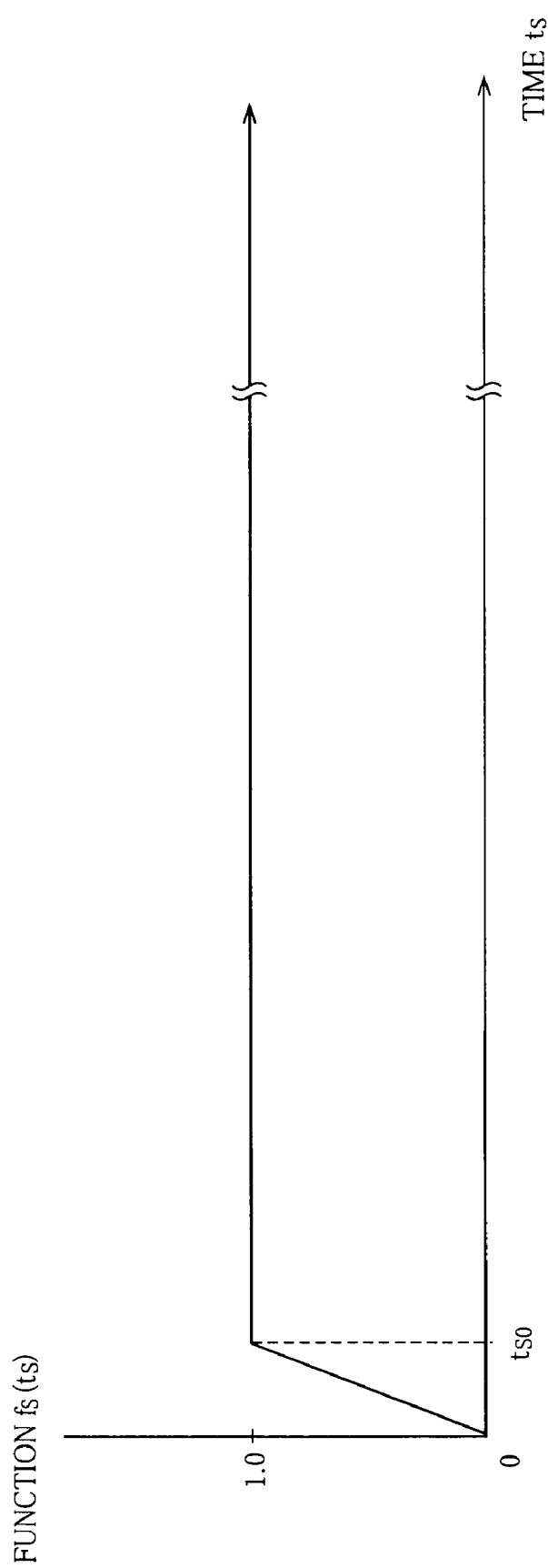
FIG. 7 A graph showing a function of the elapsed time, which is for gradually increasing the constant actuator force.

In the above expression, $F_{K0}$ represents a reference constant force that is preset to have a certain magnitude, $K_E$ represents a gain based on the charge level of the battery 130, and $K_T$ represents a gain based on the temperature of the motor 54. The gain $K_E$ is a set value that is increased with an increase of the charge level of the battery 130, as shown in FIG. 6 (a), so that the constant force is made relatively large so as to increase the amount of consumption of the electric power when the charge level of the battery 130 is relatively high. Therefore, the constant-force component $F_K$ is determined to have a relatively large magnitude when the charge level of the battery 130 is relatively high. Further, the gain $K_T$ is a gain based on the temperature of the motor 54, and is reduced with an increase of the temperature of the motor 54, as shown in FIG. 6 (b), so that the constant force is made relatively small so as to avoid overheating of the motor 54 when the temperature of the motor 54 is relatively high. Therefore, the constant-force component $F_K$ is determined to have a relatively small magnitude when the temperature of the motor 54 is relatively high. Further, $f_S(t_S)$ is a function based on the time lapse, and is changed to prevent abrupt generation of the constant force by a large magnitude. Described specifically, as shown in FIG. 7, the function $f_S(t_S)$ is linearly increased from 0 (zero) to 1 (one) in a gradual manner as the time $t_S$ elapses from initiation of the highly-charged state control, and then is held in 1 (one) after an increasing process time $t_{S0}$.

Figure 8:
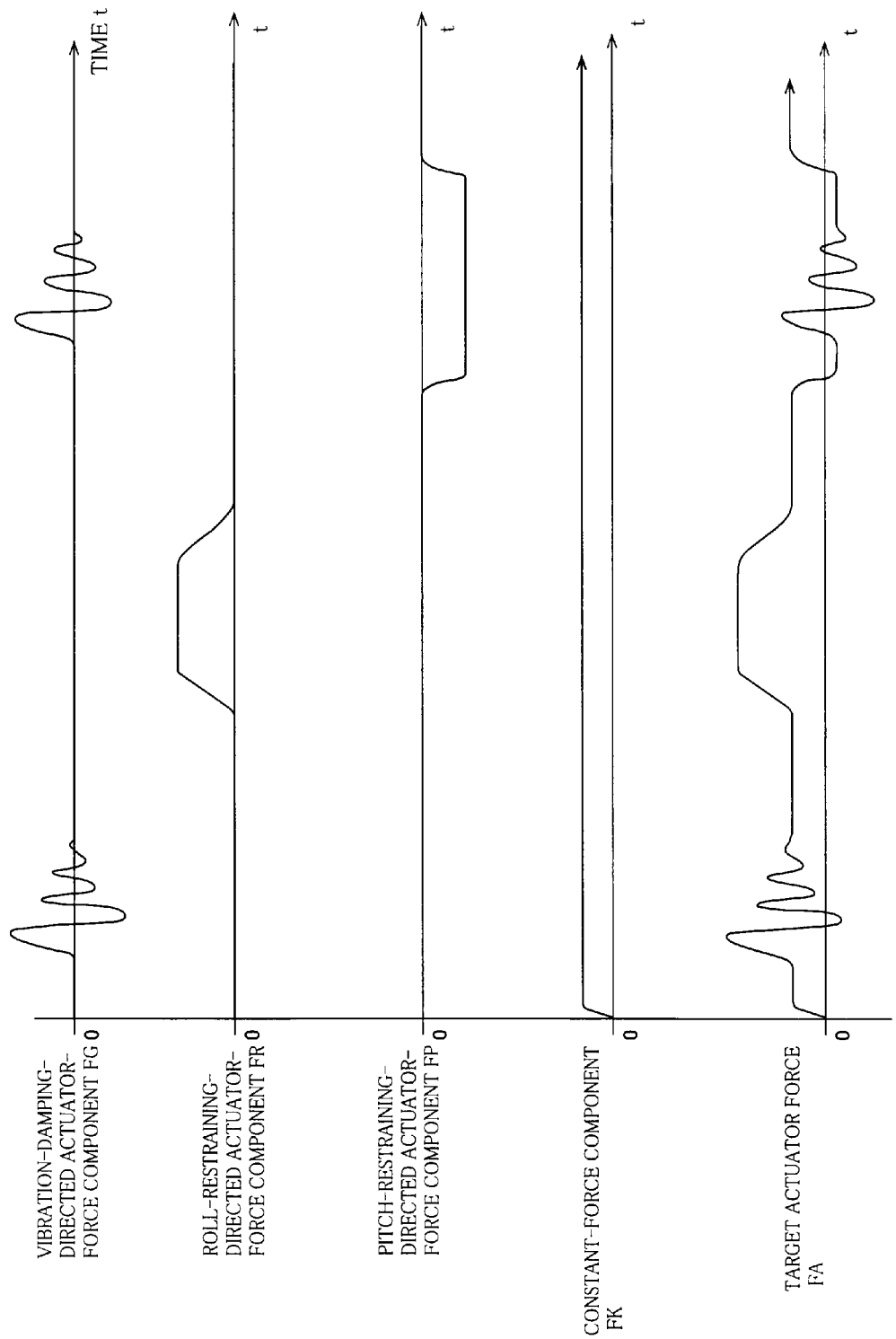
FIG. 8 A chart showing occurrence of vibration-damping-directed actuator-force component, roll-restraining-directed actuator-force component, pitch-restraining-directed actuator-force component and constant-force component upon running of the vehicle and change of a target actuator force as a sum of these components, in relation with elapsed time indicated along abscissa of the chart.

FIG. 8 is a chart schematically showing occurrence of vibration-damping-directed actuator-force component $F_G$, roll-restraining-directed actuator-force component $F_R$, pitch-restraining-directed actuator-force component $F_P$ and constant-force component $F_K$ upon running of the vehicle and change of the target actuator force $F_A$ as a sum of these components, in relation with elapsed time t indicated along abscissa of the chart. As is understood by comparing with FIG. 4 that shows the target actuator force $F_A$ under the normal state control, the target actuator force $F_A$ under the highly-charged state control causes the actuator force to be constantly generated, owing to the constant-force component $F_K$ that is added therein, such that the supplied-electric-basis actuator-force generating state is maintained in most of time during execution of the highly-charged state control (precisely described, except a part of the time in which the vibration damping control is being executed). Thus, the electric power of the battery 130 is effectively consumed.

ii) Transition to Normal State Control

Upon transition from the highly-charged state control to the normal state control, the constant force, which has been generated in the highly-charged state control, is gradually reduced after termination of the highly-charged state control, so as to prevent abrupt change of the actuator force due to elimination of the constant-force component $F_K$. Actually, in the normal state control, the target actuator force $F_A$ is determined according to the following expression:

$$F_A = F_G + F_R + F_P + F_K'.$$

In this expression, $F_K'$ is a component for reducing the constant-force component $F_K$ that has been generated in the highly-charged state control. The component $F_K'$ is determined based on the constant-force component $F_K$ and according to the following expression:

$$F_K' = f_E(t_E) \cdot F_K.$$

Figure 9:
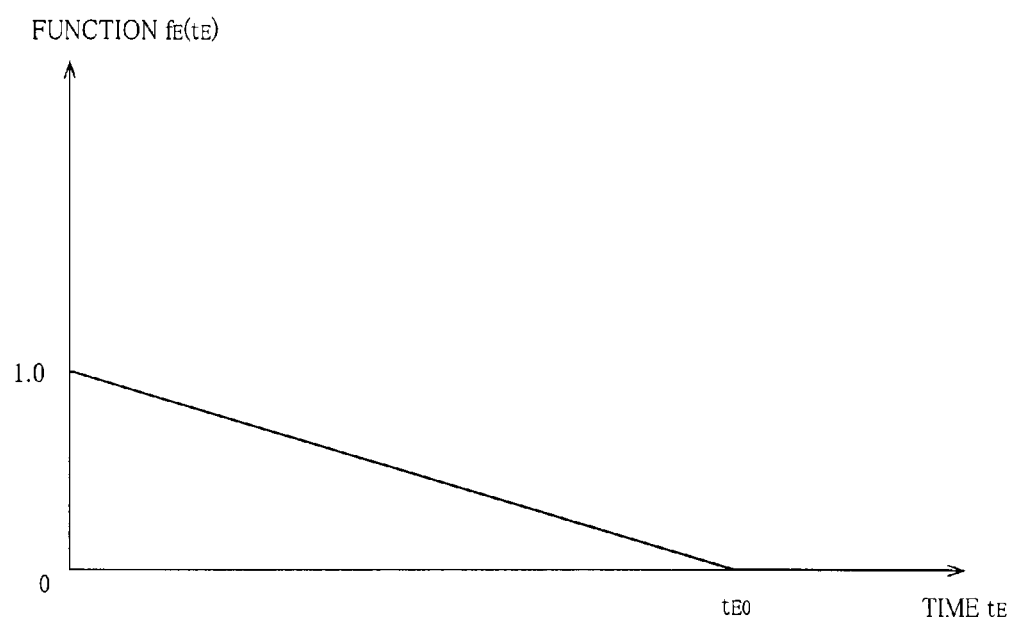
FIG. 9 A graph showing a function of the elapsed time, which is for gradually reducing the constant actuator force.

In this expression, $f_E(t_E)$ is a function whose parameter is a time lapse from a point of time of initiation of the normal state control. As shown in FIG. 9, the function $f_E(t_E)$ is linearly reduced from 1 (one) to 0 (zero) in a gradual manner as the time $t_E$ elapses from initiation of the normal state control, and then is held in 0 (zero) after a reducing process time $t_{E0}$.

iii) Maintenance of Vehicle Height

Figure 10:
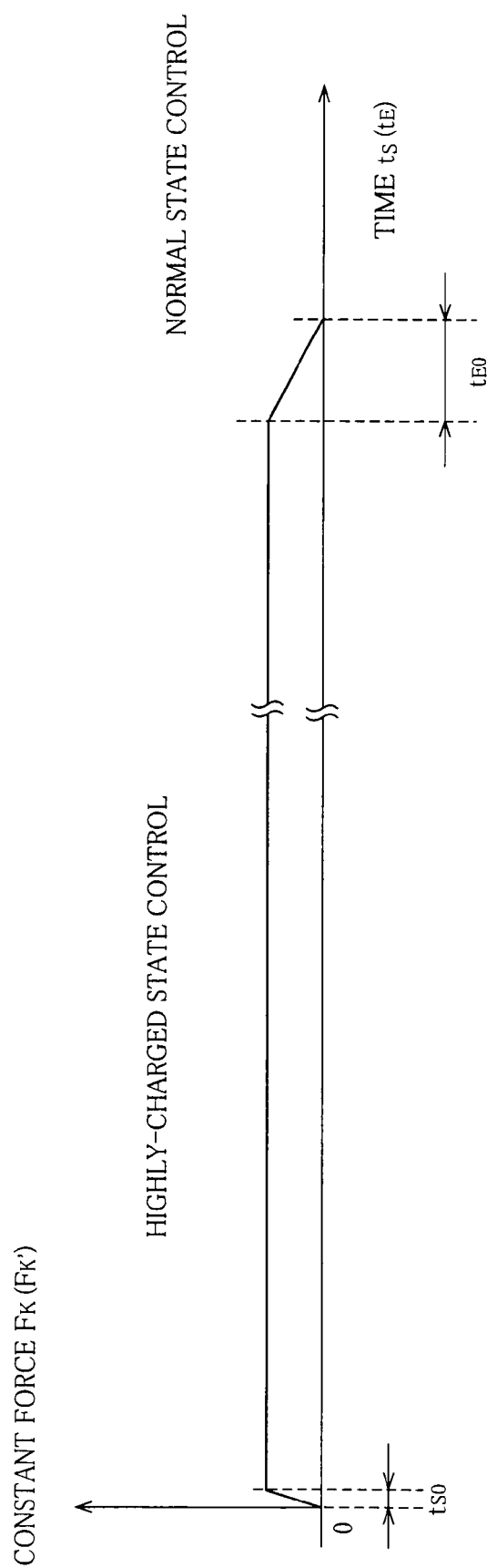
FIG. 10 A chart showing change of the constant-force component upon transition from a highly-charged state control to a normal state control, in relation with elapsed time indicated along abscissa of the chart.

In the present suspension system 10, as described above, during execution of the vehicle-height adjusting control, the vehicle-height increasing adjustment and vehicle-height reducing adjustment are carried out as long as the inhibiting conditions are not satisfied. Therefore, the vehicle height is held in the target vehicle height by the vehicle-height adjusting control either upon generation of the constant force acting in the rebound direction after transition from the normal control to the highly-charged state control or upon elimination of the constant force acting in the rebound direction after transition from the highly-charged state control to the normal control. The vehicle height adjustment is carried out by change of the spring rate of the air spring 28, which is made by increasing/reducing the amount of the air stored in the pressure chamber 44 of the air spring 28, so that the maintenance of the vehicle height performed by reduction of the air amount of the pressure chamber 44 requires a smaller length of time than the maintenance of the vehicle height performed by increase of the air amount of the pressure chamber 44. With this being taken into account, the above-described increasing process time $t_{S0}$ (see FIG. 7) is set to be shorter than the above-described reducing process time $t_{E0}$ (see FIG. 9), so that a rate of change of the constant force upon increase of the constant actuator force is higher than that upon reduction of the constant actuator force. As a result of this, as shown in FIG. 10, the change of the constant force upon transition from the highly-charged state control to the normal control is made slower than the change of the constant force upon transition from the normal control to the highly-charged state control.

iv) Limitation to Highly-Charged State Control

Figure 11:
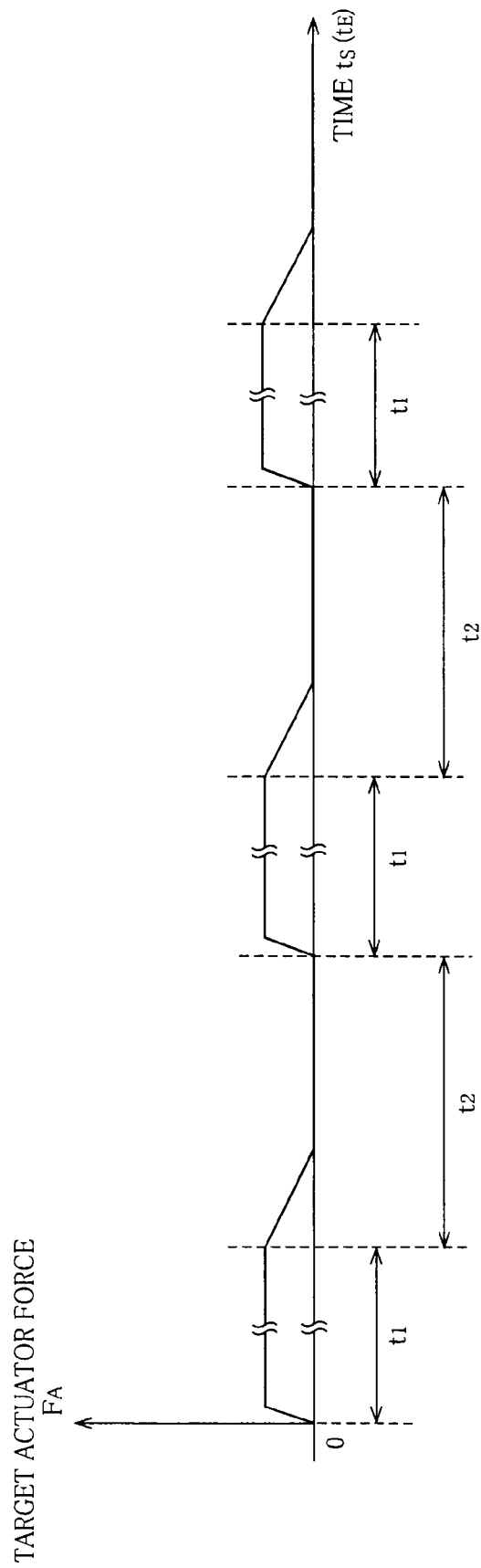
FIG. 11 A chart showing change of the constant-force component upon intermittent execution of the highly-charged state control, in relation with elapsed time indicated along abscissa of the chart.

The highly-charged state control is executed, in principle, when the charge state of the battery 30 is the highly-charged state. Specifically, the highly-charged state control is executed when the charge level E of the battery 130 is not lower than a threshold charge level $E_1$. However, when the temperature of the motor 54 is high, the execution of the highly-charged state control is limited by taking account of serious influence of heat generated by the motor 54. Described in detail, when the temperature T of the motor 54 is not lower than a first threshold temperature $T_1$, the execution of the highly-charged state control is inhibited. Further, when the temperature T of the motor 54 is not lower than a second threshold temperature $T_2$ that is set to be lower than the first threshold temperature $T_1$, a continuation of the execution of the highly-charged state control beyond a predetermined permissible continuation time $t_1$ is inhibited and a resumption of the execution of the highly-charged state control before elapse of a predetermined resumption inhibition time $t_2$ is inhibited. That is, when the temperature T of the motor 54 is lower than the first threshold temperature $T_1$ and is not lower than the second threshold temperature $T_2$, the highly-charged state control is executed in an intermittent manner, as shown in FIG. 11. It is noted that each of the vibration-damping-directed actuator-force component $F_G$, roll-restraining-directed actuator-force component $F_R$, and pitch-restraining-directed actuator-force component $F_P$ is set to 0 (zero) in FIG. 11. It is further noted that each of all of the actuators 26 has to be limited from generating the constant force when the execution of the highly-charged state control is limited. Therefore, in the present embodiment, a highest one of the temperatures of the respective four motors 54 provided in the respective four actuators 26 is employed as a representative of the temperatures upon determination as to whether the execution of the highly-charged state control should be limited or not. However, an average of the temperatures of the respective four motors 54 may be employed upon the determination of the limitation to the execution of the highly-charged state control.

v) Limitation to Electric Power Return in Highly-Charged State Control

Figure 12:
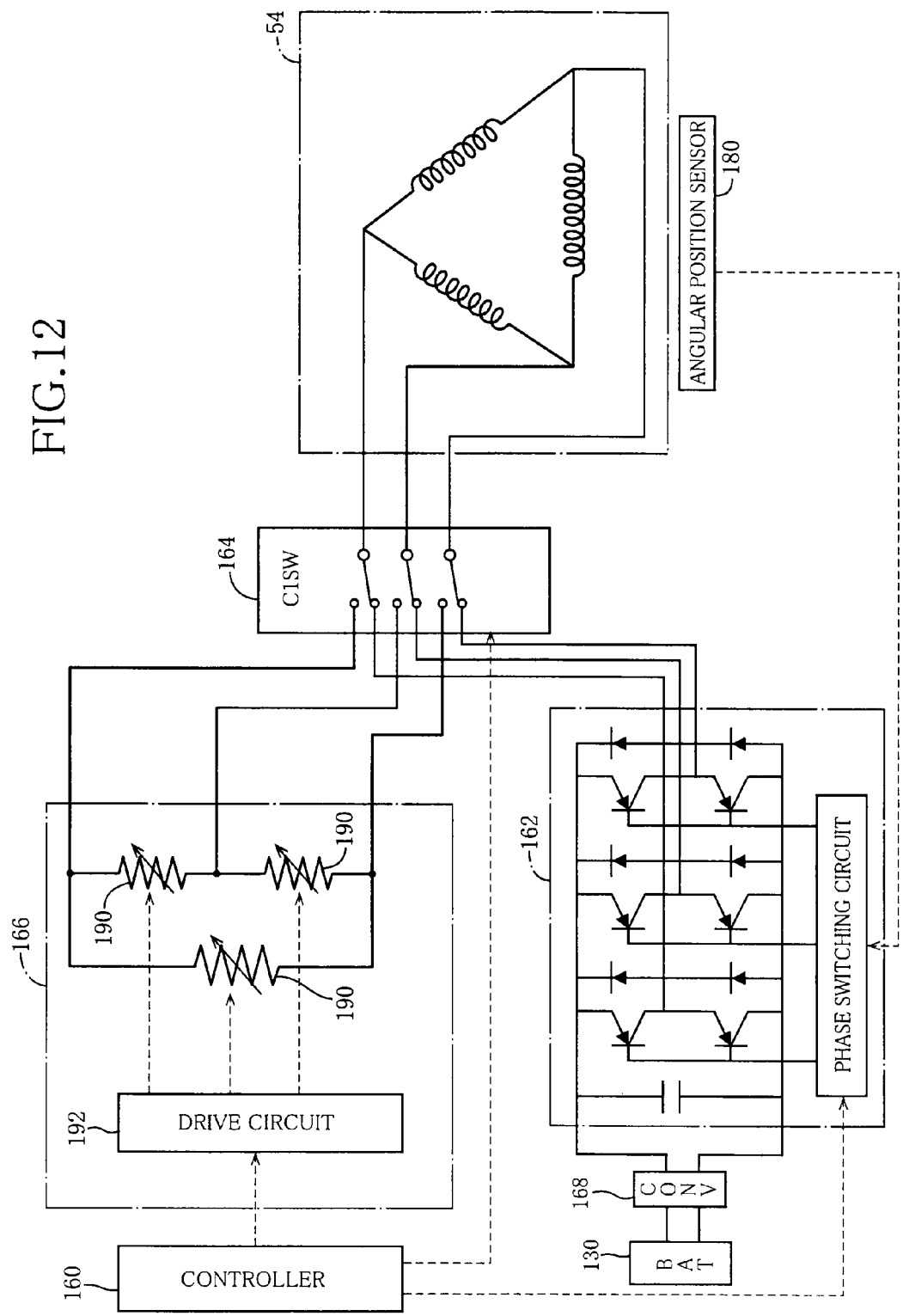
FIG. 12 A schematic view showing a variable resistor that is incorporated in the vehicle suspension system of the first embodiment.

When the above-described highly-charged state control is being executed for discharging the electric energy of the battery 130, there is a case in which the relationship between a rotational torque Tq of the motor 54 corresponding to the target actuator force $F_A$ and the rotational velocity V of the motor 54 belongs to the above-described regenerative braking region (region (a) in FIG. 5). That is, there is a case in which, when the actuator 26 generates not only the constant force but also the damping force, the motor 54 is placed in the generated-electric-basis actuator-force generating state even during execution of the highly-charged state control. In view of this, in the present suspension system 10, there is employed means for enabling generation of the appropriate target actuator force $F_A$ while avoiding return of the electric power generated by the motor 54 to the battery 130. Described specifically, the controller 160 stores therein a map data shown in FIG. 5, so that it is determined whether the motor 54 is placed in the generated-electric-basis actuator-force generating state or not, based on the relationship between the rotational torque Tq of the motor 54 (for generating the target actuator force $F_A$) and a current value of the rotational velocity V of the motor 54, with reference to the data map. When it is determined that the motor 54 is placed in the generated-electric-basis actuator-force generating state, the electric power generated by the motor 54 is consumed by the variable resistor device 166. As schematically shown in FIG. 12, the variable resistor device 166 is constructed to include three variable resistors 190 and a drive circuit 192. The three variable resistors 190 are interposed among the input terminals of the respective phases of the motor 54, while the drive circuit 192 is configured to change a resistance value of each of the variable resistors 190. During the generated-electric-basis actuator-force generating state, the motor 54 and the inverter 162 are disconnected from each other by the first change-over switch 164 while the motor 54 and the variable resistor device 166 are connected to each other, by operation of the first change-over switch 164 that is performed according to a switching signal supplied from the controller 160. Then, the drive circuit 192 receives a control signal which is supplied from the controller 160 and which relates to the target actuator force $F_A$, and changes the resistance value of each variable resistor 190 to a value corresponding to the control signal, whereby the motor 54 is controlled to generate the rotational torque Tq corresponding to the target actuator force $F_A$, without the inverter 162, namely, without returning the electric power to the battery 130.

vi) Electric Discharger Upon Limitation to Highly-Charged State Control

As described above, the electric consumption is not made by the actuator 26 even during the highly-charged state of the battery 130, when execution of the highly-charged state control is inhibited. In the present suspension system 10, in view of case of the limitation to the execution of the highly-charged state control, the battery 130 can be discharged also by means other than the execution of the highly-charged state control. Specifically described, when the execution of the highly-charged state control is inhibited during the highly-charged state of the battery 130, the battery 130 is connected to the discharging resistor device 188 by operation of the second change-over switch 186, so that the electric power of the battery 130 is consumed by the discharging resistor device 188. In the present suspension system, the provision of such an electric discharger assures smooth clearing of the highly-charged state of the battery 130.

4. Control Programs

Figure 13:
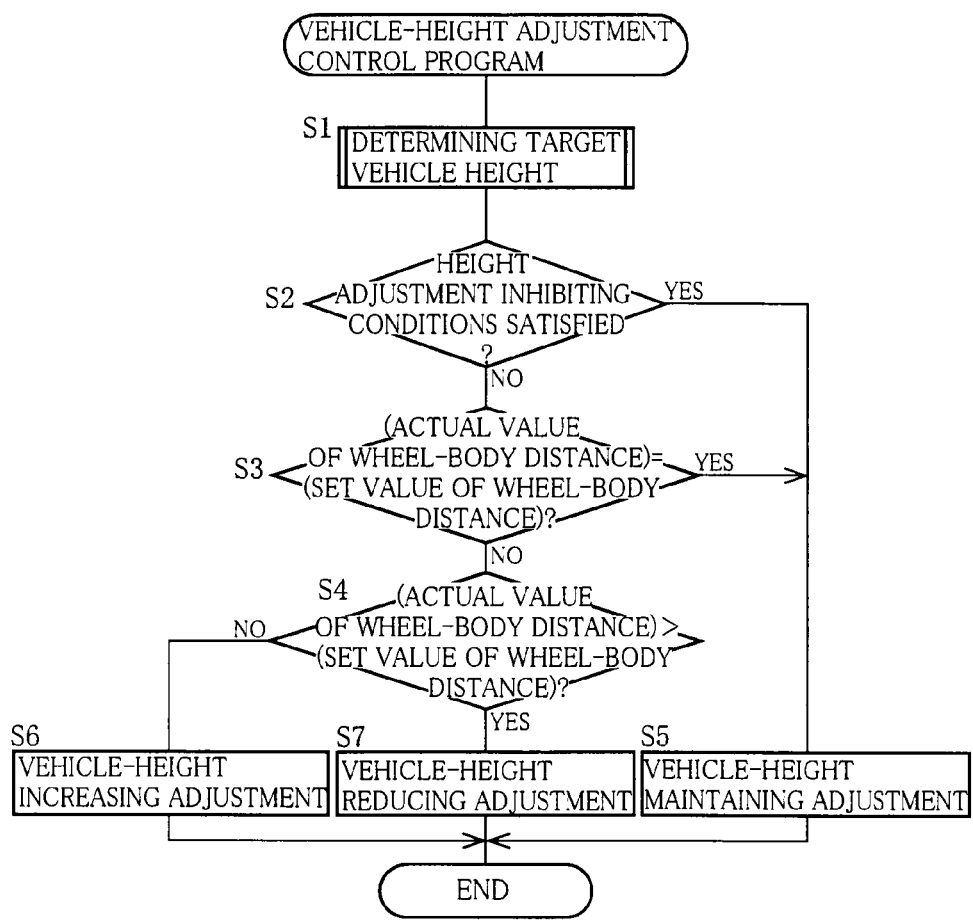
FIG. 13 A flow chart showing a vehicle-height adjustment control program that is executed in control of the vehicle suspension system of the first embodiment.
Figure 15:
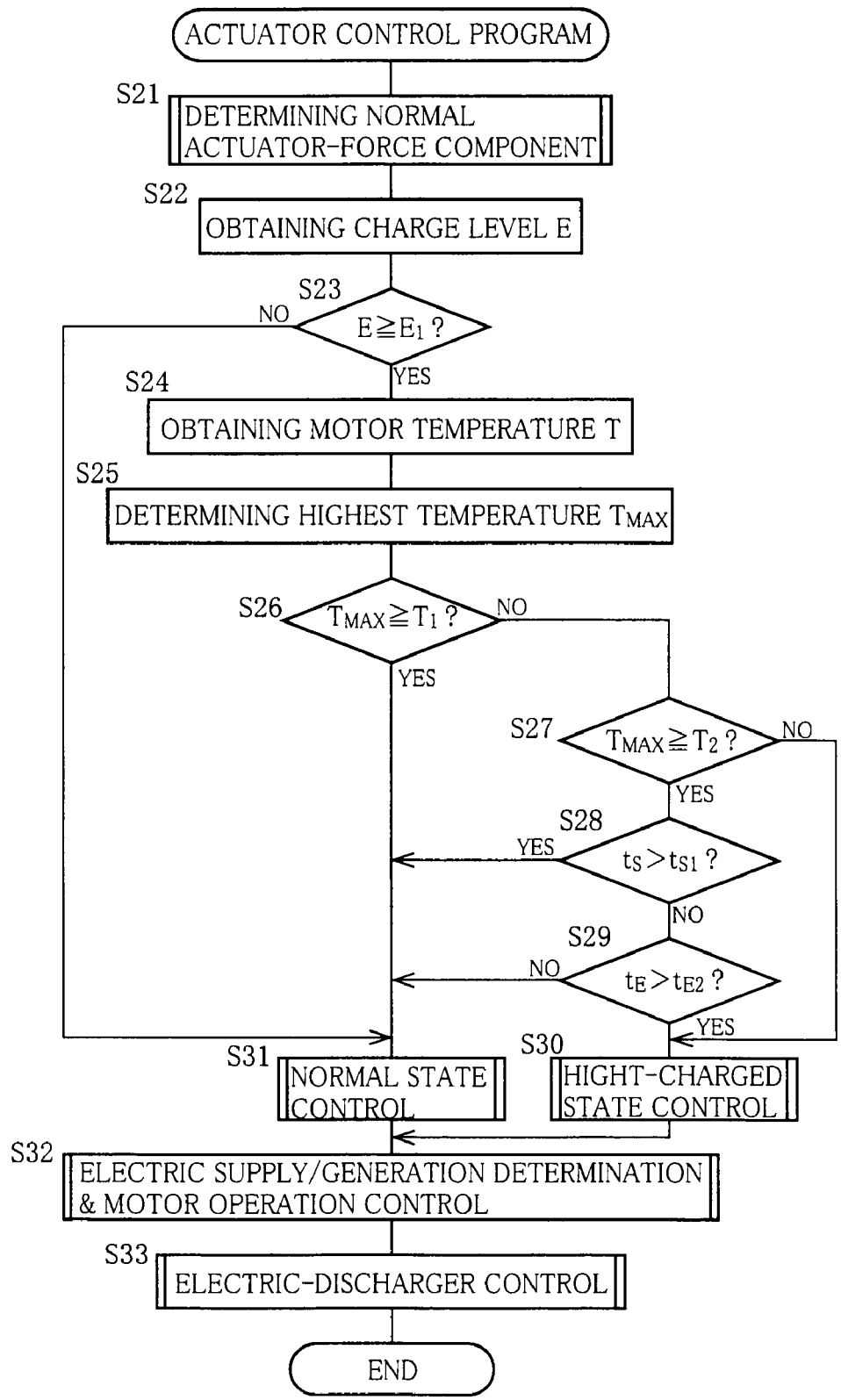
FIG. 15 A flow chart showing an actuator control program that is executed in control of the vehicle suspension system of the first embodiment.

The above-described vehicle-height adjusting control is executed in accordance with a vehicle-height adjustment control program shown in a flow chart of FIG. 13. This control program is repeatedly executed by the controller 146, at a short time interval (e.g., several tens of milliseconds), while an ignition switch of the vehicle is placed in its ON state. Further, the above-described actuator force control is executed in accordance with an actuator control program shown in a flow chart of FIG. 15. This control program is repeatedly executed by the controller 160, at a short time interval (e.g., several tens of milliseconds), while the ignition switch of the vehicle is placed in its ON state. These two control programs are executed concurrently with each other. Hereinafter, the control programs will be described by reference to the respective flow charts shown in the figures.

i) Vehicle-Height Adjustment Control Program

In procedures for the vehicle height adjustment in accordance with the vehicle-height adjustment control program, the vehicle height adjustment is performed based on a target vehicle-height flag $G_H$ used as a flag indicative of a target vehicle height. Flag values 0, 1 and 2 of the flag $G_H$ correspond to Low vehicle-height, Mid vehicle-height and Hi vehicle-height, respectively. Although the target vehicle height is a target vehicle height in each of all the wheels, there is a possibility that the wheel-body distance varies from wheel to wheel. Therefore, among the procedures in accordance with the vehicle-height adjustment control program, a procedure for the vehicle height adjustment, i.e., a procedure for adjustment of the wheel-body distance is individually carried out for each of the wheels.

Figure 14:
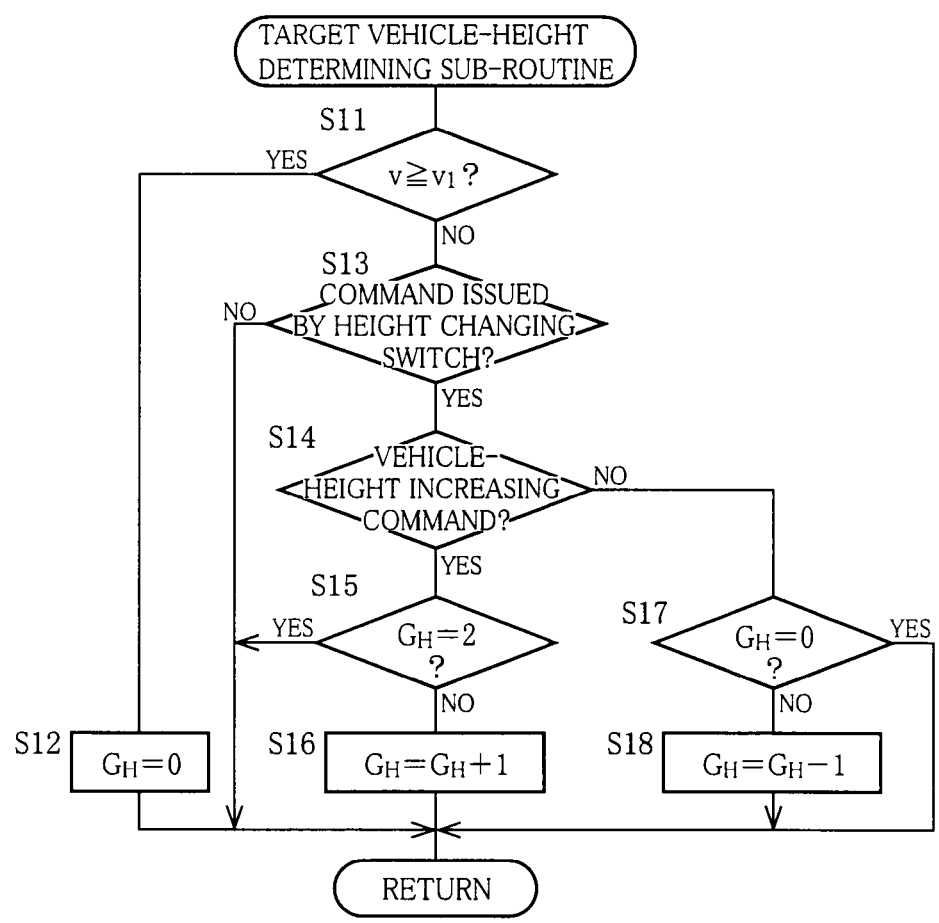
FIG. 14 A flow chart showing a target vehicle-height determination sub-routine that is executed in the vehicle-height adjustment control program.

In the procedures in accordance with the vehicle-height adjustment control program, firstly, a target vehicle-height determining sub-routine shown in a flow chart of FIG. 14 is executed. In this sub-routine, when the vehicle speed v is equal to or higher than a threshold speed $v_1$, the flag value of the target vehicle-height flag $G_H$ is set to 0 (zero) for assuring stability of the vehicle. When the vehicle speed v is lower than the threshold speed $v_1$, it is determined whether there is issued a command based on operation of the vehicle-height changing switch 154. When it is determined that the command is issued, the flag value of the target vehicle-height flag $G_H$ is changed to a vehicle-height increasing side or a vehicle-height reducing side depending up whether the command is a vehicle-height increasing command or a vehicle-height reducing command. Next, it is determined in a main routine whether the above-described vehicle-height adjustment inhibiting conditions are satisfied or not. When it is determined that the inhibiting conditions are not satisfied, an actual value of the wheel-body distance in each of the wheels is compared with a set value of the wheel-body distance corresponding to the flag value of the target vehicle-height flag $G_H$. When the vehicle-height adjustment inhibiting conditions are satisfied or when it is determined that the wheel-body distance does not require to be changed, the wheel-body distance is maintained according to the above-described vehicle-height maintaining adjustment. When it is determined that the wheel-body distance needs to be increased, the wheel-body distance is adjusted to be increased according to the above-described vehicle-height increasing adjustment. When it is determined that the wheel-body distance needs to be reduced, the wheel-body distance is adjusted to be reduced according to the above-described vehicle-height reducing adjustment. One cycle of execution of the vehicle-height adjustment control program is completed when the above series of procedures have been carried out.

ii) Actuator Control Program

Figure 16:
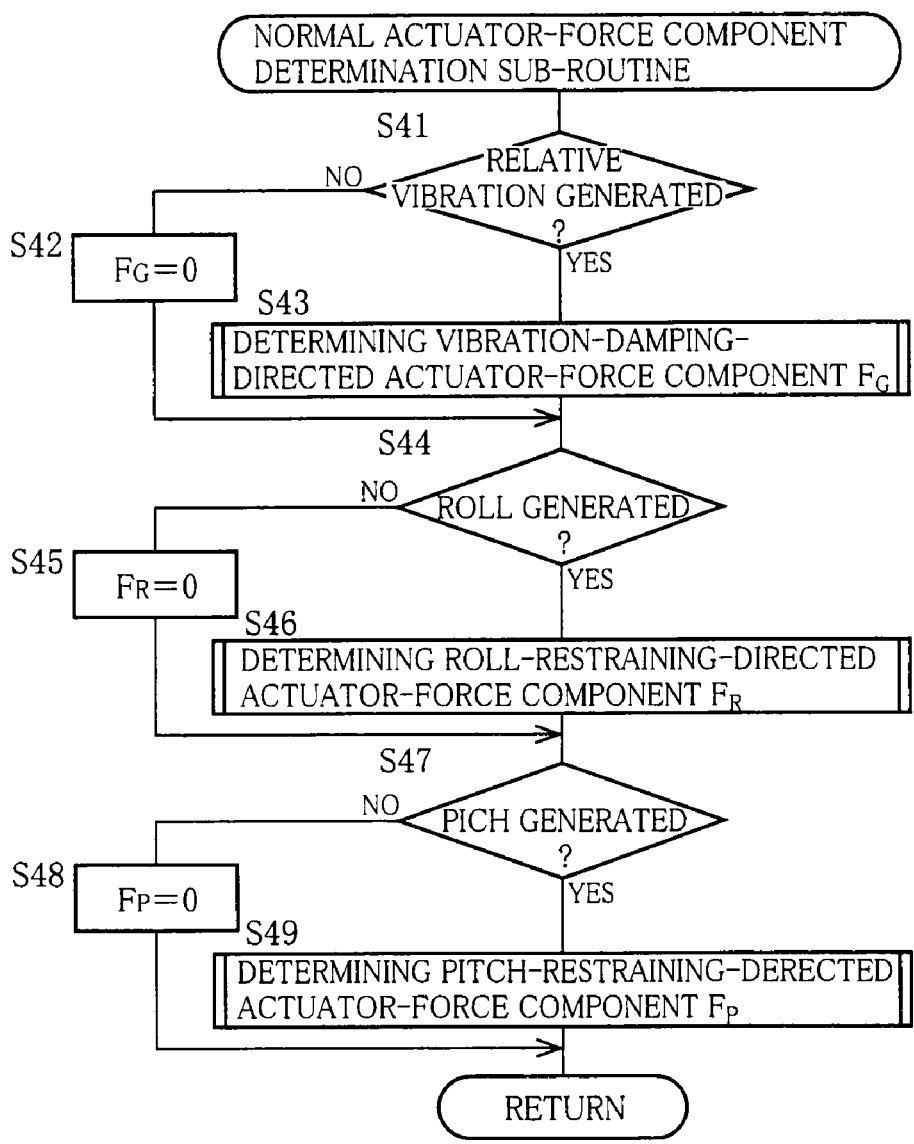
FIG. 16 A flow chart showing a normal actuator-force component determination sub-routine that is executed in the actuator control program.

The actuator control program is executed for each one of the actuators 26 of the respective spring absorber assembly 20 provided for the respective four wheels 12. In the following description, for simplifying the description, there will be described procedures performed for one of the actuators 26 according to this program. In the procedures, a normal actuator-force component determination sub-routine shown in a flow chart of FIG. 16 is executed such that the vibration-damping-directed actuator-force component $F_G$, roll-restraining-directed actuator-force component $F_R$ and pitch-restraining-directed actuator-force component $F_P$ are determined. Firstly, it is determined whether the relative vibration of the vehicle body and wheel is generated or not. Specifically described, when the rotational velocity of the motor 54 is equal to or higher than a threshold velocity, it is determined that the relative vibration of the vehicle body and wheel will be generated or is being generated. When it is determined that the relative vibration of the vehicle body and wheel will be generated or is being generated, the vibration-damping-directed actuator-force component $F_G$ is determined based on the rotational velocity V of the motor 54, for executing the vibration damping control.

Next, it is determined whether roll of the vehicle body occurs or not. Specifically described, it is determined that the roll of the vehicle body will be practically caused or is being practically caused as a result of turning of the vehicle, when the operating angle of the steering wheel is equal to or larger than a threshold angle and the vehicle speed is equal to or higher than a threshold speed. When it is determined that the roll of the vehicle body will be practically caused or is being practically caused, the roll-restraining-directed actuator-force component $F_R$ is determined based on the lateral acceleration, for executing the roll restraining control. Then, it is determined whether pitch of the vehicle body occurs or not. Specifically described, since there are front-end dive and rear-end squat of the vehicle body as the pitch of the vehicle body, it is determined that the front-end dive of the vehicle body will occur or is occurring when an absolute value of the longitudinal acceleration is equal to or larger than a threshold value and the brake pressure is equal to or larger than a threshold pressure, and it is determined that the rear-end squat of the vehicle body will occur or is occurring when an absolute value of the longitudinal acceleration is equal to or larger than the threshold value and the opening angle of the accelerator throttle valve is equal to or larger than a threshold value. When it is determined that either one of the front-end dive and rear-end squat of the vehicle body will occur or is occurring, the pitch-restraining-directed actuator-force component $F_P$ is determined based on the longitudinal acceleration, for executing the pitch restraining control. When it is determined in the above determinations that the relative vibration of the vehicle body and wheel, the roll of the vehicle body and the pitch of the vehicle body will not occur or are not occurring, each of the respective actuator-force components $F_G$, $F_R$, $F_P$ is set to 0 (zero).

Figure 17:
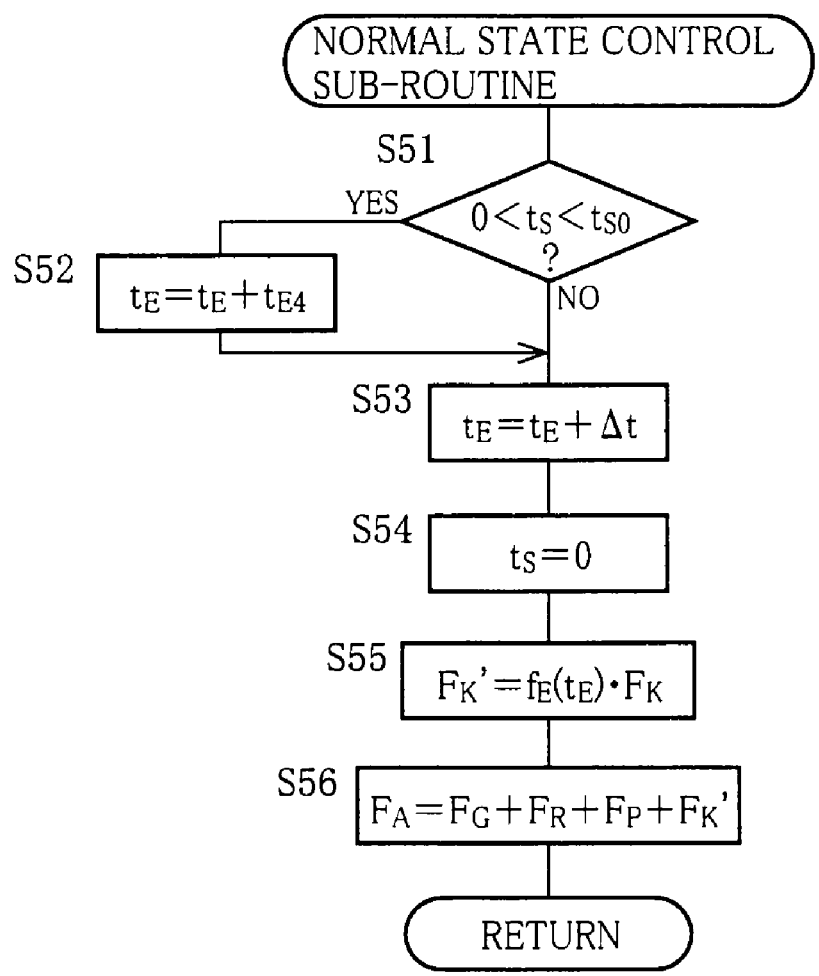
FIG. 17 A flow chart showing a normal state control sub-routine that is executed in the actuator control program.
Figure 18:
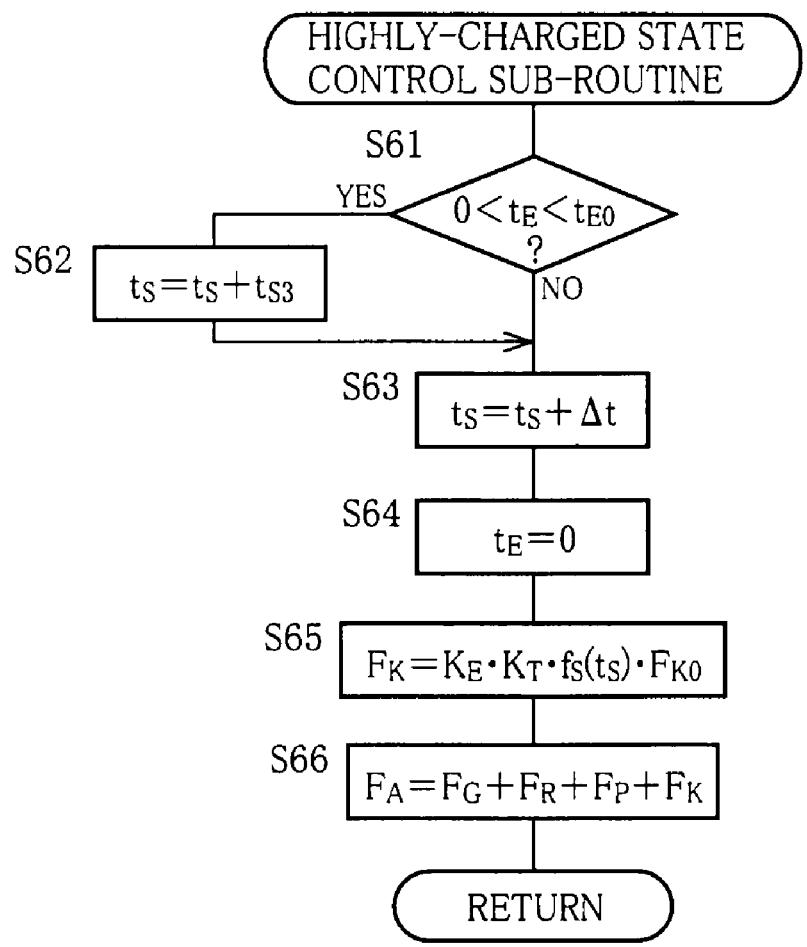
FIG. 18 A flow chart showing a highly-charged state control sub-routine that is executed in the actuator control program.

Next, it is determined whether the charge level E of the battery 130, which is detected by the charge level sensor 184, is equal to or higher that a threshold charge level $E_1$. When the charge level E is equal to or higher than the threshold charge level $E_1$, namely, when the charge state of the battery 130 is the highly-charged state, the temperatures T of the motors 54 provided in the respective actuators 26 are obtained by the temperature sensor 182, and then it is determined whether the highest temperature $T_{MAX}$ as the highest one of the temperatures T is equal to or higher than the first threshold temperature $T_1$. When the charge level E is lower than the threshold charge level $E_1$, or when the highest temperature $T_{MAX}$ is equal to or higher than the first threshold temperature $T_1$, a normal state control sub-routine shown in a flow chart of FIG. 17 is executed. Further, when the highest temperature $T_{MAX}$ is lower than the first threshold temperature $T_1$, it is determined whether the highest temperature $T_{MAX}$ is equal to or higher than the second threshold temperature $T_2$. When it is determined that the highest temperature $T_{MAX}$ is lower than the second threshold temperature $T_2$, a highly-charged state control sub-routine shown in a flow chart of FIG. 18 is executed. When it is determined that the highest temperature $T_{MAX}$ is equal to or higher than the second threshold temperature $T_2$, the highly-charged state control sub-routine is executed in an intermittent manner. Described in detail, a time $t_S$ (hereinafter referred to as "highly-charged state control executing time" where appropriate) for which the highly-charged state control is executed, is measured from initiation of the highly-charged state control. When the highly-charged state control executing time $t_S$ exceeds a predetermined time $t_{S1}$, namely, when the highly-charged state control has been executed for the predetermined time $t_{S1}$, the normal state control sub-routine is executed. Further, a time $t_E$ (hereinafter referred to as "normal state control executing time" where appropriate) for which the normal state control is executed, is measured from initiation of the normal state control. The highly-charged state control sub-routine is resumed when the normal state control executing time $t_E$ exceeds a predetermined time $t_{E2}$. Namely, the resumption of execution of the highly-charged state control is inhibited for the predetermined time $t_{E2}$.

In the highly-charged state control sub-routine, it is determined whether a condition that the normal state control executing time $t_E$ is longer than 0 (zero) and is shorter than the above-described reducing process time $t_{E0}$ is satisfied or not. When this condition is not satisfied, a predetermined time $\Delta t$ is added to the highly-charged state control executing time $t_S$ for measuring the executing time of the highly-charged state control, and the normal state control executing time $t_E$ is reset to 0 (zero) for terminating the measurement of the executing time of the normal state control. Next, as described above, the constant-force component $F_K$ is determined based on the highly-charged state control executing time $t_S$ and with reference to a data map that is set as shown in FIGS. 6 (a), (b) and FIG. 7. Then, the target actuator force $F_A$ is determined as a sum of the determined vibration-damping-directed actuator-force component $F_G$, roll-restraining-directed actuator-force component $F_R$, pitch-restraining-directed actuator-force component $F_P$ and constant-force component $F_K$.

In the normal state control sub-routine, it is determined whether a condition that the highly-charged state control executing time $t_S$ is longer than 0 (zero) and is shorter than the above-described increasing process time $t_{S0}$ is satisfied or not. When this condition is not satisfied, a predetermined time $\Delta t$ is added to the normal state control executing time $t_E$ for measuring the executing time of the normal state control, and the highly-charged state control executing time $t_S$ is reset to 0 (zero) for terminating the measurement of the executing time of the highly-charged state control. Next, as described above, the component $F_K'$ for gradually reducing the constant-force component $F_K$ is determined based on the normal state control executing time $t_E$ and with reference to a data map that is set as shown in FIG. 9. Then, the target actuator force $F_A$ is determined as a sum of the determined vibration-damping-directed actuator-force component $F_G$, roll-restraining-directed actuator-force component $F_R$, pitch-restraining-directed actuator-force component $F_P$ and component Fr.

Figure 19:
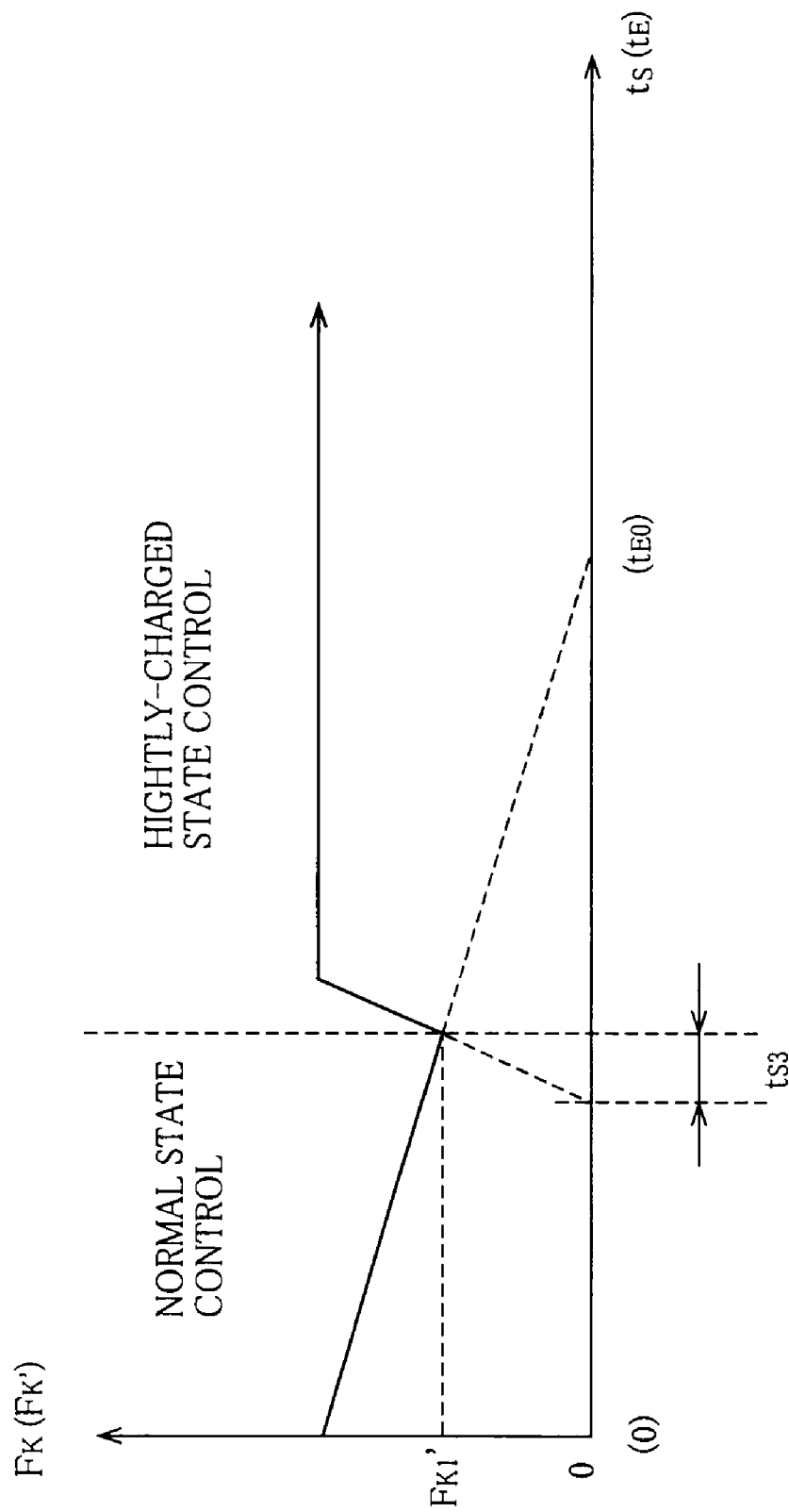
FIG. 19 A chart showing change of the constant-force component upon transition from the normal state control to the highly-charged state control, in relation with elapsed time indicated along abscissa of the chart, wherein the transition takes place in process of gradual reduction of the constant force during the normal state control.

The initial procedure of the highly-charged state control sub-routine is a procedure that is to be carried out for smoothly switching from the normal state control to the highly-charged state control when the constant force is being gradually reduced in the normal state control. That is, it is the procedure for smoothly switching from a state of gradual reduction of the constant force to a state of gradual increase of the constant force. As shown in FIG. 19, for smoothly changing the constant force upon switching from the normal state control to the highly-charged state control during gradual reduction of the constant force, it is necessary that the highly-charged state control is initiated from a state that is shifted by a certain length of time. That is, a value of the constant-force component $F_K$ upon initiation of the highly-charged state control needs to be equal to a value $F_{K1}'$ of the constant-force component $F_K$ in the normal state control upon the switching. From the function $f_S(t_S)$ for determining the constant-force component $F_K$, it is understood that the constant-force component $F_K$ takes the value of $F_{K1}'$ ($F_K = F_{K1}'$) when the highly-charged state control executing time $t_S$ takes a value of $t_{S3}$ ($t_S = t_{S3}$). That is, the normal state control can be smoothly switched to the highly-charged state control during the gradual reduction of the constant force in the normal state control, by initiating the highly-charged state control at the highly-charged state control executing time $t_{S3}$. Specifically described, upon switching from the normal state control to the highly-charged state control when the normal state control executing time $t_E$ is longer than 0 (zero) and shorter than the reducing process time $t_{E0}$, the highly-charged state control executing time $t_S$ is set to $t_{S3}$ at point of initiation of the highly-charged state control, and then the following procedures are carried out as described in the description of the highly-charged state control sub-routine.

Figure 20:
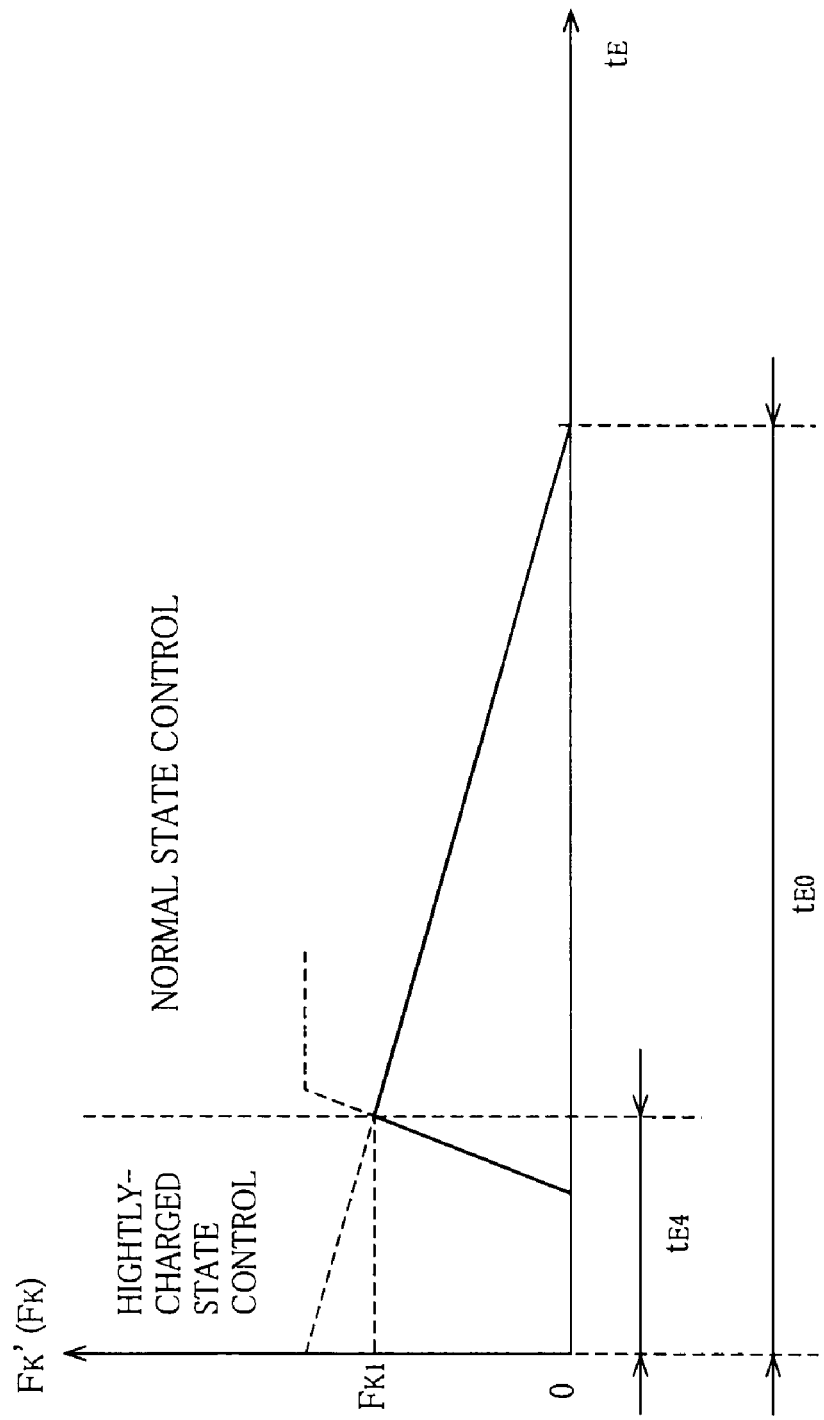
FIG. 20 A chart showing change of the constant-force component upon transition from the highly-charged state control to the normal state control, in relation with elapsed time indicated along abscissa of the chart, wherein the transition takes place in process of gradual increase of the constant force during the highly-charged state control.

Similarly, the initial procedure of the normal state control sub-routine is a procedure that is to be carried out for smoothly switching from the highly-charged state control to the normal state control when the constant force is being gradually increased in the highly-charged state control. That is, it is the procedure for smoothly switching from a state of gradual increase of the constant force to a state of gradual reduction of the constant force. As shown in FIG. 20, for smoothly changing the constant force upon switching from the highly-charged state to the normal state control during gradual increase of the constant force, it is necessary that the normal state control is initiated from a state that is shifted by a certain length of time. That is, a value of the $F_K'$ upon initiation of the normal state control needs to be equal to a value $F_{K1}$ of the constant-force component $F_K$ in the highly-charged state control upon the switching. From the function $f_E$ ($t_E$) for determining the component $F_K'$, it is understood that the component $F_K'$ takes the value of $F_{K1}$ ($F_K'=F_{K1}$) when the normal state control executing time $t_E$ takes a value of $t_{E4}$ ($t_E=t_{E4}$). That is, the highly-charged state control can be smoothly switched to the normal state control during the gradual increase of the constant force in the highly-charged state control, by initiating the normal state control at the normal state control executing time $t_{E4}$. Specifically described, upon switching from the highly-charged state control to the normal state control when the highly-charged state control executing time $t_S$ is longer than 0 (zero) and shorter than the increasing process time $t_{S0}$, the normal state control executing time $t_E$ is set to $t_{E4}$ at point of initiation of the normal state control, and then the following procedures are carried out as described in the description of the normal state control sub-routine.

After one of the normal state control sub-routine and the highly-charged state control sub-routine has been carried out, an electric supply/generation determination & motor operation control sub-routine shown in a flow chart of FIG. 21 (a) is carried out. In this sub-routine, it is determined whether the relationship between the rotational torque Tq of the motor 54 corresponding to the determined target actuator force $F_A$ and an actual value of the rotational velocity V of the motor 54 is located in the regenerative braking region, with reference to the map data shown in FIG. 5. When it is determined that the relationship is located in the regenerative braking region, together with condition that the battery 130 is in the highly-charged state, the first change-over switch 164 is operated to connect the motor 54 and the variable resistor device 166, and a control signal corresponding to the determined target actuator force $F_A$ is supplied to the variable resistor device 166, as described above. When it is determined that the relationship is not located in the regenerative braking region, or when the battery 130 is not in the highly-charged state, the first change-over switch 164 is operated to connect the motor 54 and the inverter 162, the control signal corresponding to the determined target actuator force $F_A$ is supplied to the inverter 162, so that the motor 54 is controlled by the inverter 162. Through these procedures, the operation of the motor 54 is controlled to generate the determined target actuator force $F_A$.

After the electric supply/generation determination & motor operation control sub-routine has been carried out, an electric-discharger control sub-routine shown in a flow chart of FIG. 21 (b) is carried out. In this sub-routine, it is determined whether the highly-charged state control is being executed or not. When it is determined that the normal state control rather than the highly-charged state control is being executed, together with condition that the battery 130 is in the highly-charged state, the second change-over switch 186 is operated to connect the battery 130 and the discharge resistor device 188. When it is determined that the highly-charged state control is being executed, or when the battery 130 is not in the highly-charged state, the second change-over switch 186 is operated to disconnect the battery 130 and the discharging resistor device 188 from each other.

5. Functional Constructions of Controllers

Figure 22:
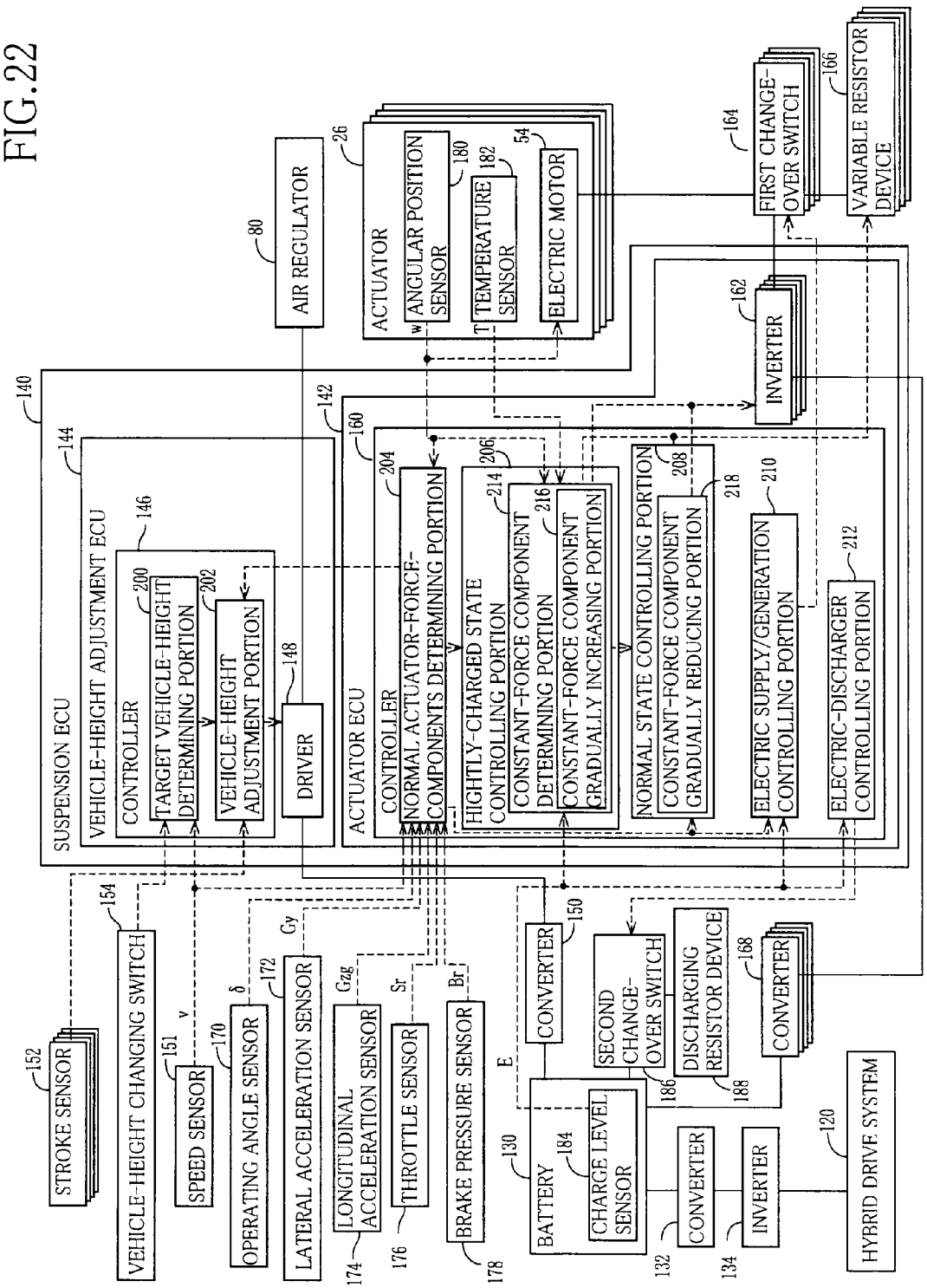
FIG. 22 A block diagram showing functions of a suspension electronic control unit for controlling the vehicle suspension system of the first embodiment.

The controllers 146, 160 of the present suspension system 10 functioning with executions of the above-described control programs can be considered to have functional constructions as shown in FIG. 22, in view of the procedures carried out in the executions of the control programs. As is understood from the figure of the functional constructions, the controller 146 is equipped with: a target vehicle-height determining portion 200 as a functional portion configured to carry out the procedures of the target vehicle-height determining sub-routine, i.e., as a functional portion configured to determine the target vehicle height; and a vehicle height adjusting portion 202 as a functional portion configured to control operations of various control valves and the like for adjusting the vehicle height. Further, the controller 160 is equipped with: a normal actuator-force-components determining portion 204 as a functional portion configured to carry out the procedures of the normal actuator-force component determination sub-routine, i.e., as a functional portion configured to determine the vibration-damping-directed actuator-force component $F_G$, roll-restraining-directed actuator-force component $F_R$ and pitch-restraining-directed actuator-force component $F_P$; a highly-charged state controlling portion 206 as a functional portion configured to carry out the procedures of the highly-charged state control sub-routine, i.e., as a functional portion configured to execute the highly-charged state control; and a normal state controlling portion 208 as a functional portion configured to carry out the procedures of the normal state control sub-routine, i.e., as a functional portion configured to execute the normal state control. Further, the controller 160 is equipped with: an electric supply/generation controlling portion 210 as a functional portion configured to carry out the procedures of steps S71 through S74, i.e., as a functional portion configured to determine in which one of the supplied-electric-basis actuator-force generating state and the generated-electric-basis actuator-force generating state the motor 54 is held, and then to control the first change-over switch 164 in accordance with the determination; and an electric-discharger controlling portion 212 as a functional portion configured to carry out the procedures of the electric-discharger control sub-routine, i.e., as a functional portion configured to determine whether the battery 130 and the discharging resistor device 188 are to be connected to each other or disconnected from each other, and then to control the second change-over switch 186 in accordance with the determination. It is noted that the highly-charged state controlling portion 206 is equipped with a constant-force component determining portion 214 as a function portion configured to carry out the procedures of steps S51 through S55, i.e., as a functional portion configured to determine the constant-force component $F_K$, and that the constant-force component determining portion 214 is equipped with a constant-force component gradually increasing portion 216 as a functional portion configured to carry out the procedure of step S55, i.e., as a functional portion configured to gradually increase the constant-force component $F_K$. It is further noted that the normal state controlling portion 208 is equipped with a constant-force component gradually increasing portion 216 as a functional portion configured to carry out the procedures of steps S61 through S65, i.e., as a functional portion configured to gradually reduce the constant-force component $F_K$.

Second Embodiment

1. Construction of Suspension System

Figure 23:
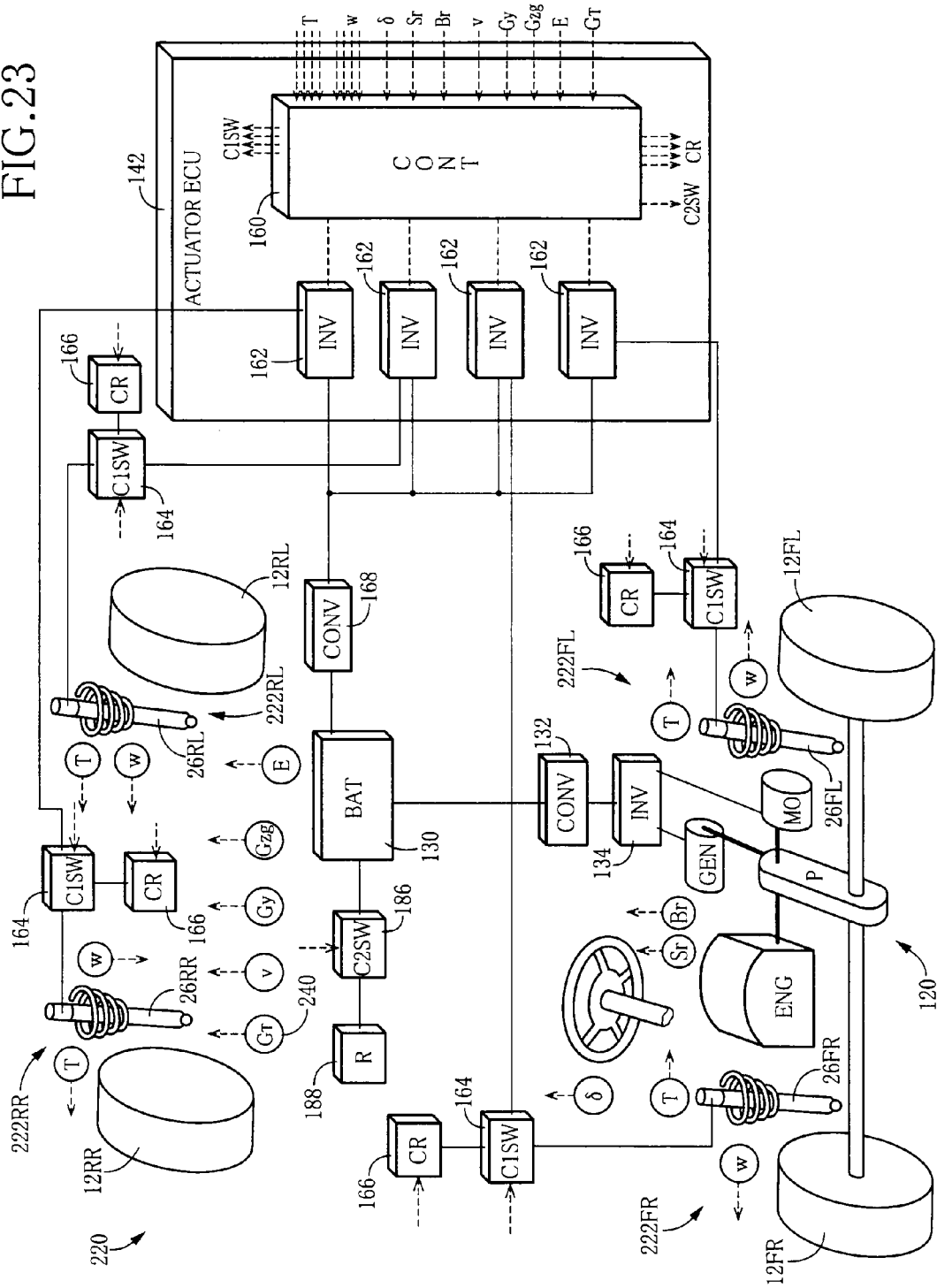
FIG. 23 A schematic view showing an overall construction of a vehicle suspension system of a second embodiment of the invention.

In the vehicle suspension system according to present embodiment, although the vehicle-height adjusting control by the air spring is not executed, the other controls are executed substantially in the same manner as the actuator control in the above-described embodiment. FIG. 23 schematically shows a vehicle suspension system 220 of the present embodiment. Since the present suspension system 220 is equipped with many constructional elements that are common to the vehicle suspension system 10, the same reference signs as used in the above-described embodiment will be used to identify the common constructional elements, and description of these elements is omitted or simplified.

Figure 24:
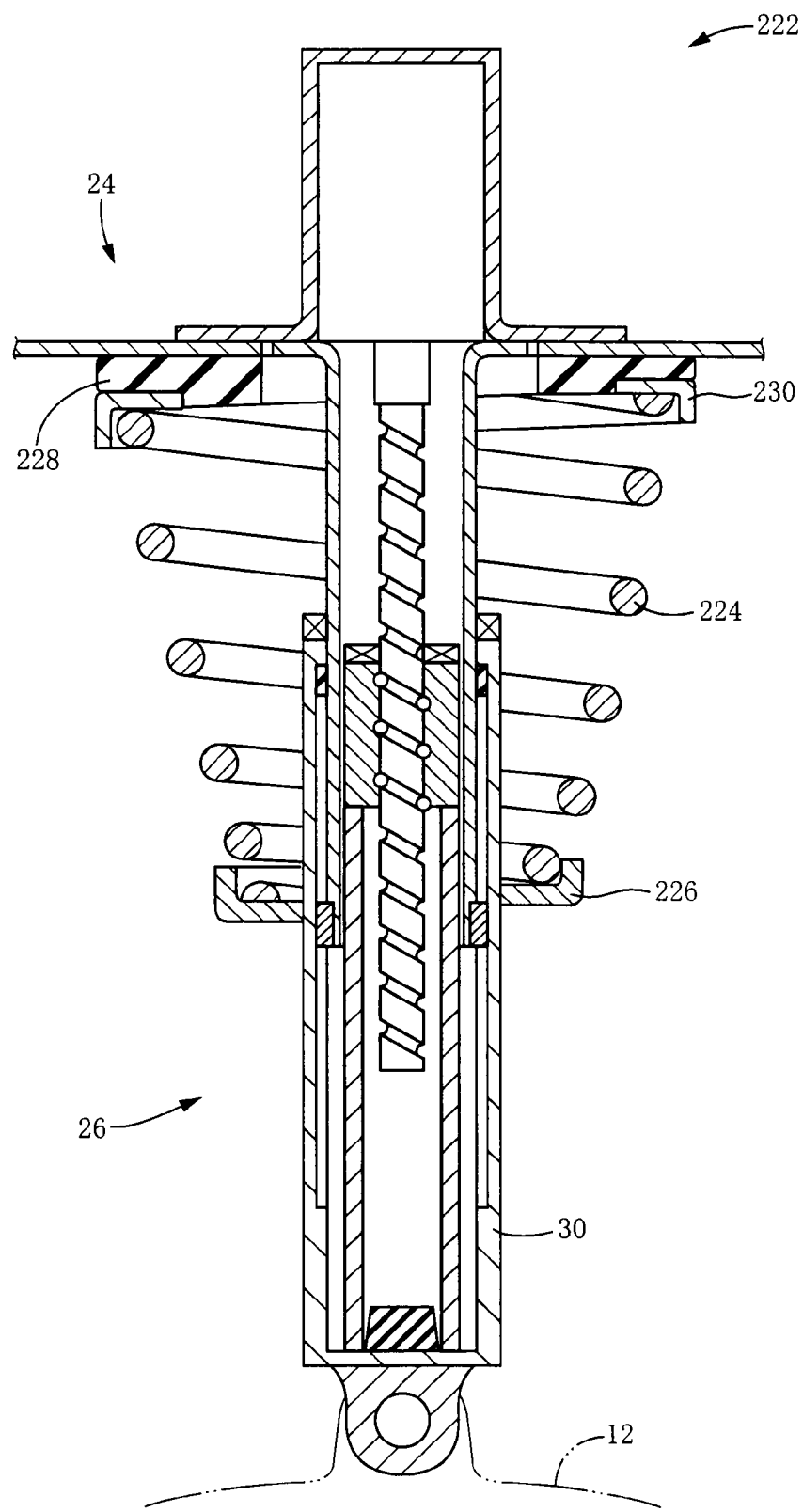
FIG. 24 A front cross sectional view showing a spring absorber assembly incorporated in the vehicle suspension system of the second embodiment.

The present suspension system 220 is equipped with a spring absorber assembly 222. As shown in FIG. 24, the spring absorber assembly 222 is equipped with the electromagnetic shock absorber in the form of the actuator 26 and the suspension spring in the form of a coil spring 224. The actuator 26 is disposed between the suspension lower arm 22 as the wheel holding member holding the wheel 12 and the mount portion 24 provided in the body of the vehicle, and interconnects the suspension lower arm 22 and the mount portion 24. The coil spring 224 is disposed in parallel to the actuator 26. An annular-shaped lower retainer 226 is provided on the outer tube 30 of the shock absorber 26. A rubber vibration isolator 228 is disposed on a lower surface of the mount portion 24. The coil spring 224 is interposed between the lower retainer 226 and an annular-shaped upper retainer 230 that is disposed on the lower surface of the mount portion 24 via the rubber vibration isolator 228.

2. Highly-Charged State Control

Like the actuator 26 included in the spring absorber assembly 20 of the above-described suspension system 10, the actuator 26 has a function of generating the actuator force forcing the vehicle body and the wheel 12 toward and away from each other, and is capable of causing the generated actuator force to act as the damping force (against displacement of the vehicle body and the wheel 12 toward and away from each other), the roll restraining force and the pitch restraining force. Further, the actuator 26 is capable of causing the actuator force to act also as the constant force. When the charge state of the battery 130 is the highly-charged state, in principle, the highly-charged state control is executed. In the present suspension system 220, during execution of the highly-charged state control, the constant force is generated to act in a direction (hereinafter referred to as "constant force direction" where appropriate) that is determined based on at least one of a condition of a road surface on which the vehicle runs and a running speed at which the vehicle runs.

In the highly-charged state control, when the vehicle runs on a bad-conditioned road such as mogul road and wave road, each of all the four actuators 26 generates the constant force acting in the rebound direction as the constant force direction. Further, when the vehicle runs at a high speed, each of all the four actuators 26 generates the constant force acting in the bound direction as the constant force direction. It is noted that the constant forces generated by the respective actuators 26 are the same with respect to the magnitude. Describe specifically, when it is determined that the vehicle runs on a bad-conditioned road, based on a vertical acceleration Gt detected by the vertical acceleration sensor 240, the constant-force component $F_K$ for generating the constant force is determined according to the following expression:

$$F_K = K_E \cdot K_T \cdot F_{K0}.$$

In the above expression, $F_{K0}$ represents a reference constant force that is preset to have a certain magnitude, and $K_E$, $K_T$ represent the same gains as those used in the above-described suspension system 10. The gain $K_E$ is a set value that is increased with an increase of the charge level of the battery 130, as shown in FIG. 6 (a), while the gain $K_T$ is a set value that is reduced with an increase of the temperature of the motor 54, as shown in FIG. 6 (b). In the following description, each of the actuator force and the components of the actuator force takes a positive value when it acts in the rebound direction, and takes a negative value when it acts in the bound direction. Therefore, in case of running on a bad-conditioned road, the constant-force component $F_K$ is generated to act in the rebound direction according to the above expression. On the other hand, in case of determination that the vehicle speed v is not lower than a threshold speed $v_1$, the constant-force component $F_K$ is generated in the bound direction, since it is determined according to the following expression:

$$F_K = -K_E \cdot K_T \cdot F_{K0}$$

In the highly-charged state control, when the vehicle runs normally, namely, when the vehicle runs at a non-high speed on a non-bad-conditioned road, two of the four actuators 26 for the wheels 12 positioned in respective positions that are diagonal to each other are assigned to generate the respective constant actuator forces such that the generated constant actuator forces act in the rebound direction as the constant force direction, while the other two of the four actuator 26 are assigned to generate the respective constant actuator forces such that the generated constant actuator forces act in the bound direction as the constant force direction. Specifically described, the constant-force component $F_K$, which is to be generated by each of the two actuators 26FL, 26RR for the front left and rear right wheels 12FL, 12RR, is determined in accordance with the following expression:

$$F_K = K_E \cdot K_T \cdot F_{K0}.$$

Meanwhile, the constant-force component $F_K$, which is to be generated by each of the two actuators 26FR, 26RL for the front right and rear left wheels 12FR, 12RL, is determined in accordance with the following expression:

$$F_K = -K_E \cdot K_T \cdot F_{K0}.$$

Figure 25:
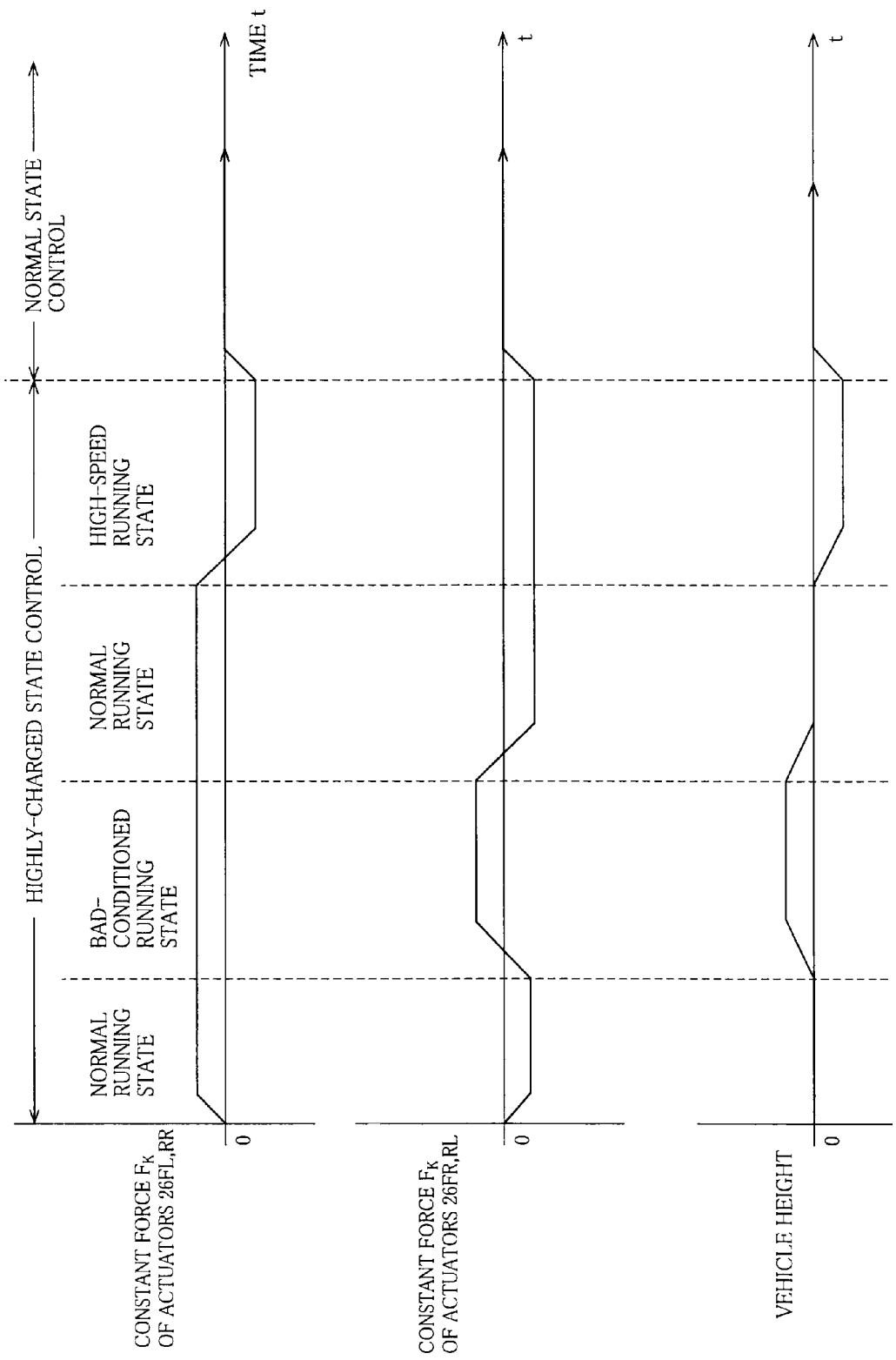
FIG. 25 A chart showing change of the constant-force component for the actuator disposed in each of front left and rear right wheels, change of the constant-force component for the actuator disposed in each of front right and rear left wheels, and change of vehicle height, in relation with elapsed time indicated along abscissa of the chart.

FIG. 25 is a graph schematically showing, under a certain condition, change of the constant-force component $F_K$ for each of the actuators 26FL, 26RR disposed in the respective front left and rear right wheels 12FL, 12RR, change of the constant-force component $F_K$ for the actuators 26FR, 26RL disposed in the respective front right and rear left wheels 12FR, 12RL, and change of vehicle height, in relation with elapsed time t indicated along abscissa of the graph. Under the condition indicated in this graph, the running state of the vehicle is sequentially switched during the highly-charged state control executed before switching of the control of the actuator 26 from the highly-charged state control to the normal state control at a certain point of time. Specifically, during the highly-charged state control, the vehicle is placed in normal running state, bad-conditioned running state, normal running state and high-speed running state in this order of description, as the time elapses. As can be understood from the figure, when the vehicle runs on a bad-conditioned road such as mogul road during execution of the highly-charged state control of the present system 220, each of all the four actuators 26 is caused to generate the constant force acting in the rebound direction, so as to increase the vehicle height for avoiding contact of the vehicle body with a road surface or the like. When the vehicle runs at a high speed, each of all the four actuators 26 is caused to generate the constant force acting in the bound direction, so as to reduce the vehicle height for stabilizing the running of the vehicle. Further, when the vehicle runs under a normal condition, each of the two actuators 26FL, 26RR is caused to generate the constant force acting in the rebound direction while each of the other two actuators 26FR, 26RL is caused to generate the constant force acting in the bound direction, so that all the actuators 26 generate the respective constant forces, with the vehicle height being held unchanged by utilizing high torsion stiffness of the vehicle body. In the present suspension system 220, during execution of the highly-charged state control, the electric power of the battery 130 is effectively consumed by generation of the constant force while the vehicle height is changed depending on the running state of the vehicle.

3. Actuator Control Program

Figure 26:
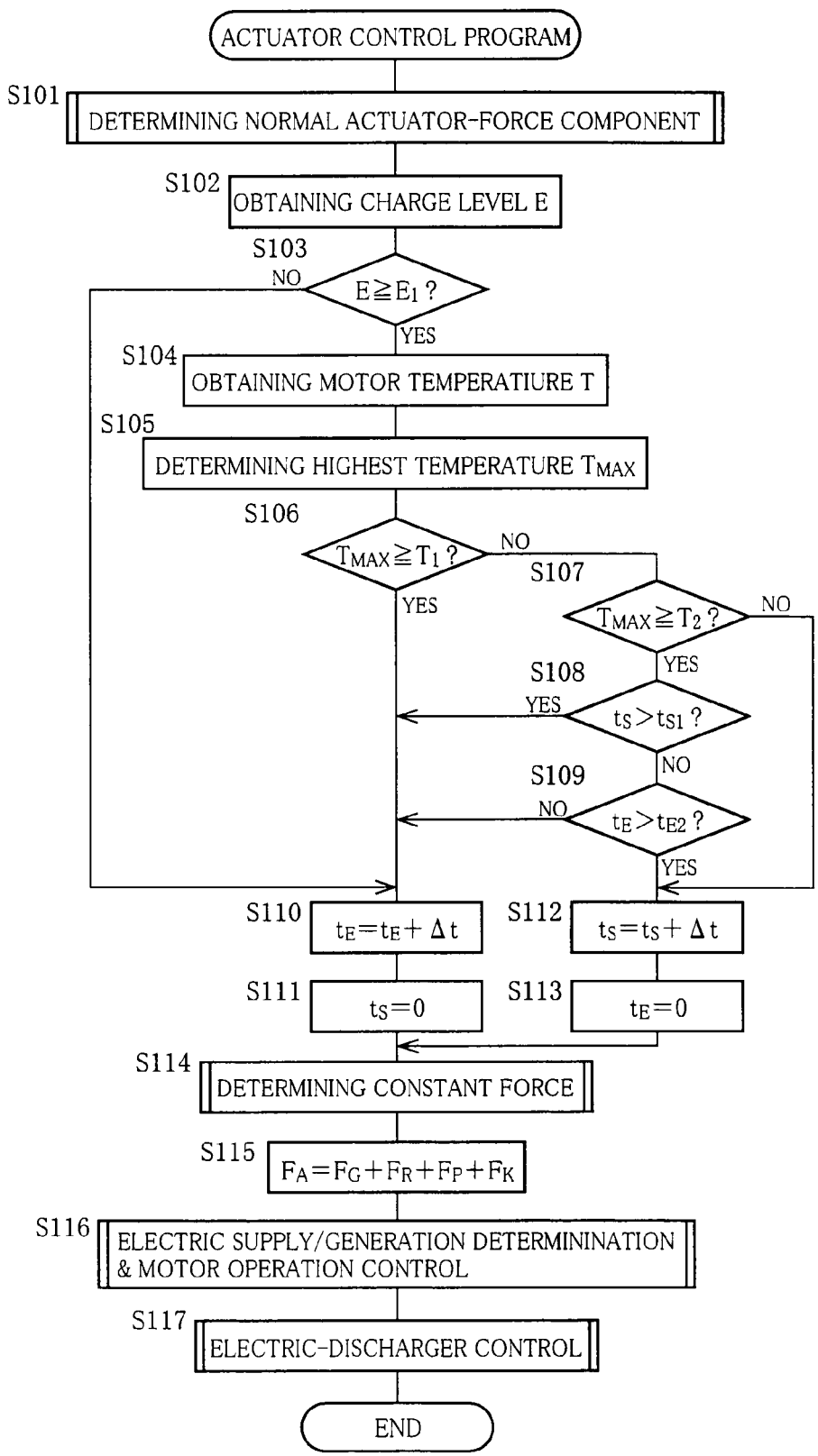
FIG. 26 A flow chart showing an actuator control program that is executed in control of the vehicle suspension system of the second embodiment.

In the present suspension system 200, the actuator control is executed in substantially the same manner as the actuator control executed in the above-described suspension system 10. The actuator control is executed in accordance with an actuator control program shown in a flow chart of FIG. 26. This control program is repeatedly executed by the controller 160, at a short time interval (e.g., several tens of milliseconds), while the ignition switch of the vehicle is placed in its ON state. Hereinafter, the control program will be described by reference to the flow chart shown in the figure. It is noted that the same procedures as carried out in the actuator control of the suspension system 10 will not be described or described in a simplified manner.

Figure 27:
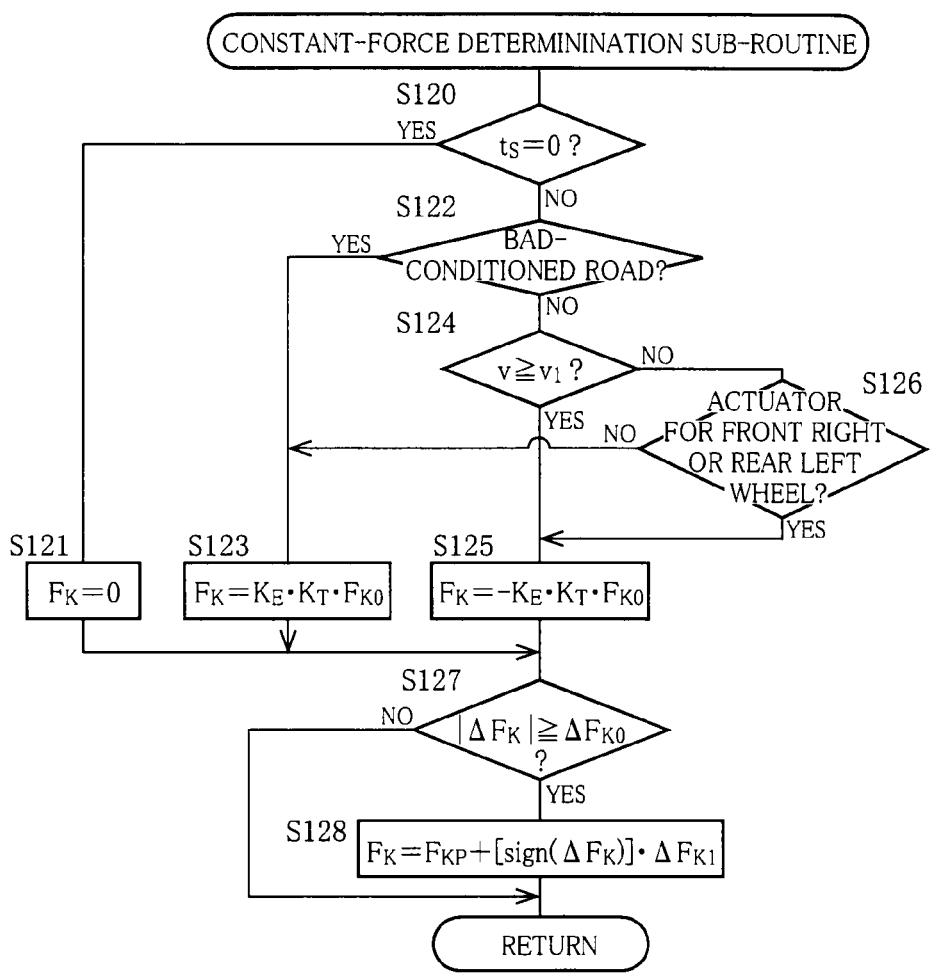
FIG. 27 A flow chart showing a constant-force determination sub-routine that is executed in the actuator control program.

The actuator control program is executed for each one of the actuators 26 of the respective spring absorber assembly 222 provided for the respective four wheels 12. In the following description, for simplifying the description, there will be described procedures performed for one of the actuators 26 according to this program. However, the actuator 26 is referred together with, as a suffix, the reference sign indicative of position of the wheel, where it should be clarified which one of the four wheels the referred actuator 26 corresponds to. In the procedures according to the present program, firstly, a normal actuator-force component determination sub-routine shown in a flow chart of FIG. 16 is executed in the same manner as the normal actuator-force component determination sub-routine in the suspension system 10. Next, it is determined which one of the normal state control and the highly-charged state control should be executed. A procedure for this determination is carried out in the same manner as that for the determination as to which one of the normal state control and the highly-charged state control should be executed in the suspension system 10. When the normal state control is selected to be executed as a result of the determination, a predetermined time $\Delta t$ is added to the normal state control executing time $t_E$ for measuring the executing time of the normal state control, and the highly-charged state control executing time $t_S$ is reset to 0 (zero) for terminating the measurement of the executing time of the highly-charged state control. On the other hand, when the highly-charged state control is selected to be executed as a result of the determination, a predetermined time $\Delta t$ is added to the highly-charged state control executing time $t_S$ for measuring the executing time of the highly-charged state control, and the normal state control executing time $t_E$ is reset to 0 (zero) for terminating the measurement of the executing time of the normal state control. After either one of these procedures has been carried out, a constant-force determination sub-routine shown in a flow chart of FIG. 27 is executed.

In the constant-force determination sub-routine, it is determined whether the highly-charged state control executing time $t_S$ is 0 (zero) or not so as to determine which one of the normal state control and the highly-charged state control is executed. When the highly-charged state control executing time $t_S$ is 0 (zero), the constant-force component $F_K$ is set to 0 (zero) for executing the normal state control. When the highly-charged state control executing time $t_S$ is not 0 (zero), the constant force direction is determined for executing the highly-charged state control. As described above, when it is determined that the road condition is bad, the constant force direction is directed to the rebound direction. When the vehicle speed v is equal to or higher than a threshold speed $v_1$, the constant force direction is directed to the bound direction. Further, when it is determined that the road condition is not bad and also that the vehicle speed v is lower than the threshold speed $v_1$, it is determined which one of the actuators 26 is subjected to the procedures carried out according to the present program. When it is determined that the procedures of the present program are performed onto the actuator 26FR for the front right wheel 12FR or the actuator 26RL for the rear left wheel 12RL, the constant force direction is directed the bound direction. On the other hand, when it is determined that the procedures of the present program are performed onto the actuator 26FL for the front left wheel 12FL or the actuator 26RR for the rear right wheel 12RR, the constant force direction is directed to the rebound direction. After the constant force direction has been thus determined, the constant-force component $F_K$ is determined as described above.

After determination of the constant-force component $F_K$, it is determined whether the constant force is abruptly changed or not. When it is determined that the constant force is abruptly changed, a procedure is performed to gradually change the constant-force component $F_K$ according to the constant-force component $F_K$ and a constant-force component $F_{KP}$ (hereinafter referred to as "previous constant-force component" where appropriate) that has been determined in the last execution of the present program. Specifically, it is determined whether an absolute value of a difference $\Delta F_K$ ($\Delta F_K = F_K - F_{KP}$) between the constant-force component $F_K$ and the previous constant-force component $F_{KP}$ is equal to or larger than a threshold value $\Delta F_{K0}$ or not. When the absolute value of $\Delta F_K$ is equal to or larger than the threshold value $\Delta F_{K0}$, it is determined that the constant force is abruptly changed. In this case, in order to gradually change the constant-force component $F_K$, the constant-force component $F_K$ is compensated according to the following expression:

$$F_K = F_{KP} + [\mathrm{sign}(\Delta F_K)] \cdot \Delta F_{K1}.$$

In this expression, $\Delta F_{K1}$ is a compensation component that is preset to have a small value, and sign ($\Delta F_K$) is a function indicative of sign of $\Delta F_K$. That is, when the constant-force component $F_K$ is larger than the previous constant-force component $F_{KP}$, sign ($\Delta F_K$) indicates a positive sign. When the constant-force component $F_K$ is smaller than the previous constant-force component $F_{KP}$, sign ($\Delta F_K$) indicates a negative sign. Therefore, when the constant-force component $F_K$ is larger than the previous constant-force component $F_{KP}$, the constant-force component $F_K$ is compensated to a value that is obtained by adding the compensation component $\Delta F_{K1}$ to the previous constant-force component $F_{KP}$. When the constant-force component $F_K$ is smaller than the previous constant-force component $F_{KP}$, the constant-force component $F_K$ is compensated to a value that is obtained by subtracting the compensation component $\Delta F_{K1}$, from the previous constant-force component $F_{KP}$. The constant-force component $F_K$ is gradually changed by the compensation component $\Delta F_{K1}$, which is set to have a value so small that the gradual change is not notable. In the present program, upon switching of the actuator control between the normal state control and the highly-charged state control, and upon change of the constant force direction in response to change of the vehicle running state, the above-described gradual change procedure is carried out. On the other hand, when it is determined that the absolute value of $\Delta F_K$ is smaller than the threshold value $\Delta F_{K0}$, it is determined that the constant force is not abruptly changed, so that the constant-force component $F_K$ is not compensated.

After the constant-force determination sub-routine has been carried out, the target actuator force $F_A$ is determined. In the present program, the constant-force component $F_K$ is set to 0 (zero) in the constant-force determination sub-routine when the normal state control is executed. Therefore, irrespective of which one of the normal state control and the highly-charged state control is executed, the target actuator force $F_A$ is determined as a sum of the determined vibration-damping-directed actuator-force component $F_G$, roll-restraining-directed actuator-force component $F_R$, pitch-restraining-directed actuator-force component $F_P$ and constant-force component $F_K$. After the target actuator force $F_A$ has been determined, the electric supply/generation determination & motor operation control sub-routine shown in the flow chart of FIG. 21 (*a*) is executed. Procedures of this sub-routine are carried out in the same manner as those of the electric supply/generation determination & motor operation control sub-routine in the above-described suspension system 10. Through the procedures, a control signal corresponding to the determined target actuator force $F_A$ is supplied to one of the inverter 162 and the variable resistor device 166, and the operation of the motor 54 is controlled to generate the determined target actuator force $F_A$. Next, the electric-discharger control sub-routine shown in the flow chart of FIG. 21 (*b*) is executed. Procedures of this sub-routine are carried out in the same manner as those of the electric-discharger control sub-routine in the above-described suspension system 10. Through the procedures, the battery 130 is connected to the discharging resistor device 188 when execution of the highly-charged state control is limited, whereby the electric power of the battery 130 is consumed by the discharging resistor device 188. One cycle of execution of the present program is completed upon completion of execution of the electric-discharger control sub-routine.

4. Functional Construction of Controller

The controller of the present suspension system 220 functioning with executions of the above-described actuator control programs can be considered to have functional constructions as described below, in view of the procedures carried out in the execution of the control programs. The controller of the present system 220 has functional portions substantially the same as the normal actuator-force-components determining portion 204, electric supply/generation controlling portion 210 and electric-discharger controlling portion 212 that are included in the controller 160 of the suspension system 10. The controller of the present system 220 further has a highly-charged state control portion as a functional portion configured to execute the highly-charged state control and a normal state control portion as a functional portion configured to execute the normal state control. The highly-charged state control portion is equipped with a constant-force component determining portion as a functional portion configured to carry out procedures of the constant-force determination sub-routine, i.e., as a functional portion configured to determine the constant-force component $F_K$. The constant-force component determining portion is equipped with: an automatic vehicle height adjusting portion as a functional portion configured to carry out procedures of steps S122-S126, i.e., as a functional portion configured to adjust the vehicle height depending on the road surface condition and/or the vehicle running speed; and a constant-force component gradually changing portion as a functional portion configured to carry out procedures of steps S127 and S128, i.e., as a functional portion configured to gradually change the constant-force component $F_K$.

Third Embodiment

1. Construction of Suspension System

Figure 28:
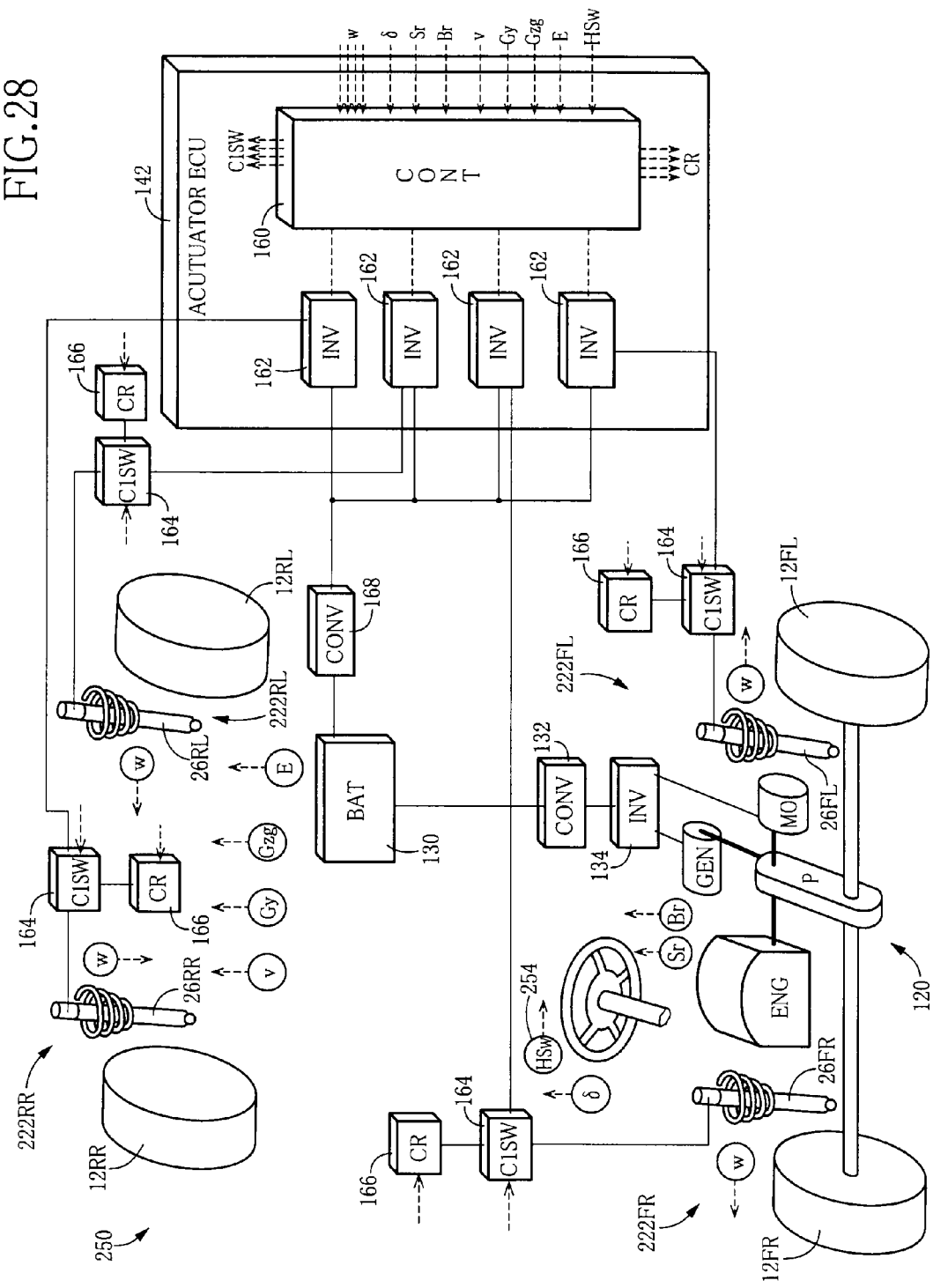
FIG. 28 A schematic view showing an overall construction of a vehicle suspension system of a third embodiment of the invention.

FIG. 28 schematically shows a vehicle suspension system 250. Since the present suspension system 250 is substantially the same as the above-described suspension system 220 except for various sensors required for execution of the controls, the same reference signs as used in the above-described embodiment will be used to identify the common constructional elements, and description of these elements is omitted or simplified.

2. Vehicle-Height Adjusting Control

In the present system 250, all the four actuator 26 provided for the respective four wheels 12 are caused to generate the constant forces in the same direction, for actively changing the vehicle height. Described in detail, the four actuators 26 are caused to generate the constant forces acting in the rebound direction for increasing the vehicle height, and are caused to generate the constant forces acting in the bound direction for reducing the vehicle height. That is, in the present system 250, the vehicle-height adjusting control is executed by controlling the constant forces. It is noted that the present suspension system 250 is equipped with a vehicle-height changing switch 254 that is substantially the same as the vehicle-height changing switch 154 provided in the above-described suspension system 10, and that there are Hi vehicle height, Mid vehicle height and Low vehicle height as three vehicle height levels each of which is selectable by operation of the vehicle-height changing switch 254.

In the vehicle-height adjusting control, the vehicle height selected based on intention of the vehicle operator is set as a target vehicle height, in principle, and the vehicle height is adjusted by generation of the constant force corresponding to the target vehicle height. Described in detail, the controller 160 stores therein a vehicle-height corresponding constant-force component value $F_{K\alpha}$ that corresponds to the target vehicle height, so that the vehicle height is adjusted to the target vehicle height by causing each of the four actuators 26 to generate the constant force corresponding to the vehicle-height corresponding constant-force component value $F_{K\alpha}$. Described specifically, when the target vehicle height is the Hi vehicle height, the constant-force component $F_K$ of the actuator force generated by each of the four actuators 26 is set to a Hi-vehicle-height corresponding constant-force component value $F_{KH}$, such that the vehicle height becomes the Hi vehicle height upon generation of the constant force corresponding to the Hi-vehicle-height corresponding constant-force component value $F_{KH}$ and acting in the rebound direction. When the target vehicle height is the Low vehicle height, the constant-force component $F_K$ of the actuator force generated by each of the four actuators 26 is set to a Low-vehicle-height corresponding constant-force component value $-F_{KL}$, such that the vehicle height becomes the Low vehicle height upon generation of the constant force corresponding to the Low-vehicle-height corresponding constant-force component value $-F_{KL}$ and acting in the bound direction. When the target vehicle height is the Mid vehicle height, the constant-force component $F_K$ of the actuator force generated by each of the four actuators 26 is set to 0 (zero), such that the vehicle height becomes the Mid vehicle height with no generation of the constant force.

3. Control in Highly-Charged State

In the present suspension system 250, the actuator 26 is controlled to generate the target actuator force $F_A$ that is determined as a sum of the vibration-damping-directed actuator-force component $F_G$, roll-restraining-directed actuator-force component $F_R$, pitch-restraining-directed actuator-force component $F_P$ and constant-force component $F_K$. By thus controlling the actuator 26, the vibration damping control, roll restraining control, pitch restraining control and vehicle-height adjusting control are executed in a unified manner. Further, during the highly-charged state as the charge state of the battery 130, even when the vehicle height is set to the Mid vehicle height, the actuators 26 are caused to generate the respective constant forces in order to forcedly establish the constant-force generating state. That is, like in the above-described system 220, each of two actuators 26 for the wheels 12 positioned in respective positions that are diagonal to each other is assigned to generate the constant force acting in the bound direction while each of the other two actuators 26 is assigned to generate the constant force acting in the rebound direction, so that the Mid vehicle height is maintained by utilizing high torsion stiffness of the vehicle body. Specifically described, each of the two actuators 26FL, 26RR provided for the front left and rear right wheels 12FL, 12RR is assigned to generate the constant-force component $F_K$ that is determined according to the following expression:

$$F_K = K_E \cdot F_{K0}.$$

Meanwhile, each of the other two actuators 26FR, 26RL provided for the front right and rear left wheels 12FR, 12RL is assigned to generate the constant-force component $F_K$ that is determined according to the following expression:

$$F_K = -K_E \cdot F_{K0}$$

In this expression, $F_{K0}$ represents a reference constant force that is preset to have a certain magnitude, and $K_E$ represents a gain based on the charge level of the battery 130 like the gain used in the above-described suspension system 10.

4. Control in Low-Charged State

Since the constant-force generating state is a state accompanying discharge of the battery 130, there is a risk that the charge state of the battery 130 might become a poorly-charged state, if the constant-force generating state is established during the low-charged state as the charge state of the battery 130. Accordingly, in the present system 250, the execution of the vehicle-height adjusting control is inhibited while the battery 130 is in the low-charged state, so that the discharge of the battery is restrained so as not to establish the constant-force generating state. Further, since some amount of the electric power is consumed from the battery 130 upon generations of the roll restraining force and pitch restraining force in the respective roll restraining control and pitch restraining control, as described above, the executions of the roll restraining control and pitch restraining control may be inhibited during the low-charged state of the battery 130, for restraining the discharge of the battery 130. Accordingly, in the present suspension system 250, a low-charged state control is executed during the low-charged state as the charge state of the battery 130. In the execution of the low-charged state control, the executions of the roll retraining control and pitch restraining control as well as that of the vehicle-height adjusting control are inhibited, so that only the vibration damping control is executed.

5. Actuator Control Program

Figure 29:
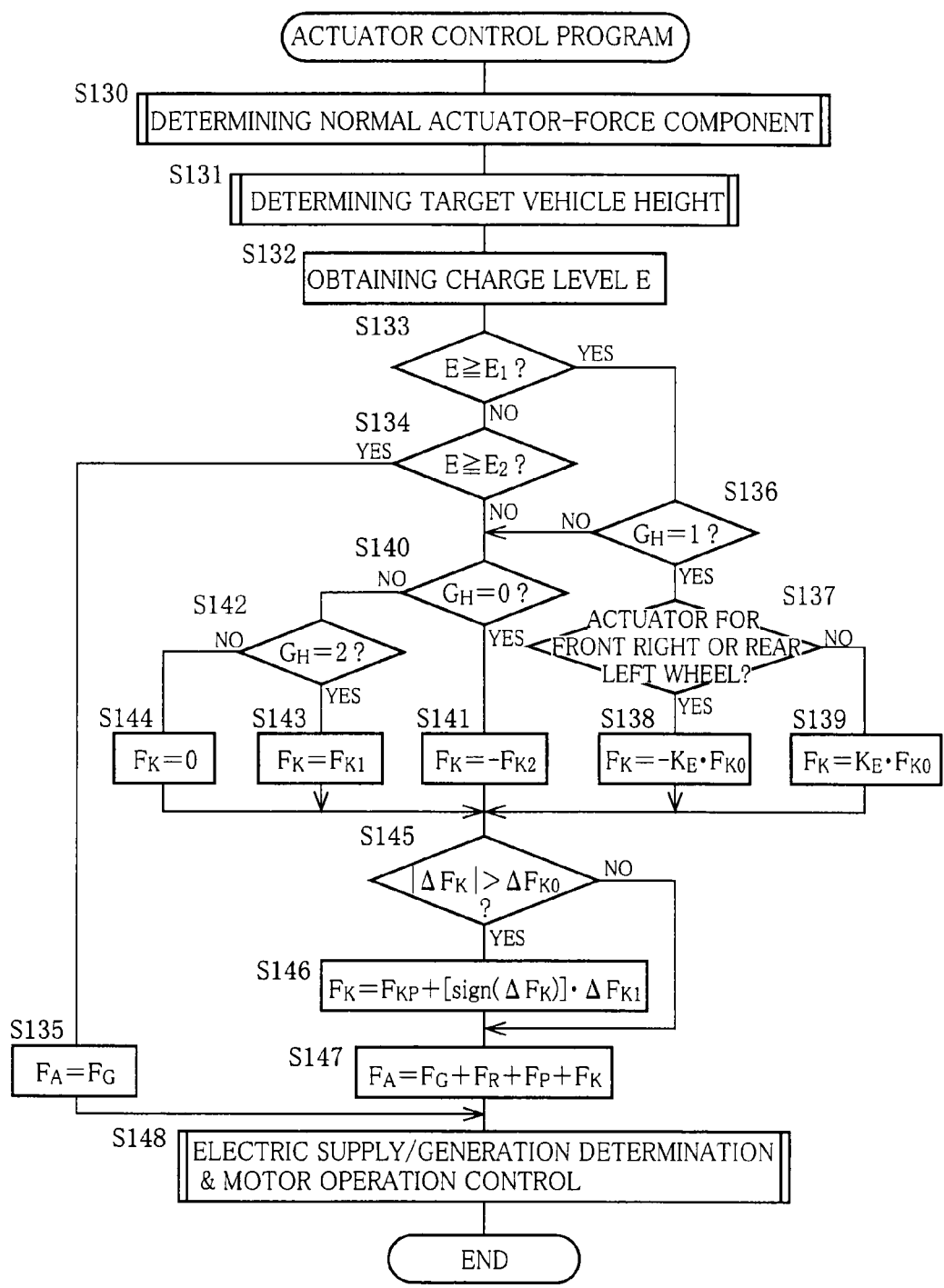
FIG. 29 A flow chart showing an actuator control program that is executed in control of the vehicle suspension system of the third embodiment.

In the present suspension system 250, the actuator control is executed in substantially the same manner as the actuator control executed in the above-described suspension system 10 and suspension system 220. The actuator control is executed in accordance with an actuator control program shown in a flow chart of FIG. 29. This control program is repeatedly executed by the controller 160, at a short time interval (e.g., several tens of milliseconds), while the ignition switch of the vehicle is placed in its ON state. Hereinafter, the control program will be described by reference to the flow chart shown in the figure. It is noted that the same procedures as carried out in the actuator control of the suspension system 10 or suspension system 220 will not be described or described in a simplified manner.

The actuator control program is executed for each one of the actuators 26 of the respective spring absorber assembly 222 provided for the respective four wheels 12. In the following description, for simplifying the description, there will be described procedures performed for one of the actuators 26 according to this program. However, the actuator 26 is referred together with, as a suffix, the reference sign indicative of position of the wheel, where it should be clarified which one of the four wheels the referred actuator 26 corresponds to. In the procedures according to the present program, firstly, the normal actuator-force component determination sub-routine shown in a flow chart of FIG. 16 is executed in the same manner as the normal actuator-force component determination sub-routine in the suspension system 10. Through the procedures carried out according to this sub-routine, the vibration-damping-directed actuator-force component $F_G$, roll-restraining-directed actuator-force component $F_R$ and pitch-restraining-directed actuator-force component $F_P$ are determined. Next, the target vehicle-height determining sub-routine shown in the flow chart of FIG. 14 is executed in the same manner as the target vehicle-height determining sub-routine in the suspension system 10. Through the procedures carried out according to this sub-routine, the target vehicle height in the vehicle-height adjusting control is determined.

After the execution of the target vehicle-height determining sub-routine, it is determined whether the charge level E of the battery 130 is equal to or higher than a first threshold level $E_1$. When the charge level E is lower than the first threshold level $E_1$, it is determined whether the charge level E of the battery 130 is equal to or lower than a second threshold level $E_2$. When the charge level E is equal to or lower than the second threshold level $E_2$, the target actuator force $F_A$ is set to be equal to the vibration-damping-directed actuator-force component $F_G$, for executing the low-charged state control.

When the charge level E is equal to or higher than the first threshold level $E_1$, it is determined whether the target vehicle height determined in the target vehicle-height determining sub-routine is the Mid vehicle height or not. When the target vehicle height is the Mid vehicle height, it is determined which one of the actuators 26 is subjected to the procedures carried out according to the present program, as in the above-described suspension system 220. According to the determination, the constant force direction is determined, and the constant-force component $F_K$ is determined as described above. When the charge level E is equal to or higher than the first threshold level $E_1$, with the determined target vehicle height being other than the Mid vehicle height, or when the charge level E is higher than the second threshold level $E_2$, it is determined which one of the vehicle height levels the target vehicle height is set to. When the target vehicle height is the Hi vehicle height, the constant-force component $F_K$ is set to the Hi-vehicle-height corresponding constant-force component value $F_{KH}$. When the target vehicle height is the Low vehicle height, the constant-force component $F_K$ is set to the Low-vehicle-height corresponding constant-force component value $-F_{KL}$. When the target vehicle height is the Mid vehicle height, the constant-force component $F_K$ is set to 0 (zero).

After the determination of the constant-force component $F_K$, there are performed the same procedures as those of the determination as to abrupt change of the constant force and the gradual change of the constant-force component $F_K$ in the above-described suspension system 220. That is, it is determined whether the constant force is abruptly changed or not, and then the constant-force component $F_K$ is gradually changed when it is determined that the constant force is abruptly changed. Next, the target actuator force $F_A$ is determined as a sum of the determined vibration-damping-directed actuator-force component $F_G$, roll-restraining-directed actuator-force component $F_R$, pitch-restraining-directed actuator-force component $F_P$ and constant-force component $F_K$. After the target actuator force $F_A$ has been thus determined, or after the target actuator force $F_A$ has been determined in the above-described low-charged state control, the electric supply/generation determination & motor operation control sub-routine shown in the flow chart of FIG. 21 (a) is carried out. Procedures of this sub-routine are carried out in the same manner as those of the electric supply/generation determination & motor operation control sub-routine in the above-described suspension system 10. Through the procedures, a control signal corresponding to the determined target actuator force $F_A$ is supplied to one of the inverter 162 and the variable resistor device 166, and the operation of the motor 54 is controlled to generate the determined target actuator force $F_A$. One cycle of execution of the present program is completed upon completion of execution of this sub-routine. In the present program, there are not performed procedures for intermittently executing the control in the highly-charged state. However, such procedures can be performed as in the above-described suspension system 10 and suspension system 220.

6. Functional Construction of Controller

The controller of the present suspension system 250 functioning with executions of the above-described actuator control programs can be considered to have functional construction as described below, in view of the procedures carried out in the execution of the control programs. The controller of the present system 250 has functional portions substantially the same as the normal actuator-force-components determining portion 204 and electric supply/generation controlling portion 210 that are included in the controller 160 of the suspension system 10. The controller of the present system 250 further has a low-charged state control portion as a functional portion configured to execute the low-charged state control, a highly-charged state control portion as a functional portion configured to execute the highly-charged state control and a normal state control portion as a functional portion configured to execute the normal state control. The highly-charged state control portion is equipped with: a constant-force-basis vehicle height adjusting portion as a functional portion configured to carry out procedures of steps S136-S143, i.e., as a functional portion configured to adjust the vehicle height owing to the constant force; and a constant-force-component gradually changing portion as a functional portion configured to carry out procedures of steps S145 and S146, i.e., as a functional portion configured to gradually change the constant-force component $F_K$.

Fourth Embodiment

1. Construction of Suspension System

Since a vehicle suspension system of the present embodiment is equipped with substantially the same constructional elements as those of the above-described vehicle suspension system 10 of the first embodiment, the same reference signs as used in the first embodiment will be used to identify the constructional elements identical with those of the suspension system 10, and description of these elements is omitted or simplified. Further, illustration of the suspension system of the present embodiment is omitted.

2. Highly-Charged State Control

In the present system, the constant force directions of the respective four actuators 26 are not all the same to one another as in the highly-charged state control executed in the above-described suspension system 10. Rather, in the present system, two of the four actuators 26 for the wheels 12 positioned in respective positions that are diagonal to each other are assigned to generate the respective constant actuator forces such that the generated constant actuator forces act in the bound direction as the constant force direction, while the other two of the four actuator 26 are assigned to generate the respective constant actuator forces such that the generated constant actuator forces act in the rebound direction as the constant force direction. It is therefore possible to cause the actuators 26 to generate the respective constant forces without changing the vehicle height, by causing the generated constant forces to cooperate with each other to constitute a twisting force acting on the vehicle body, namely, by utilizing high torsion stiffness of the vehicle body. Further, in the present system, the twisting force twisting the vehicle body acts in a direction that is periodically changed, so that the vehicle body is avoided from being twisted only in a constant direction. Moreover, the constant force is gradually changed so as not to be abruptly changed upon change of the direction in which the vehicle is twisted.

Specifically described, the constant-force component $F_K$, which is to be generated by each of the two actuators 26FL, 26RR for the front left and rear right wheels 12FL, 12RR, is determined in accordance with the following expression:

$$F_K = K_E \cdot f_W(t_S) \cdot F_{K0}.$$

Meanwhile, the constant-force component $F_K$, which is to be generated by each of the two actuators 26FR, 26RL for the front right and rear left wheels 12FR, 12RL, is determined in accordance with the following expression:

$$F_K = -K_E \cdot f_W(t_S) \cdot F_{K0}.$$

Figure 30:
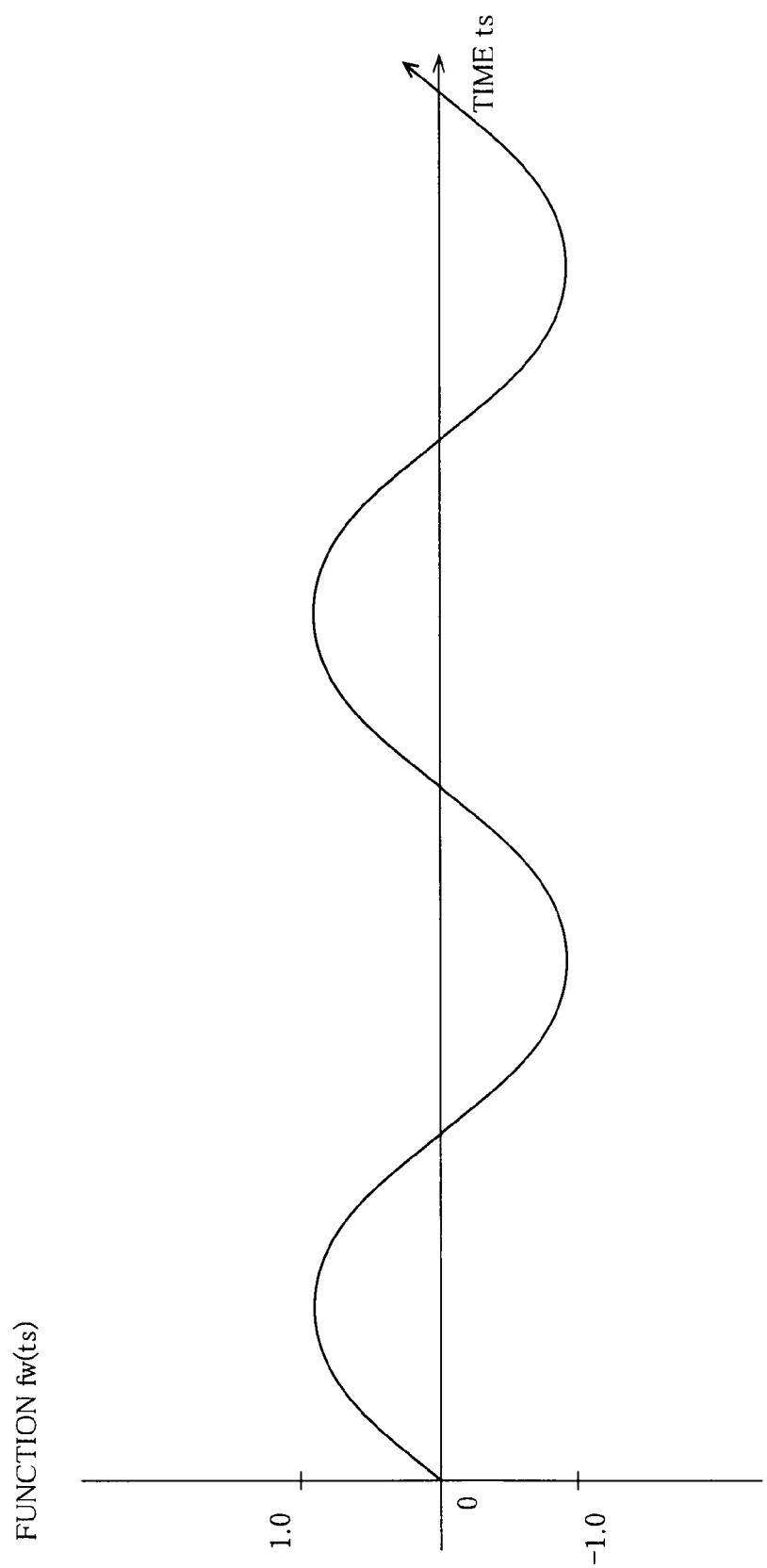
FIG. 30 A graph showing a function of the elapsed time, which is for gradually changing the constant actuator force while periodically changing a direction of the constant actuator force.

In the above expressions, $F_{K0}$ represents a reference constant force that is preset to have a certain magnitude, and $K_E$ represents the same gain as that used in the above-described suspension system 10, i.e., a gain based on the charge amount of the battery 120. Further, $f_W(t_S)$ is a function based on elapsed time. As shown in FIG. 30, this function $f_W(t_S)$ is changed periodically in a sine-wave manner between −1 and +1, so as to periodically change the constant force direction between the rebound direction and the bound direction, and so as to prevent the constant force from being abruptly changed upon change of the constant force direction.

Further, in the present system, there is executed a control substantially the same as the vehicle-height adjusting control executed in the suspension system 10. In the present system, there is not executed the procedure performed upon switching between the normal state and the highly-charged state, which is executed for gradually changing the constant force in the above-described suspension system 10, since the vehicle height is not substantially changed by the constant force in the present system.

Figure 31:
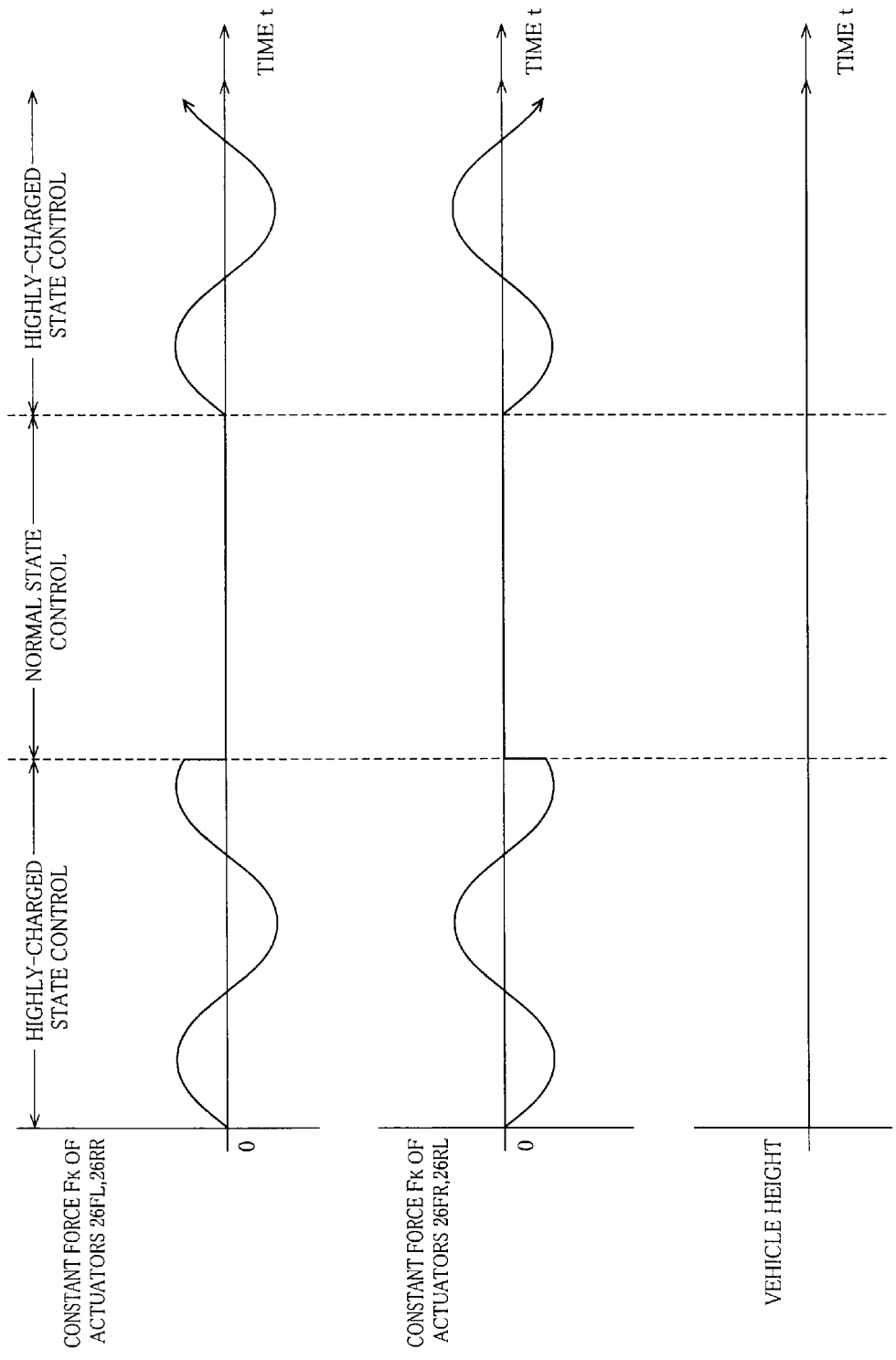
FIG. 31 A chart showing change of the constant-force component for the actuator disposed in each of front left and rear right wheels, change of the constant-force component for the actuator disposed in each of front right and rear left wheels, and change of vehicle height, in relation with elapsed time indicated along abscissa of the chart.

FIG. 31 is a graph schematically showing, under a certain condition, change of the constant-force component $F_K$ for each of the actuators 26FL, 26RR disposed in the respective front left and rear right wheels 12FL, 12RR, change of the constant-force component $F_K$ for the actuators 26FR, 26RL disposed in the respective front right and rear left wheels 12FR, 12RL, and change of vehicle height, in relation with elapsed time t indicated along abscissa of the graph. Under the condition indicated in this graph, the control of each actuator 26 is switched from the highly-charged state control to the normal state control at a certain point of time, and is switched from the normal state control to the highly-charged state control at the posterior point of time. As is understood from the figure, in the highly-charged state control executed in the present system 220, the constant force direction of the two actuators 26FL, 26RR is periodically changed between the rebound direction and the bound direction, while the constant force direction of the other two actuators 26FR, 26RL is made opposite to those of the above-described two actuators 26FL, 26RR, such that the constant forces generated by the respective four actuators 26 are always equalized to one another with respect to magnitude. In the present system, the electric power of the battery 130 is effectively consumed without the vehicle height being changed by the constant forces, by causing the constant forces to constitute the twisting force acting on the vehicle and changing the direction in which the twisting force acts on the vehicle.

3. Control Programs

Figure 32:
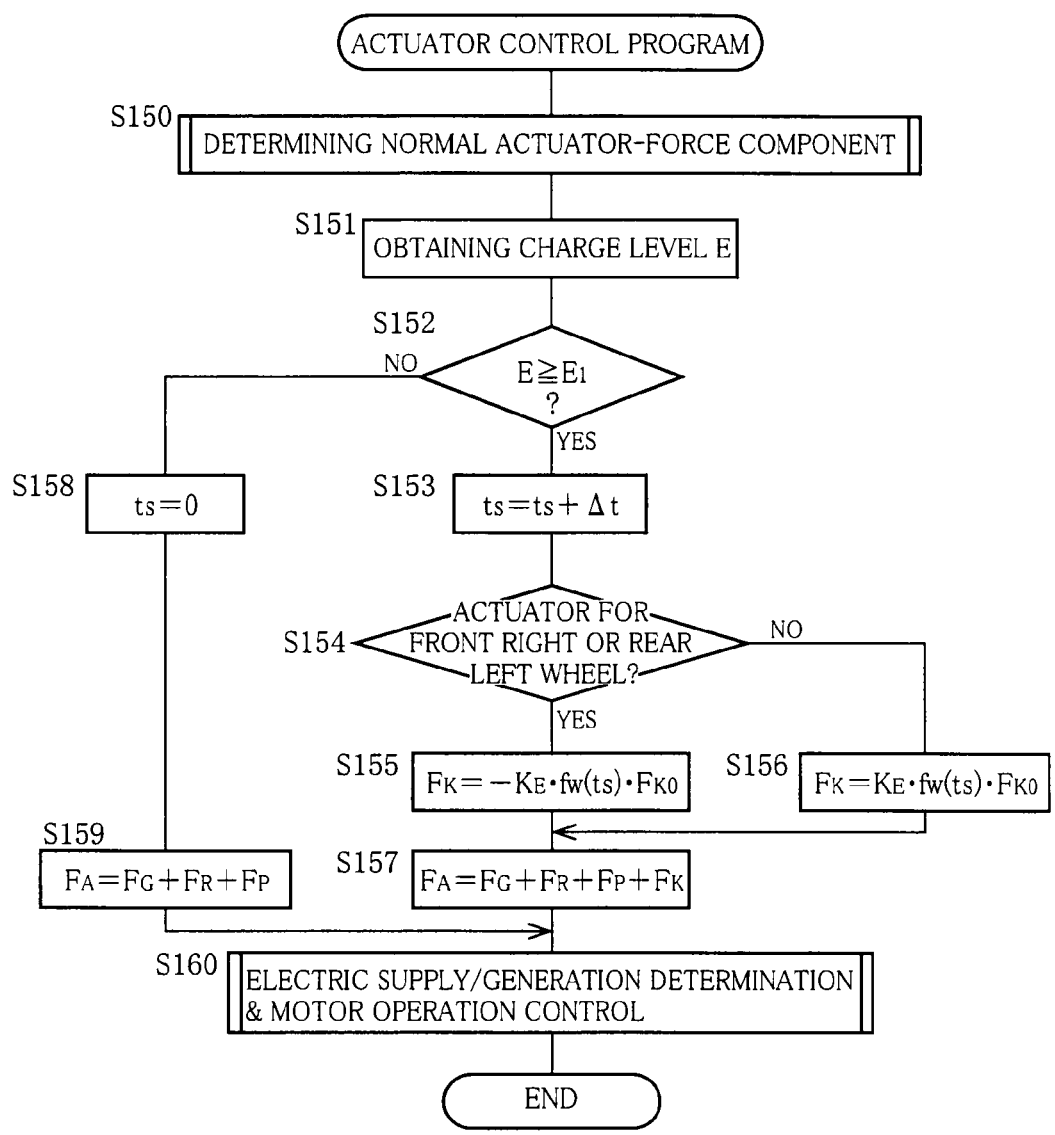
FIG. 32 A flow chart showing an actuator control program that is executed in control of the vehicle suspension system of a fourth embodiment.

In the present suspension system, the vehicle-height adjusting control and the actuator control, which are substantially the same as those executed in the above-described suspension system 10, are executed concurrently with each other. The vehicle-height adjusting control is executed in accordance with the vehicle-height adjustment control program shown in the flow chart of FIG. 13. This control program is repeatedly executed by the controller 146, at a short time interval (e.g., several tens of milliseconds), while the ignition switch of the vehicle is placed in its ON state. The actuator control is executed in accordance with an actuator control program shown in a flow chart of FIG. 32. This control program is repeatedly executed by the controller 160, at a short time interval (e.g., several tens of milliseconds), while the ignition switch of the vehicle is placed in its ON state. Since the vehicle-height adjusting control is described in the above descriptions of the first embodiment, the description thereof is omitted. Regarding the actuator control, the same procedures as carried out in the actuator control of the suspension system 10 will not be described or described in a simplified manner. Hereinafter, the actuator control will be briefly described with reference to the flow chart shown in the figure.

The actuator control program is executed for each one of the actuators 26 of the respective spring absorber assembly 20 provided for the respective four wheels 12. In the following description, for simplifying the description, there will be described procedures performed for one of the actuators 26 according to this program. However, the actuator 26 is referred together with, as a suffix, the reference sign indicative of position of the wheel, where it should be clarified which one of the four wheels the referred actuator 26 corresponds to. In the procedures according to the present program, firstly, the normal actuator-force component determination sub-routine shown in the flow chart of FIG. 16 is executed in the same manner as the normal actuator-force component determination sub-routine in the suspension system 10. Through the procedures carried out according to this sub-routine, the vibration-damping-directed actuator-force component $F_G$, roll-restraining-directed actuator-force component $F_R$ and pitch-restraining-directed actuator-force component $F_P$ are determined.

Next, it is determined whether the charge level E of the battery 130 is equal to or higher than the first threshold level $E_1$, and then a predetermined time $\Delta t$ is added to the highly-charged state control executing time $t_S$ when the charge level E is equal to or higher than the first threshold level $E_1$. Subsequently, it is determined which one of the actuators 26 is subjected to the procedures carried out according to the present program, and the constant-force component $F_R$ is determined as described above, according to the determination. Then, the target actuator force $F_A$ is determined as a sum of the determined vibration-damping-directed actuator-force component $F_G$, roll-restraining-directed actuator-force component $F_R$, pitch-restraining-directed actuator-force component $F_P$ and constant-force component $F_K$.

When the charge level E of the battery 130 is lower than the first threshold level $E_1$, the target actuator force $F_A$ is determined as a sum of the determined vibration-damping-directed actuator-force component $F_G$, roll-restraining-directed actuator-force component $F_R$ and pitch-restraining-directed actuator-force component $F_P$, after the highly-charged state control executing time $t_S$ has been reset to 0 (zero), After the target actuator force $F_A$ has been thus determined, the electric supply/generation determination & motor operation control sub-routine shown in the flow chart of FIG. 21 (a) is carried out. Procedures of this sub-routine are carried out in the same manner as those of the electric supply/generation determination & motor operation control sub-routine in the above-described suspension system 10. Through the procedures, a control signal corresponding to the determined target actuator force $F_A$ is supplied to one of the inverter 162 and the variable resistor device 166, and the operation of the motor 54 is controlled to generate the determined target actuator force $F_A$. One cycle of execution of the present program is completed upon completion of execution of this sub-routine.

4. Functional Constructions of Controllers

The controller of the vehicle-height adjustment ECU and the controller of the actuator ECU of the present suspension system functioning with executions of the above-described control programs can be considered to have functional constructions as described below, in view of the procedures carried out in the execution of the control programs. The controller of the vehicle-height adjustment ECU has functional portions substantially the same as the target vehicle-height determining portion 200 and the vehicle height adjusting portion 202 that are included in the controller 146 of the suspension system 10. The controller of the actuator ECU has functional portions substantially the same as the normal actuator-force-components determining portion 204 and electric supply/generation controlling portion 210 that are included in the controller 160 of the suspension system 10. Further, the controller of the actuator ECU further has: a highly-charged state control portion as a functional portion configured to carry out procedures of steps S153-S157, i.e., as a functional portion configured to execute the highly-charged state control; and a normal state control portion as a functional portion configured to carry out procedures of steps S158 and S159, i.e., as a functional portion configured to execute the normal state control. It is noted that the highly-charged state control portion is equipped with a constant-force-direction gradually changing portion as a functional portion configured to carry out procedures of steps S154-S156, i.e., as a functional portion configured to periodically change the constant force direction in a gradual manner.

The invention claimed is:

1. A suspension system for a vehicle, comprising:
a suspension spring elastically interconnecting a vehicle body and a wheel of the vehicle;
an actuator disposed in parallel with said suspension spring and having an electric motor, such that said actuator is capable of generating, based on a force of said electric motor, an actuator force forcing the vehicle body and the wheel toward and away from each other, and causing the generated actuator force to act as a damping force against displacement of the vehicle body and the wheel toward and away from each other; and
a control device configured to control the actuator force generated by said actuator, by controlling operation of said electric motor,
wherein said control device is capable of establishing a constant-force generating state in which the actuator force is constantly generated as a constant actuator force by said actuator with supply of an electric power thereto from a battery as an electric power source of said electric motor such that the generated constant actuator force acts in one of a rebound direction for forcing the vehicle body and the wheel away from each other and a bound direction for forcing the vehicle body and the wheel toward each other,
wherein said control device is configured to control said constant-force generating state, based on a charge state of said battery,
wherein said control device is configured to control the actuator force such that the actuator force includes (i) a vibration-damping-directed actuator force that acts for damping relative vibration of the wheel and the vehicle body, (ii) a roll-restraining-directed actuator force that acts for restraining roll of the vehicle body, and (iii) a pitch-restraining-directed actuator force that acts for restraining pitch of the vehicle body, such that the vibration-damping-directed actuator force, the roll-restraining-directed actuator force and the pitch-restraining-directed actuator force are constituted by respective components of the actuator force that are other than a component of the actuator force that constitutes the constant actuator force.

2. The suspension system according to claim 1,
wherein said suspension spring and said actuator are provided for each of four wheels as front right and left and rear right and left wheels of the vehicle, so that four actuators are provided for the respective four wheels, for generating respective constant actuator forces, and
wherein said control device is capable of establishing a state, as said constant-force generating state, in which said four actuators are assigned to generate, as the respective constant actuator forces, respective forces that act in a same direction.

3. The suspension system according to claim 1, wherein said suspension spring is a coil spring.

4. The suspension system according to claim 1, wherein said suspension spring is a fluid spring that utilizes pressure of a fluid.

5. A suspension system for a vehicle comprising:
a suspension spring elastically interconnecting a vehicle body and a wheel of the vehicle;
an actuator disposed in parallel with said suspension spring and having an electric motor, such that said actuator is capable of generating, based on a force of said electric motor, an actuator force forcing the vehicle body and the wheel toward and away from each other, and causing the generated actuator force to act as a damping force against displacement of the vehicle body and the wheel toward and away from each other; and
a control device configured to control the actuator force generated by said actuator, by controlling operation of said electric motor,
wherein said control device is capable of establishing a constant-force generating state in which the actuator force is constantly generated as a constant actuator force by said actuator with supply of an electric power thereto from a battery as an electric power source of said electric motor such that the generated constant actuator force acts in one of a rebound direction for forcing the vehicle body and the wheel away from each other and a bound direction for forcing the vehicle body and the wheel toward each other,
wherein said control device is configured to control said constant-force generating state, based on a charge state of said battery,
wherein said suspension spring and said actuator are provided for each of four wheels as front right and left and rear right and left wheels of the vehicle, so that four actuators are provided for the respective four wheels, for generating respective constant actuator forces, and
wherein said control device is capable of establishing a state, as said constant-force generating state, in which two of said four actuators positioned in respective positions that are diagonal to each other are assigned to generate, as the respective constant actuator forces, respective forces that act in the rebound direction while the other two of said four actuators are assigned to generate, as the respective constant actuator forces, respective forces that act in the bound direction.

6. The suspension system according to claim 5, wherein said control device is configured to control the constant actuator forces of said four actuators, such that assignment of said two of said four actuators and assignment of said other two of said four actuators are periodically switched to each other whereby the direction of the constant actuator force generated by each of said four actuators is changed upon periodical switching of the assignment.

7. The suspension system according to claim 6, wherein said control device is configured to control the constant actuator forces of said four actuators, such that the constant actuator forces of said four actuators are gradually changed when the direction of the constant actuator force generated by each of said four actuators is changed upon the periodical switching of the assignment.

8. The suspension system according to claim 5, wherein said control device is configured to always equalize magnitudes of the constant actuator forces of said four actuators to one another.

9. A suspension system for a vehicle, comprising:
a suspension spring elastically interconnecting a vehicle body and a wheel of the vehicle;
an actuator disposed in parallel with said suspension spring and having an electric motor, such that said actuator is capable of generating, based on a force of said electric motor, an actuator force forcing the vehicle body and the wheel toward and away from each other, and causing the generated actuator force to act as a damping force against displacement of the vehicle body and the wheel toward and away from each other; and
a control device configured to control the actuator force generated by said actuator, by controlling operation of said electric motor,
wherein said control device is capable of establishing a constant-force generating state in which the actuator force is constantly generated as a constant actuator force by said actuator with supply of an electric power thereto from a battery as an electric power source of said electric motor such that the generated constant actuator force acts in one of a rebound direction for forcing the vehicle body and the wheel away from each other and a bound direction for forcing the vehicle body and the wheel toward each other,
wherein said control device is configured to control said constant-force generating state, based on a charge state of said battery, and
wherein said control device is configured, when said battery is in a highly charged state, to execute a highly-charged state control for forcedly establishing said constant-force generating state.

10. The suspension system according to claim 9, wherein a magnitude of the constant actuator force generated upon execution of the highly-charged state control is determined based on a charge level of said battery.

11. The suspension system according to claim 9, wherein a magnitude of the constant actuator force generated upon execution of the highly-charged state control is determined based on a temperature of said actuator.

12. The suspension system according to claim 9, being configured such that an electric power generated by said electric motor upon actuation of said actuator caused by an external force is returnable toward said battery, and such that return of the electric power toward said battery is limitable when said battery is in the highly charged state.

13. The suspension system according to claim 9, wherein the highly-charged-state control is a control causing the constant actuator force to be generated to act in a direction that is determined based on at least one of a condition of a road surface on which the vehicle runs and a running speed at which the vehicle runs.

14. The suspension system according to claim 9, wherein said control device is configured to gradually change the constant actuator force upon transition from a normal control to the highly-charged state control and upon transition from the highly-charged state control to the normal control.

15. The suspension system according to claim 9,
wherein said suspension spring has a construction permitting a spring rate thereof to be changeable, and
wherein said control device is configured to change the spring rate of said suspension spring, so as to restrain a distance between the vehicle body and the wheel, from being changed by the constant actuator force.

16. The suspension system according to claim 15, wherein a rate of change of the constant actuator force upon increase of the constant actuator force is higher than that upon reduction of the constant actuator force, when the constant actuator force acts in the rebound direction and is changed while change of the distance between the vehicle body and the wheel is restrained by change of the spring rate of said suspension spring.

17. The suspension system according to claim 9, wherein said control device is configured to limit execution of the highly-charged state control when a temperature of said actuator is high.

18. The suspension system according to claim 9, wherein said control device is configured to inhibit continuation of execution of the highly-charged state control beyond a predetermined permissible continuation time.

19. The suspension system according to claim 9, wherein said control device is configured to inhibit resumption of execution of the highly-charged state control before elapse of a predetermined resumption inhibition time.

20. The suspension system according to claim 9, wherein said control device is configured to reduce a charge level of said battery by an electric discharger provided in the vehicle, when execution of the highly-charged state control is limited while said battery is in the highly charged state.

21. A suspension system for a vehicle, comprising:
a suspension spring elastically interconnecting a vehicle body and a wheel of the vehicle;
an actuator disposed in parallel with said suspension spring and having an electric motor, such that said actuator is capable of generating, based on a force of said electric motor, an actuator force forcing the vehicle body and the wheel toward and away from each other, and causing the generated actuator force to act as a damping force against displacement of the vehicle body and the wheel toward and away from each other; and
a control device configured to control the actuator force generated by said actuator, by controlling operation of said electric motor,
wherein said control device is capable of establishing a constant-force generating state in which the actuator force is constantly generated as a constant actuator force by said actuator with supply of an electric power thereto from a battery as an electric power source of said electric motor such that the generated constant actuator force acts in one of a rebound direction for forcing the vehicle body and the wheel away from each other and a bound direction for forcing the vehicle body and the wheel toward each other,
wherein said control device is configured to control said constant-force generating state, based on a charge state of said battery, and
wherein said control device is configured to limit establishment of the constant-force generating state, when said battery is in a low charged state.

* * * * *